United States Patent
Ravasz et al.

(10) Patent No.: US 12,524,142 B2
(45) Date of Patent: Jan. 13, 2026

(54) DEVICES, METHODS, AND GRAPHICAL USER INTERFACES FOR DISPLAYING SETS OF CONTROLS IN RESPONSE TO GAZE AND/OR GESTURE INPUTS

(71) Applicant: Apple Inc., Cupertino, CA (US)

(72) Inventors: Jonathan Ravasz, Sunnyvale, CA (US); Angel Suet Yan Cheung, San Francisco, CA (US); Ashwin Kumar Asoka Kumar Shenoi, San Jose, CA (US); Leah M. Gum, Sunol, CA (US); Zoey C. Taylor, San Francisco, CA (US); Evgenii Krivoruchko, San Francisco, CA (US); Christopher D. McKenzie, Burlingame, CA (US); Matan Stauber, San Francisco, CA (US); Yonghyun A. Kim, San Francisco, CA (US); Gregory T. Scott, Soquel, CA (US); Lucio Moreno Rufo, San Jose, CA (US); Fredric R. Vinna, San Francisco, CA (US); Brian K. Shiraishi, Belmont, CA (US); So Tanaka, San Pedro, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/427,434

(22) Filed: Jan. 30, 2024

(65) Prior Publication Data
US 2024/0361901 A1    Oct. 31, 2024

Related U.S. Application Data

(60) Provisional application No. 63/505,700, filed on Jun. 1, 2023, provisional application No. 63/482,274, filed on Jan. 30, 2023.

(51) Int. Cl.
*G06F 3/01* (2006.01)
*G06F 3/04815* (2022.01)
*G06F 3/0487* (2013.01)

(52) U.S. Cl.
CPC ............ *G06F 3/0487* (2013.01); *G06F 3/013* (2013.01); *G06F 3/017* (2013.01); *G06F 3/04815* (2013.01)

(58) Field of Classification Search
CPC ...... G06F 3/0482; G06F 3/0487; G06F 3/017; G06F 1/163; G06F 3/013; G06F 3/011; G06F 3/04815; G06F 3/04842; G06F 3/01
See application file for complete search history.

(56) References Cited

U.S. PATENT DOCUMENTS

| | | |
|---|---|---|
| 1,173,824 A | 2/1916 | Mckee |
| 5,015,188 A | 5/1991 | Pellosie et al. |

(Continued)

FOREIGN PATENT DOCUMENTS

| | | |
|---|---|---|
| CA | 3033344 A1 | 2/2018 |
| CN | 102298493 A | 12/2011 |

(Continued)

OTHER PUBLICATIONS

Corrected Notice of Allowability received for U.S. Appl. No. 17/479,791, mailed on May 19, 2023, 2 pages.

(Continued)

*Primary Examiner* — Olga V Merkoulova
(74) *Attorney, Agent, or Firm* — Kubota & Basol LLP

(57) ABSTRACT

In some embodiments, a computer system enables a user to invoke display of transport controls (and/or other controls associated with controlling playback of content) using gaze inputs, gesture inputs, or a combination of these. In some embodiments, in response to detecting a first user input, the (Continued)

computer system displays a first set of controls in a reduced-prominence state (e.g., in a manner that is not unduly distracting to the user), and in response to detecting a second user input, the computer system displays a second set of controls in an increased-prominence state (e.g., in a more visually prominent state). The second set of controls optionally includes more controls than the first set of controls.

60 Claims, 48 Drawing Sheets

(56) References Cited

U.S. PATENT DOCUMENTS

| | | |
|---|---|---|
| 5,422,812 A | 6/1995 | Knoll et al. |
| 5,515,488 A | 5/1996 | Hoppe et al. |
| 5,524,195 A | 6/1996 | Clanton et al. |
| 5,610,828 A | 3/1997 | Kodosky et al. |
| 5,731,805 A | 3/1998 | Tognazzini et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,809,267 A | 9/1998 | Moran et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,108,004 A | 8/2000 | Medl |
| 6,112,015 A | 8/2000 | Planas et al. |
| 6,154,559 A | 11/2000 | Beardsley |
| 6,167,433 A | 12/2000 | Maples et al. |
| 6,295,069 B1 | 9/2001 | Shirur |
| 6,323,846 B1 | 11/2001 | Westerman et al. |
| 6,426,745 B1 | 7/2002 | Isaacs et al. |
| 6,456,296 B1 | 9/2002 | Cataudella et al. |
| 6,570,557 B1 | 5/2003 | Westerman et al. |
| 6,584,465 B1 | 6/2003 | Zhu et al. |
| 6,677,932 B1 | 1/2004 | Westerman |
| 6,714,201 B1 | 3/2004 | Grinstein et al. |
| 6,750,873 B1 | 6/2004 | Bernardini et al. |
| 6,756,997 B1 | 6/2004 | Ward et al. |
| 7,035,903 B1 | 4/2006 | Baldonado |
| 7,096,120 B2* | 8/2006 | Hull .................. H04L 67/52 |
| | | 340/988 |
| 7,137,074 B1 | 11/2006 | Newton et al. |
| 7,230,629 B2 | 6/2007 | Reynolds et al. |
| 7,298,370 B1 | 11/2007 | Middler et al. |
| 7,580,576 B2 | 8/2009 | Wang et al. |
| 7,614,008 B2 | 11/2009 | Ording |
| 7,633,076 B2 | 12/2009 | Huppi et al. |
| 7,634,718 B2 | 12/2009 | Nakajima |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,706,579 B2 | 4/2010 | Oijer |
| 7,721,226 B2 | 5/2010 | Barabe et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,436,872 B2 | 5/2013 | Wright et al. |
| 8,479,122 B2 | 7/2013 | Hotelling et al. |
| 8,593,558 B2 | 11/2013 | Gardiner et al. |
| 8,730,156 B2 | 5/2014 | Weising et al. |
| 8,767,045 B2* | 7/2014 | Kitazato .............. H04N 13/178 |
| | | 348/43 |
| 8,793,620 B2 | 7/2014 | Stafford |
| 8,793,729 B2 | 7/2014 | Adimatyam et al. |
| 8,803,873 B2 | 8/2014 | Yoo et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,158,115 B1 | 10/2015 | Worley et al. |
| 9,164,975 B2 | 10/2015 | Milewski et al. |
| 9,183,672 B1 | 11/2015 | Hickman et al. |
| 9,185,062 B1 | 11/2015 | Yang et al. |
| 9,196,072 B2 | 11/2015 | Oh et al. |
| 9,201,500 B2 | 12/2015 | Srinivasan et al. |
| 9,214,137 B2 | 12/2015 | Bala et al. |
| 9,230,368 B2 | 1/2016 | Keane et al. |
| 9,237,334 B2 | 1/2016 | Cheng et al. |
| 9,241,149 B2 | 1/2016 | Redmann |
| 9,245,388 B2 | 1/2016 | Poulos et al. |
| 9,256,785 B2 | 2/2016 | Qvarfordt |
| 9,293,118 B2 | 3/2016 | Matsui |
| 9,294,757 B1 | 3/2016 | Lewis et al. |
| 9,298,334 B1 | 3/2016 | Zimmerman et al. |
| 9,316,827 B2 | 4/2016 | Lindley et al. |
| 9,348,458 B2 | 5/2016 | Hotelling et al. |
| 9,383,189 B2 | 7/2016 | Bridges et al. |
| 9,384,594 B2 | 7/2016 | Maciocci et al. |
| 9,396,580 B1 | 7/2016 | Nowrouzezahrai et al. |
| 9,400,559 B2 | 7/2016 | Latta et al. |
| 9,426,193 B2 | 8/2016 | Goodman |
| 9,436,357 B2 | 9/2016 | Pallakoff et al. |
| 9,437,047 B2 | 9/2016 | Chang et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,491,374 B1 | 11/2016 | Avrahami et al. |
| 9,519,371 B2 | 12/2016 | Nishida |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,588,651 B1 | 3/2017 | Buchanan et al. |
| 9,612,722 B2 | 4/2017 | Miller et al. |
| 9,619,105 B1 | 4/2017 | Dal Mutto |
| 9,672,588 B1 | 6/2017 | Doucette et al. |
| 9,681,112 B2 | 6/2017 | Son |
| 9,684,372 B2 | 6/2017 | Xun et al. |
| 9,704,230 B2 | 7/2017 | Hofmann et al. |
| 9,734,402 B2 | 8/2017 | Jang et al. |
| 9,778,814 B2 | 10/2017 | Ambrus et al. |
| 9,779,512 B2 | 10/2017 | Tomlin et al. |
| 9,851,866 B2 | 12/2017 | Goossens et al. |
| 9,864,498 B2 | 1/2018 | Olsson et al. |
| 9,870,130 B2 | 1/2018 | Schubert et al. |
| 9,886,087 B1 | 2/2018 | Wald et al. |
| 9,911,232 B2 | 3/2018 | Shapira et al. |
| 9,933,833 B2 | 4/2018 | Tu et al. |
| 9,933,937 B2 | 4/2018 | Lemay et al. |
| 9,934,614 B2 | 4/2018 | Ramsby et al. |
| 9,952,042 B2 | 4/2018 | Abovitz et al. |
| 10,026,209 B1 | 7/2018 | Dagley et al. |
| 10,049,460 B2 | 8/2018 | Romano et al. |
| 10,101,803 B2 | 10/2018 | Faaborg et al. |
| 10,175,483 B2 | 1/2019 | Salter et al. |
| 10,192,347 B2 | 1/2019 | Bui et al. |
| 10,203,764 B2 | 2/2019 | Katz et al. |
| 10,210,664 B1 | 2/2019 | Chaturvedi |
| 10,307,671 B2 | 6/2019 | Barney et al. |
| 10,318,034 B1 | 6/2019 | Hauenstein et al. |
| 10,339,721 B1 | 7/2019 | Dascola et al. |
| 10,353,532 B1 | 7/2019 | Holz et al. |
| 10,373,381 B2 | 8/2019 | Nuernberger et al. |
| 10,394,320 B2 | 8/2019 | George-Svahn et al. |
| 10,401,958 B2 | 9/2019 | Peana et al. |
| 10,424,124 B2 | 9/2019 | Takahashi |
| 10,448,189 B2 | 10/2019 | Link |
| 10,484,641 B2 | 11/2019 | Zhou et al. |
| 10,488,941 B2 | 11/2019 | Lam et al. |
| 10,499,044 B1 | 12/2019 | Giokaris et al. |

(56) References Cited

U.S. PATENT DOCUMENTS

| | | | |
|---|---|---|---|
| 10,534,439 B2 | 1/2020 | Raffa et al. |
| 10,545,584 B2 | 1/2020 | Tome et al. |
| 10,564,714 B2 | 2/2020 | Marggraff et al. |
| 10,573,067 B1 | 2/2020 | Naik et al. |
| 10,642,368 B2 | 5/2020 | Chen |
| 10,645,332 B2 | 5/2020 | Zhang |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,691,216 B2 | 6/2020 | Geisner et al. |
| 10,698,562 B1 | 6/2020 | Zhou et al. |
| 10,699,488 B1 | 6/2020 | Terrano |
| 10,701,661 B1 | 6/2020 | Coelho et al. |
| 10,708,965 B1 | 7/2020 | Subramanian et al. |
| 10,712,900 B2 | 7/2020 | Osman et al. |
| 10,732,721 B1 | 8/2020 | Clements |
| 10,754,434 B2 | 8/2020 | Hall et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,852,814 B1 | 12/2020 | Caron et al. |
| 10,861,242 B2 | 12/2020 | Lacey et al. |
| 10,885,701 B1 | 1/2021 | Patel |
| 10,890,967 B2 | 1/2021 | Stellmach et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,956,724 B1 | 3/2021 | Terrano |
| 10,983,663 B2 | 4/2021 | Iglesias |
| 11,003,308 B1 | 5/2021 | Dryer et al. |
| 11,017,611 B1 | 5/2021 | Mount et al. |
| 11,023,035 B1 | 6/2021 | Atlas et al. |
| 11,055,920 B1 | 7/2021 | Bramwell et al. |
| 11,079,995 B1 | 8/2021 | Hulbert et al. |
| 11,082,463 B2 | 8/2021 | Felman |
| 11,095,857 B1 | 8/2021 | Krol et al. |
| 11,112,875 B1 | 9/2021 | Zhou et al. |
| 11,126,850 B1 | 9/2021 | Ichim et al. |
| 11,138,798 B2 | 10/2021 | Paul et al. |
| 11,146,909 B1 | 10/2021 | Pinto et al. |
| 11,175,791 B1 | 11/2021 | Patnaikuni et al. |
| 11,176,755 B1 | 11/2021 | Tichenor et al. |
| 11,199,898 B2 | 12/2021 | Blume et al. |
| 11,200,742 B1 | 12/2021 | Post et al. |
| 11,204,678 B1 | 12/2021 | Baker et al. |
| 11,232,643 B1 | 1/2022 | Stevens et al. |
| 11,243,734 B2 | 2/2022 | Boissière et al. |
| 11,249,556 B1 | 2/2022 | Schwarz et al. |
| 11,262,885 B1 | 3/2022 | Burckel |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,343,420 B1 | 5/2022 | Herz et al. |
| 11,347,319 B2 | 5/2022 | Goel et al. |
| 11,348,300 B2 | 5/2022 | Zimmermann et al. |
| 11,379,033 B2 | 7/2022 | O'Hern et al. |
| 11,380,323 B2 | 7/2022 | Shin et al. |
| 11,382,611 B1 * | 7/2022 | Westling .............. A61F 2/0811 |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,720,171 B2 | 8/2023 | Pastrana Vicente et al. |
| 11,726,577 B2 | 8/2023 | Katz |
| 11,730,226 B2 | 8/2023 | Stolarz et al. |
| 11,733,824 B2 * | 8/2023 | Iskandar .............. G06F 3/016 |
| | | | 715/728 |
| 11,762,457 B1 * | 9/2023 | Ikkai .................. G06V 40/174 |
| | | | 345/156 |
| 11,762,473 B2 | 9/2023 | Cipoletta et al. |
| 11,768,544 B2 | 9/2023 | Schwarz et al. |
| 11,847,748 B2 | 12/2023 | Liu et al. |
| 11,861,136 B1 | 1/2024 | Faulkner et al. |
| 11,875,013 B2 | 1/2024 | Lemay et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,954,242 B2 | 4/2024 | Dascola et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 11,995,301 B2 * | 5/2024 | Hylak ................ G06F 3/04815 |
| 12,032,803 B2 | 7/2024 | Pastrana Vicente et al. |
| 12,062,127 B2 | 8/2024 | Park et al. |
| 12,099,653 B2 | 9/2024 | Chawda et al. |
| 12,099,695 B1 | 9/2024 | Smith et al. |
| 12,112,011 B2 | 10/2024 | Smith et al. |
| 12,113,948 B1 | 10/2024 | Smith et al. |
| 12,118,200 B1 | 10/2024 | Shutzberg et al. |
| 12,154,236 B1 | 11/2024 | Herman et al. |
| 12,236,546 B1 | 2/2025 | Lipton |
| 2001/0047250 A1 | 11/2001 | Schuller et al. |
| 2002/0015024 A1 | 2/2002 | Westerman et al. |
| 2002/0024675 A1 | 2/2002 | Foxlin |
| 2002/0030692 A1 | 3/2002 | Griesert |
| 2002/0044152 A1 | 4/2002 | Abbott et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0230912 A1 | 11/2004 | Clow et al. |
| 2004/0243926 A1 | 12/2004 | Trenbeath et al. |
| 2005/0062738 A1 | 3/2005 | Handley et al. |
| 2005/0073136 A1 | 4/2005 | Larsson et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0190059 A1 | 9/2005 | Wehrenberg |
| 2005/0198143 A1 | 9/2005 | Moody et al. |
| 2005/0216866 A1 | 9/2005 | Rosen et al. |
| 2005/0231532 A1 | 10/2005 | Suzuki et al. |
| 2005/0248299 A1 | 11/2005 | Chemel et al. |
| 2006/0017692 A1 | 1/2006 | Wehrenberg et al. |
| 2006/0033724 A1 | 2/2006 | Chaudhri et al. |
| 2006/0034590 A1 | 2/2006 | Teramoto |
| 2006/0080702 A1 | 4/2006 | Diez et al. |
| 2006/0156228 A1 | 7/2006 | Gallo et al. |
| 2006/0197753 A1 | 9/2006 | Hotelling |
| 2006/0283214 A1 | 12/2006 | Donadon et al. |
| 2007/0172112 A1 | 7/2007 | Paley et al. |
| 2008/0186255 A1 | 8/2008 | Cohen et al. |
| 2008/0211771 A1 | 9/2008 | Richardson |
| 2008/0222710 A1 | 9/2008 | Blagsvedt et al. |
| 2008/0310707 A1 | 12/2008 | Kansal et al. |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2010/0097375 A1 | 4/2010 | Tadaishi et al. |
| 2010/0115459 A1 | 5/2010 | Kinnunen et al. |
| 2010/0185949 A1 | 7/2010 | Jaeger |
| 2010/0188503 A1 | 7/2010 | Tsai et al. |
| 2010/0188572 A1 | 7/2010 | Card |

(56) References Cited

U.S. PATENT DOCUMENTS

| | | |
|---|---|---|
| 2010/0269145 A1 | 10/2010 | Ingrassia et al. |
| 2010/0293504 A1 | 11/2010 | Hachiya |
| 2010/0302245 A1 | 12/2010 | Best |
| 2010/0328432 A1 | 12/2010 | Tanaka |
| 2010/0332196 A1 | 12/2010 | Fisker et al. |
| 2011/0018895 A1 | 1/2011 | Buzyn et al. |
| 2011/0018896 A1 | 1/2011 | Buzyn et al. |
| 2011/0029185 A1 | 2/2011 | Aoki et al. |
| 2011/0142321 A1 | 6/2011 | Huffman |
| 2011/0164163 A1 | 7/2011 | Bilbrey et al. |
| 2011/0169927 A1 | 7/2011 | Mages et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | Laflèche et al. |
| 2011/0304557 A1 | 12/2011 | Wilburn et al. |
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0066638 A1 | 3/2012 | Ohri |
| 2012/0086624 A1 | 4/2012 | Thompson et al. |
| 2012/0170089 A1 | 7/2012 | Kim et al. |
| 2012/0170840 A1 | 7/2012 | Caruso et al. |
| 2012/0194547 A1 | 8/2012 | Johnson et al. |
| 2012/0223885 A1 | 9/2012 | Perez |
| 2012/0249741 A1 | 10/2012 | Maciocci et al. |
| 2012/0256956 A1 | 10/2012 | Kasahara |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0290401 A1 | 11/2012 | Neven |
| 2012/0304087 A1 | 11/2012 | Walkin et al. |
| 2013/0010062 A1 | 1/2013 | Redmann |
| 2013/0088516 A1 | 4/2013 | Ota et al. |
| 2013/0093727 A1 | 4/2013 | Eriksson et al. |
| 2013/0127850 A1 | 5/2013 | Bindon |
| 2013/0148850 A1 | 6/2013 | Matsuda et al. |
| 2013/0169533 A1 | 7/2013 | Jahnke |
| 2013/0211843 A1 | 8/2013 | Clarkson |
| 2013/0222227 A1 | 8/2013 | Johansson et al. |
| 2013/0222410 A1 | 8/2013 | Kameyama et al. |
| 2013/0229345 A1 | 9/2013 | Day et al. |
| 2013/0232430 A1 | 9/2013 | Reitan |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0335301 A1 | 12/2013 | Wong et al. |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0028548 A1 | 1/2014 | Bychkov et al. |
| 2014/0040832 A1 | 2/2014 | Regelous |
| 2014/0063058 A1 | 3/2014 | Fialho et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0104206 A1 | 4/2014 | Anderson |
| 2014/0108942 A1 | 4/2014 | Freeman et al. |
| 2014/0114845 A1 | 4/2014 | Rogers et al. |
| 2014/0125584 A1 | 5/2014 | Xun et al. |
| 2014/0125585 A1 | 5/2014 | Song et al. |
| 2014/0129990 A1 | 5/2014 | Xin et al. |
| 2014/0132499 A1 | 5/2014 | Schwesinger et al. |
| 2014/0132633 A1 | 5/2014 | Fekete et al. |
| 2014/0164928 A1 | 6/2014 | Kim |
| 2014/0168267 A1 | 6/2014 | Kim et al. |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247208 A1 | 9/2014 | Henderek et al. |
| 2014/0258942 A1 | 9/2014 | Kutliroff et al. |
| 2014/0267046 A1 | 9/2014 | Ellsworth et al. |
| 2014/0267400 A1 | 9/2014 | Mabbutt et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0320404 A1 | 10/2014 | Kasahara |
| 2014/0331187 A1 | 11/2014 | Hicks et al. |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375541 A1 | 12/2014 | Nister et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0131850 A1 | 5/2015 | Qvarfordt |
| 2015/0135108 A1 | 5/2015 | Pope et al. |
| 2015/0145887 A1 | 5/2015 | Forutanpour et al. |
| 2015/0149929 A1 | 5/2015 | Shepherd et al. |
| 2015/0153833 A1 | 6/2015 | Pinault et al. |
| 2015/0169506 A1 | 6/2015 | Leventhal et al. |
| 2015/0177937 A1 | 6/2015 | Poletto et al. |
| 2015/0193982 A1 | 7/2015 | Mihelich et al. |
| 2015/0205106 A1 | 7/2015 | Norden |
| 2015/0220152 A1 | 8/2015 | Tait et al. |
| 2015/0221132 A1 | 8/2015 | Kruglick |
| 2015/0242095 A1 | 8/2015 | Sonnenberg |
| 2015/0254905 A1 | 9/2015 | Ramsby et al. |
| 2015/0262428 A1 | 9/2015 | Tatzgern et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026253 A1 | 1/2016 | Bradski et al. |
| 2016/0041391 A1 | 2/2016 | Van et al. |
| 2016/0050642 A1 | 2/2016 | Brown et al. |
| 2016/0062636 A1 | 3/2016 | Jung et al. |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |

(56) References Cited

U.S. PATENT DOCUMENTS

| | | |
|---|---|---|
| 2016/0179336 A1 | 6/2016 | Ambrus et al. |
| 2016/0189426 A1 | 6/2016 | Thomas et al. |
| 2016/0193104 A1 | 7/2016 | Du |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0291922 A1 | 10/2016 | Montgomerie et al. |
| 2016/0306434 A1 | 10/2016 | Ferrin |
| 2016/0309081 A1 | 10/2016 | Frahm et al. |
| 2016/0313890 A1 | 10/2016 | Walline et al. |
| 2016/0334940 A1 | 11/2016 | Kandadai et al. |
| 2016/0350973 A1 | 12/2016 | Shapira et al. |
| 2016/0370858 A1 | 12/2016 | Leppänen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-Svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0287225 A1 | 10/2017 | Powderly et al. |
| 2017/0302903 A1 | 10/2017 | Ng et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0024681 A1 | 1/2018 | Bernstein et al. |
| 2018/0045963 A1 | 2/2018 | Hoover et al. |
| 2018/0046363 A1 | 2/2018 | Miller et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095634 A1 | 4/2018 | Alexander |
| 2018/0095636 A1 | 4/2018 | Valdivia et al. |
| 2018/0095649 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2019/0012060 A1 | 1/2019 | Moore et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0244434 A1 | 8/2019 | Pahud et al. |

(56) References Cited

U.S. PATENT DOCUMENTS

| | | |
|---|---|---|
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0333278 A1 | 10/2019 | Palangie et al. |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0117213 A1 | 4/2020 | Tian et al. |
| 2020/0126291 A1 | 4/2020 | Nguyen et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0267326 A1 | 8/2020 | Yim |
| 2020/0272303 A1 | 8/2020 | Jia et al. |
| 2020/0286299 A1 | 9/2020 | Wang et al. |
| 2020/0318955 A1 | 10/2020 | Sharapov et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0356221 A1 | 11/2020 | Behzadi et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0410960 A1 | 12/2020 | Saito et al. |
| 2021/0011556 A1 | 1/2021 | Atlas et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1* | 4/2021 | Faulkner ............ G06F 3/04883 |
| 2021/0097766 A1 | 4/2021 | Palangie et al. |
| 2021/0097776 A1* | 4/2021 | Faulkner ................ G06F 3/167 |
| 2021/0102820 A1 | 4/2021 | Le et al. |
| 2021/0125414 A1 | 4/2021 | Berkebile |
| 2021/0132687 A1 | 5/2021 | Luo et al. |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |
| 2021/0191600 A1 | 6/2021 | Lemay et al. |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0279967 A1 | 9/2021 | Gernoth et al. |
| 2021/0286502 A1 | 9/2021 | Lemay et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0312684 A1 | 10/2021 | Zimmermann et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0358294 A1 | 11/2021 | Parashar et al. |
| 2021/0365108 A1 | 11/2021 | Burns et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2022/0011577 A1 | 1/2022 | Lawver et al. |
| 2022/0011855 A1 | 1/2022 | Hazra et al. |
| 2022/0012002 A1 | 1/2022 | Bar-Zeev et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0091722 A1 | 3/2022 | Faulkner et al. |
| 2022/0091723 A1 | 3/2022 | Faulkner et al. |

(56) References Cited

U.S. PATENT DOCUMENTS

| | | |
|---|---|---|
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121275 A1 | 4/2022 | Balaji et al. |
| 2022/0121344 A1 | 4/2022 | Pastrana Vicente et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155853 A1 | 5/2022 | Fan et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0253125 A1 | 8/2022 | Wallen et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'Leary et al. |
| 2022/0303680 A1 | 9/2022 | Ahmed et al. |
| 2022/0311950 A1 | 9/2022 | Ith et al. |
| 2022/0317776 A1 | 10/2022 | Sundstrom et al. |
| 2022/0319453 A1 | 10/2022 | Llull et al. |
| 2022/0326837 A1 | 10/2022 | Dessero et al. |
| 2022/0335697 A1 | 10/2022 | Harding et al. |
| 2022/0350463 A1 | 11/2022 | Walkin et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0086766 A1 | 3/2023 | Olwal et al. |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0094522 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0315270 A1* | 10/2023 | Hylak ............... G06F 3/013 715/764 |
| 2023/0316634 A1* | 10/2023 | Chiu ................ G06F 3/017 345/156 |
| 2023/0316658 A1 | 10/2023 | Smith et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2024/0012530 A1 | 1/2024 | Lin et al. |
| 2024/0037886 A1 | 2/2024 | Chiu et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |

(56) References Cited

U.S. PATENT DOCUMENTS

| | | |
|---|---|---|
| 2024/0103676 A1 | 3/2024 | Pastrana Vicente et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0119682 A1 | 4/2024 | Rudman et al. |
| 2024/0135612 A1 | 4/2024 | Hold-Geoffroy et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0256032 A1 | 8/2024 | Holder et al. |
| 2024/0265656 A1 | 8/2024 | Victor-Faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0302948 A1 | 9/2024 | Hylak et al. |
| 2024/0310971 A1 | 9/2024 | Kawashima et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1* | 3/2025 | Rickwald ............... G06F 3/012 |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |
| 2025/0199656 A1 | 6/2025 | Lipton et al. |
| 2025/0200901 A1 | 6/2025 | Ren et al. |
| 2025/0209744 A1 | 6/2025 | Piemonte et al. |
| 2025/0209753 A1 | 6/2025 | Piemonte et al. |
| 2025/0224811 A1 | 7/2025 | Lindmeier et al. |

FOREIGN PATENT DOCUMENTS

| | | |
|---|---|---|
| CN | 104714771 A | 6/2015 |
| CN | 104981681 A | 10/2015 |
| CN | 105264461 A | 1/2016 |
| CN | 105264478 A | 1/2016 |
| CN | 106990838 A | 7/2017 |
| CN | 108519818 A | 9/2018 |
| CN | 108633307 A | 10/2018 |
| CN | 110413171 A | 11/2019 |
| CN | 110476142 A | 11/2019 |
| CN | 110543230 A | 12/2019 |
| CN | 110673718 A | 1/2020 |
| CN | 111580652 A | 8/2020 |
| CN | 111641843 A | 9/2020 |
| CN | 111913565 A | 11/2020 |
| CN | 112068757 A | 12/2020 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020128536 A1 | 5/2021 |
| EP | 1562021 A1 | 8/2005 |
| EP | 2393056 A1 | 12/2011 |
| EP | 2458486 A1 | 5/2012 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |
| EP | 3654147 A1 | 5/2020 |
| EP | 4155867 A1 | 3/2023 |
| EP | 3688726 B1 | 8/2023 |
| GB | 2540791 A | 2/2017 |
| JP | H06-4596 A | 1/1994 |
| JP | H10-51711 A | 2/1998 |
| JP | H10-78845 A | 3/1998 |
| JP | H11-289555 A | 10/1999 |
| JP | 2005-215144 A | 8/2005 |
| JP | 2005-333524 A | 12/2005 |
| JP | 2006-4093 A | 1/2006 |
| JP | 2006-107048 A | 4/2006 |
| JP | 2006-146803 A | 6/2006 |
| JP | 2006-295236 A | 10/2006 |
| JP | 2011-203880 A | 10/2011 |
| JP | 2012-234550 A | 11/2012 |
| JP | 2013-178639 A | 9/2013 |
| JP | 2013-196158 A | 9/2013 |

(56) References Cited

FOREIGN PATENT DOCUMENTS

| | | |
|---|---|---|
| JP | 2013-254358 A | 12/2013 |
| JP | 2013-257716 A | 12/2013 |
| JP | 2014-21565 A | 2/2014 |
| JP | 2014-59840 A | 4/2014 |
| JP | 2014-71663 A | 4/2014 |
| JP | 2014-99184 A | 5/2014 |
| JP | 2014-514652 A | 6/2014 |
| JP | 2014-514653 A | 6/2014 |
| JP | 2015-56173 A | 3/2015 |
| JP | 2015-515040 A | 5/2015 |
| JP | 2015-118332 A | 6/2015 |
| JP | 2016-96513 A | 5/2016 |
| JP | 2016-194744 A | 11/2016 |
| JP | 2017-27206 A | 2/2017 |
| JP | 2017-58528 A | 3/2017 |
| JP | 2017-126009 A | 7/2017 |
| JP | 2017-531221 A | 10/2017 |
| JP | 2018-5516 A | 1/2018 |
| JP | 2018-5517 A | 1/2018 |
| JP | 2018-41477 A | 3/2018 |
| JP | 2018-514005 A | 5/2018 |
| JP | 2018-88118 A | 6/2018 |
| JP | 2018-101019 A | 6/2018 |
| JP | 2018-106499 A | 7/2018 |
| JP | 6438869 B2 | 12/2018 |
| JP | 2019-40333 A | 3/2019 |
| JP | 2019-169154 A | 10/2019 |
| JP | 2019-175449 A | 10/2019 |
| JP | 2019-527881 A | 10/2019 |
| JP | 2019-532382 A | 11/2019 |
| JP | 2019-536131 A | 12/2019 |
| JP | 2020-503595 A | 1/2020 |
| JP | 2020-86913 A | 6/2020 |
| JP | 2022-53334 A | 4/2022 |
| JP | 2022-175629 A | 11/2022 |
| JP | 2023-52278 A | 4/2023 |
| KR | 10-2011-0017236 A | 2/2011 |
| KR | 10-2014-0097654 A | 8/2014 |
| KR | 10-2016-0012139 A | 2/2016 |
| KR | 10-2017-0027240 A | 3/2017 |
| KR | 10-2018-0102171 A | 9/2018 |
| KR | 10-2019-0100957 A | 8/2019 |
| KR | 10-2020-0010296 A | 1/2020 |
| KR | 10-2020-0035103 A | 4/2020 |
| KR | 10-2020-0110788 A | 9/2020 |
| KR | 10-2020-0135496 A | 12/2020 |
| KR | 10-2021-0083016 A | 7/2021 |
| WO | 2010/026519 A1 | 3/2010 |
| WO | 2012/145180 A1 | 10/2012 |
| WO | 2013/169849 A2 | 11/2013 |
| WO | 2014/105276 A1 | 7/2014 |
| WO | 2014/203301 A1 | 12/2014 |
| WO | 2015/130150 A1 | 9/2015 |
| WO | 2015/192117 A1 | 12/2015 |
| WO | 2016/118344 A1 | 7/2016 |
| WO | 2017/024142 A1 | 2/2017 |
| WO | 2017/088487 A1 | 6/2017 |
| WO | 2018/046957 A2 | 3/2018 |
| WO | 2018/090060 A1 | 5/2018 |
| WO | 2018/106299 A1 | 6/2018 |
| WO | 2018/175735 A1 | 9/2018 |
| WO | 2019/067902 A1 | 4/2019 |
| WO | 2019/074771 A1 | 4/2019 |
| WO | 2019/142560 A1 | 7/2019 |
| WO | 2019/172678 A1 | 9/2019 |
| WO | 2019/213111 A1 | 11/2019 |
| WO | 2019/217163 A1 | 11/2019 |
| WO | 2020/066682 A1 | 4/2020 |
| WO | 2020/121483 A1 | 6/2020 |
| WO | 2020/179027 A1 | 9/2020 |
| WO | 2020/247256 A1 | 12/2020 |
| WO | 2021/061349 A1 | 4/2021 |
| WO | 2021/061351 A1 | 4/2021 |
| WO | 2021/133053 A1 | 7/2021 |
| WO | 2021/173839 A1 | 9/2021 |
| WO | 2021/202783 A1 | 10/2021 |
| WO | 2022/046340 A1 | 3/2022 |
| WO | 2022/055821 A1 | 3/2022 |
| WO | 2022/055822 A1 | 3/2022 |
| WO | 2022/066399 A1 | 3/2022 |
| WO | 2022/066535 A2 | 3/2022 |
| WO | 2022/067075 A1 | 3/2022 |
| WO | 2022/067343 A2 | 3/2022 |
| WO | 2022/072187 A2 | 4/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2022/192040 A1 | 9/2022 |
| WO | 2022/208797 A1 | 10/2022 |
| WO | 2022/225795 A1 | 10/2022 |
| WO | 2023/043646 A1 | 3/2023 |
| WO | 2023/096940 A2 | 6/2023 |
| WO | 2023/141535 A1 | 7/2023 |

OTHER PUBLICATIONS

Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Final Office Action received for U.S. Appl. No. 17/659,147, mailed on Oct. 4, 2023, 17 pages.
International Search Report for PCT Application No. PCT/US2022/076608, mailed Feb. 24, 2023, 8 pages.
International Search Report received for PCT Application No. PCT/US2022/076719, mailed on Mar. 3, 2023, 8 pages.
Yamada, Yoshihiro, "How to generate a modal window with ModalPopup control", Available online at: <http://web.archive.org/web/20210920015801/https://atmarkit.itmedia.co.jp/fdotnet/dotnettips/580aspajaxmodalpopup/aspajaxmodalpopup.html> , Sep. 20, 2021 [Search Date Aug. 22, 2023] (1 page of English Abstract, 7 pages of Official Copy Submitted). See attached Communication 37 CFR § 1.98(a)(3).
International Search Report received for PCT Patent Application No. PCT/US2021/071518, mailed on Feb. 25, 2022, 7 pages.
International Search Report received for PCT Patent Application No. PCT/US2021/071596, mailed on Apr. 8, 2022, 7 pages.
International Search Report received for PCT Patent Application No. PCT/US2022/071704, mailed on Aug. 26, 2022, 6 pages.
Non-Final Office Action received for U.S. Appl. No. 17/479,791, mailed on May 11, 2022, 18 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 18/336,770, mailed on Jun. 5, 2024, 12 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/650,775, mailed on Jan. 25, 2024, 10 pages.
Notice of Allowance received for U.S. Appl. No. 17/650,775, mailed on Sep. 18, 2023, 10 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.

(56) References Cited

OTHER PUBLICATIONS

Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/933,707, mailed on Mar. 6, 2024, 9 pages.
Notice of Allowance received for U.S. Appl. No. 18/182,304, mailed on Jan. 24, 2024, 9 pages.
Notice of Allowance received for U.S. Appl. No. 18/182,304, mailed on Oct. 2, 2023, 9 pages.
Simple Modal Window With Background Blur Effect, Available online at: <http://web.archive.org/web/20160313233427/https://www.cssscript.com/simple-modal-window-with-background-blur-effect/ > , Mar. 13, 2016, 5 pages.
Corrected Notice of Allowability received for U.S. Appl. No. 18/174,337, mailed on Jan. 15, 2025, 2 pages.
European Search Report received for European Patent Application No. 21801378.7, mailed on Jul. 10, 2024, 5 pages.
Notice of Allowance received for U.S. Appl. No. 18/671,936, mailed on Jan. 15, 2025, 9 pages.
International Search Report received for PCT Patent Application No. PCT/US2024/013602, mailed on Apr. 29, 2024, 4 pages.
Notice of Allowance received for U.S. Appl. No. 17/933,707, mailed on Jun. 28, 2024, 8 pages.
Notice of Allowance received for U.S. Appl. No. 18/174,337, mailed on Jan. 2, 2025, 8 pages.
Notice of Allowance received for U.S. Appl. No. 18/336,770, mailed on Nov. 29, 2024, 9 pages.
Notice of Allowance received for U.S. Appl. No. 18/668,032, mailed on Jan. 16, 2025, 9 pages.
Extended European Search Report received for European Patent Application No. 25179367.5, mailed on Jul. 1, 2025, 10 pages.
Extended European Search Report received for European Patent Application No. 25169060.8, mailed on May 12, 2025, 10 pages.
Extended European Search Report received for European Patent Application No. 25169059.0, mailed on May 12, 2025, 11 pages.
Extended European Search Report received for European Patent Application No. 25174955.2, mailed on Jun. 25, 2025, 12 pages.
Non-Final Office Action received for U.S. Appl. No. 18/473,198, mailed on Jul. 15, 2025, 13 pages.
Non-Final Office Action received for U.S. Appl. No. 18/473,197, mailed on May 1, 2025, 14 pages.
Non-Final Office Action received for U.S. Appl. No. 18/896,227, mailed on May 29, 2025, 14 pages.
Notice of Allowance received for U.S. Appl. No. 18/322,469, mailed on Jul. 7, 2025, 14 pages.
Notice of Allowance received for U.S. Appl. No. 18/322,469, mailed on Mar. 19, 2025, 14 pages.
Non-Final Office Action received for U.S. Appl. No. 18/473,187, mailed on May 16, 2025, 15 pages.
Non-Final Office Action received for U.S. Appl. No. 18/473,195, mailed on Jun. 27, 2025, 16 pages.
Non-Final Office Action received for U.S. Appl. No. 18/467,523, mailed on Jun. 17, 2025, 19 pages.
Non-Final Office Action received for U.S. Appl. No. 18/471,729, mailed on Jun. 17, 2025, 19 pages.
Corrected Notice of Allowability received for U.S. Appl. No. 18/146,234, mailed on Mar. 20, 2025, 2 pages.
Corrected Notice of Allowability received for U.S. Appl. No. 18/473,180, mailed on Apr. 1, 2025, 2 pages.
Corrected Notice of Allowability received for U.S. Appl. No. 18/988,115, mailed on Jul. 15, 2025, 2 pages.
Corrected Notice of Allowance received for U.S. Appl. No. 18/424,644, mailed on Jun. 24, 2025, 2 pages.
Final Office Action received for U.S. Appl. No. 18/473,196, mailed on Jul. 16, 2025, 20 pages.
Non-Final Office Action received for U.S. Appl. No. 17/905,483, mailed on Jul. 15, 2025, 20 pages.
Non-Final Office Action received for U.S. Appl. No. 18/473,176, mailed on May 14, 2025, 23 pages.
Final Office Action received for U.S. Appl. No. 18/149,640, mailed on May 21, 2025, 24 pages.
Non-Final Office Action received for U.S. Appl. No. 18/174,403, mailed on Mar. 20, 2025, 26 pages.
Non-Final Office Action received for U.S. Appl. No. 18/317,890, mailed on Apr. 17, 2025, 26 pages.
Non-Final Office Action received for U.S. Appl. No. 18/327,844, mailed on Mar. 24, 2025, 27 pages.
Final Office Action received for U.S. Appl. No. 17/933,020, mailed on May 21, 2025, 28 pages.
Non-Final Office Action received for U.S. Appl. No. 18/317,886, mailed on Apr. 30, 2025, 34 pages.
Non-Final Office Action received for U.S. Appl. No. 18/473,260, mailed on Jun. 27, 2025, 35 pages.
European Search Report received for European Patent Application No. 22723527.2, mailed on May 12, 2025, 4 pages.
International Search Report received for PCT Patent Application No. PCT/US2023/074978, mailed on Apr. 4, 2024, 4 pages.
International Search Report received for PCT Patent Application No. PCT/US2024/012828, mailed on May 6, 2024, 4 pages.
International Search Report received for PCT Patent Application No. PCT/US2024/032109, mailed on Sep. 13, 2024, 4 pages.
International Search Report received for PCT Patent Application No. PCT/US2024/043470, mailed on Oct. 29, 2024, 4 pages.
Non-Final Office Action received for U.S. Appl. No. 17/202,034, mailed on Jun. 4, 2025, 40 pages.
Final Office Action received for U.S. Appl. No. 18/645,292, mailed on Jun. 2, 2025, 41 pages.
Non-Final Office Action received for U.S. Appl. No. 18/473,155, mailed on Jul. 10, 2025, 47 pages.
International Search Report received for PCT Patent Application No. PCT/US2023/074960, mailed on Feb. 12, 2024, 6 pages.
International Search Report received for PCT Patent Application No. PCT/US2024/032153, mailed on Nov. 11, 2024, 6 pages.
Notice of Allowance received for U.S. Appl. No. 18/152,656, mailed on Jun. 25, 2025, 6 pages.
Notice of Allowance received for U.S. Appl. No. 18/424,644, mailed on Jun. 11, 2025, 6 pages.
Extended European Search Report received for European Patent Application No. 24221722.2, mailed on Apr. 17, 2025, 7 pages.
International Search Report received for PCT Patent Application No. PCT/US2023/074973, mailed on Mar. 7, 2024, 7 pages.
Notice of Allowance received for U.S. Appl. No. 18/153,943, mailed on Jun. 17, 2025, 7 pages.
Notice of Allowance received for U.S. Appl. No. 18/988,115, mailed on Jun. 30, 2025, 7 pages.
Non-Final Office Action received for U.S. Appl. No. 18/882,622, mailed on May 22, 2025, 8 pages.
Notice of Allowance received for U.S. Appl. No. 18/473,182, mailed on Apr. 23, 2025, 8 pages.
Notice of Allowance received for U.S. Appl. No. 17/655,521, mailed on Apr. 16, 2025, 8 pages.
Notice of Allowance received for U.S. Appl. No. 18/896,227, mailed on Jul. 11, 2025, 8 pages.
Notice of Allowance received for U.S. Appl. No. 18/157,040, mailed on Jun. 24, 2025, 9 pages.
Notice of Allowance received for U.S. Appl. No. 18/471,850, mailed on Jun. 10, 2025, 9 pages.
Notice of Allowance received for U.S. Appl. No. 18/473,179, mailed on May 8, 2025, 9 pages.
Notice of Allowance received for U.S. Appl. No. 18/473,262, mailed on Jun. 10, 2025, 9 pages.
Notice of Allowance received for U.S. Appl. No. 18/515,188, mailed on Mar. 20, 2025, 9 pages.
Adding Environments, Available online at: https://manual.keyshot.com/manual/environments/adding-environments/, [retrieved on Jun. 9, 2023], 2 pages.
Applicant-Initiated Interview Summary received for U.S. Appl. No. 18/119,219, mailed on May 21, 2024, 3 pages.

(56) References Cited

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Corrected Notice of Allowability received for U.S. Appl. No. 17/448,875, mailed on Apr. 24, 2024, 4 pages.
Corrected Notice of Allowability received for U.S. Appl. No. 17/469,788, mailed on Feb. 12, 2025, 2 pages.
Corrected Notice of Allowability received for U.S. Appl. No. 17/932,999, mailed on Feb. 20, 2025, 2 pages.
Corrected Notice of Allowability received for U.S. Appl. No. 17/932,999, mailed on Jan. 23, 2025, 9 pages.
Corrected Notice of Allowability received for U.S. Appl. No. 17/935,095, mailed on Oct. 18, 2024, 3 pages.
Corrected Notice of Allowability received for U.S. Appl. No. 18/146,234, mailed on Feb. 6, 2025, 2 pages.
Corrected Notice of Allowability received for U.S. Appl. No. 18/154,757, mailed on Aug. 30, 2024, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 18/465,098, mailed on Mar. 13, 2024, 3 pages.
Corrected Notice of Allowance received for U.S. Appl. No. 17/407,675, mailed on Dec. 24, 2024, 2 pages.
Corrected Notice of Allowance received for U.S. Appl. No. 17/478,593, mailed on Dec. 21, 2022, 2 pages.
Corrected Notice of Allowance received for U.S. Appl. No. 18/119,219, mailed on Sep. 11, 2024, 2 pages.
Corrected Notice of Allowance received for U.S. Appl. No. 18/152,656, mailed on Dec. 20, 2024, 5 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
European Search Report received for European Patent Application No. 21791153.6, mailed on Mar. 22, 2024, 5 pages.
European Search Report received for European Patent Application No. 22703771.0, mailed on Feb. 26, 2025, 4 pages.
Ex Parte Quayle Action received for U.S. Appl. No. 17/655,347, mailed on Jul. 8, 2024, 6 pages.
Extended European Search Report received for European Patent Application No. 23197572.3, mailed on Feb. 19, 2024, 7 pages.
Extended European Search Report received for European Patent Application No. 24158036.4, mailed on Jul. 18, 2024, 12 pages.
Extended European Search Report received for European Patent Application No. 24159868.9, mailed on Oct. 9, 2024, 13 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Extended European Search Report received for European Patent Application No. 24190323.6, mailed on Dec. 12, 2024, 9 pages.
Extended European Search Report received for European Patent Application No. 24217335.9, mailed on Feb. 24, 2025, 8 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/202,034, mailed on Nov. 4, 2024, 50 pages.
Final Office Action received for U.S. Appl. No. 17/407,675, mailed on May 22, 2024, 18 pages.
Final Office Action received for U.S. Appl. No. 17/448,875, mailed on Mar. 16, 2023, 24 pages.
Final Office Action received for U.S. Appl. No. 17/469,788, mailed on Nov. 16, 2023, 24 pages.
Final Office Action received for U.S. Appl. No. 17/580,495, mailed on Feb. 12, 2025, 29 pages.
Final Office Action received for U.S. Appl. No. 17/580,495, mailed on May 13, 2024, 29 pages.
Final Office Action received for U.S. Appl. No. 17/655,521, mailed on Apr. 10, 2024, 18 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/327,844, mailed on Nov. 29, 2024, 25 pages.
Final Office Action received for U.S. Appl. No. 18/375,280, mailed on Jul. 12, 2024, 19 pages.
Final Office Action received for U.S. Appl. No. 18/473,196, mailed on Dec. 6, 2024, 22 pages.
Home | Virtual Desktop [online], Virtual Desktop, Available online at: <https://www.vrdesktop.net>, [retrieved on Jun. 29, 2023], 4 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Application No. PCT/US2022/076603, mailed on Jan. 9, 2023, 4 pages.
International Search Report received for PCT Application No. PCT/US2023/018213, mailed on Jul. 26, 2023, 6 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.

(56) References Cited

OTHER PUBLICATIONS

International Search Report received for PCT Application No. PCT/US2024/032456, mailed on Nov. 14, 2024, 6 pages.
International Search Report received for PCT Patent Application No. PCT/US2021/049520, mailed on Apr. 8, 2022, 8 pages.
International Search Report received for PCT Patent Application No. PCT/US2021/050948, mailed on Mar. 4, 2022, 6 pages.
International Search Report received for PCT Patent Application No. PCT/US2021/071595, mailed on Mar. 17, 2022, 7 pages.
International Search Report received for PCT Patent Application No. PCT/US2022/013208, mailed on Apr. 26, 2022, 7 pages.
International Search Report received for PCT Patent Application No. PCT/US2022/071208, mailed on Aug. 18, 2022, 9 pages.
International Search Report received for PCT Patent Application No. PCT/US2022/071228, mailed on Aug. 25, 2022, 6 pages.
International Search Report received for PCT Patent Application No. PCT/US2022/076808, mailed on Mar. 28, 2023, 6 pages.
International Search Report received for PCT Patent Application No. PCT/US2022/076985, mailed on Feb. 20, 2023, 5 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/060429, mailed on Jun. 28, 2023, 7 pages.
International Search Report received for PCT Patent Application No. PCT/US2023/060592, mailed on Jun. 14, 2023, 7 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 7 pages.
International Search Report received for PCT Patent Application No. PCT/US2023/074955, mailed on Feb. 1, 2024, 6 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.
International Search Report received for PCT Patent Application No. PCT/US2024/030661, mailed on Nov. 4, 2024, 5 pages.
International Search Report received for PCT Patent Application No. PCT/US2024/032140, mailed on Sep. 10, 2024, 4 pages.
International Search Report received for PCT Patent Application No. PCT/US2024/032423, mailed on Sep. 25, 2024, 5 pages.
International Search Report received for PCT Patent Application No. PCT/US2024/032455, mailed on Sep. 25, 2024, 4 pages.
International Search Report received for PCT Patent Application No. PCT/US2024/039190, mailed on Nov. 22, 2024, 5 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/12826654028126085 13>, [retrieved on Apr. 25, 2024], 2024, 1 page.
Light Manager, Available online at: https://manual.keyshot.com/manual/lighting/lighting-manager/, [retrieved on Jun. 9, 2023], 3 pages.
MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Non-Final Office Action received for U.S. Appl. No. 17/202,034, mailed on Jan. 19, 2024, 44 pages.
Non-Final Office Action received for U.S. Appl. No. 17/407,675, mailed on Sep. 11, 2023, 16 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/655,521, mailed on Aug. 23, 2023, 13 pages.
Non-Final Office Action received for U.S. Appl. No. 17/655,521, mailed on Nov. 27, 2024, 17 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/816,314, mailed on Jul. 6, 2023, 10 pages.
Non-Final Office Action received for U.S. Appl. No. 17/905,483, mailed on Mar. 27, 2024, 16 pages.
Non-Final Office Action received for U.S. Appl. No. 17/932,999, mailed on Feb. 23, 2024, 22 pages.
Non-Final Office Action received for U.S. Appl. No. 17/933,020, mailed on Jan. 30, 2025, 26 pages.
Non-Final Office Action received for U.S. Appl. No. 17/934,104, mailed on Mar. 25, 2024, 26 pages.
Non-Final Office Action received for U.S. Appl. No. 17/935,095, mailed on Jun. 22, 2023, 15 pages.
Non-Final Office Action received for U.S. Appl. No. 18/119,219, mailed on Mar. 28, 2024, 15 pages.
Non-Final Office Action received for U.S. Appl. No. 18/149,640, mailed on Jan. 15, 2025, 17 pages.
Non-Final Office Action received for U.S. Appl. No. 18/153,943, mailed on Dec. 31, 2024, 33 pages.
Non-Final Office Action received for U.S. Appl. No. 18/154,697, mailed on Nov. 24, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/298,994, mailed on Mar. 7, 2025, 26 pages.
Non-Final Office Action received for U.S. Appl. No. 18/304,290, mailed on Mar. 5, 2025, 111 pages.
Non-Final Office Action received for U.S. Appl. No. 18/317,893, mailed on Apr. 25, 2024, 18 pages.
Non-Final Office Action received for U.S. Appl. No. 18/322,469, mailed on Nov. 15, 2024, 34 pages.
Non-Final Office Action received for U.S. Appl. No. 18/327,844, mailed on May 17, 2024, 20 pages.
Non-Final Office Action received for U.S. Appl. No. 18/375,280, mailed on Nov. 27, 2024, 17 pages.
Non-Final Office Action received for U.S. Appl. No. 18/424,644, mailed on Jan. 29, 2025, 18 pages.
Non-Final Office Action received for U.S. Appl. No. 18/429,301, mailed on Jun. 12, 2024, 28 pages.
Non-Final Office Action received for U.S. Appl. No. 18/473,196, mailed on Aug. 16, 2024, 21 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S. Appl. No. 18/988,115, mailed on Feb. 24, 2025, 40 pages.

(56) References Cited

OTHER PUBLICATIONS

Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/407,675, mailed on Aug. 20, 2024, 7 pages.
Notice of Allowance received for U.S. Appl. No. 18/154,757, mailed on Aug. 26, 2024, 12 pages.
Notice of Allowance received for U.S. Appl. No. 17/407,675, mailed on Dec. 11, 2024, 8 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/469,788, mailed on Feb. 5, 2025, 5 pages.
Notice of Allowance received for U.S. Appl. No. 17/469,788, mailed on Oct. 15, 2024, 7 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/655,347, mailed on Feb. 20, 2025, 7 pages.
Notice of Allowance received for U.S. Appl. No. 17/655,347, mailed on Oct. 9, 2024, 7 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 17/814,462, mailed on Feb. 26, 2025, 8 pages.
Notice of Allowance received for U.S. Appl. No. 17/816,314, mailed on Jan. 4, 2024, 6 pages.
Notice of Allowance received for U.S. Appl. No. 17/932,999, mailed on Sep. 12, 2024, 9 pages.
Notice of Allowance received for U.S. Appl. No. 17/935,095, mailed on Jul. 3, 2024, 9 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2024, 10 pages.
Notice of Allowance received for U.S. Appl. No. 18/154,757, mailed on Jan. 23, 2025, 12 pages.
Notice of Allowance received for U.S. Appl. No. 18/154,757, mailed on May 10, 2024, 12 pages.
Notice of Allowance received for U.S. Appl. No. 18/317,893, mailed on Jan. 13, 2025, 11 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Notice of Allowance received for U.S. Appl. No. 18/473,180, mailed on Aug. 22, 2024, 13 pages.
Notice of Allowance received for U.S. Appl. No. 18/473,180, mailed on Jan. 2, 2025, 12 pages.
Notice of Allowance received for U.S. Appl. No. 18/515,188, mailed on Nov. 27, 2024, 9 pages.
Notice of Allowance received for U.S. Appl. No. 18/671,936, mailed on Mar. 5, 2025, 7 pages.
Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.
POP 2 3D Scanner (Infrared Light I Precision 0.05mm), REVPOINT [online]. Revopoint 3D, <URL: https://global.revopoint3d.com/products/face-3d-scanner-pop2 ?_ ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Restriction Requirement received for U.S. Appl. No. 17/905,483, mailed on Dec. 7, 2023, 7 pages.
Restriction Requirement received for U.S. Appl. No. 17/932,999, mailed on Oct. 3, 2023, 6 pages.
Restriction Requirement received for U.S. Appl. No. 18/473,187, mailed on Dec. 30, 2024, 5 pages.
Search Report received for Chinese Patent Application No. 202310873465.7, mailed on Feb. 1, 2024, 5 pages (2 pages of English Translation and 3 pages of Official Copy).
Search Report received for United Kingdom Patent Application No. GB2210885.6, mailed on Jan. 27, 2023, 1 page.
Sharevox, PHORIA [online]. Phoria Pty Ltd, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.

(56) References Cited

OTHER PUBLICATIONS

Supplemental Notice of Allowance received for U.S. Appl. No. 18/515,188, mailed on Dec. 12, 2024, 2 pages.
VoxEdit Beta Tutorial—Introduction and How To Animate Voxel Creations, YouTube [online], Google LLC, Available Online at: <URL: https://www.youtube.com/watch?v=fqcArJWtyqM>, [retrieved on Apr. 25, 2024], 2024, 2 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.
Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.
Berard Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Capturing Reality, "Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.
Capturing Reality, "RealityCapture tutorial: Complete model in PPI", Youtube, https://www.youtube.com/watch?v=tw6wNNEbH_M, Oct. 14, 2021, 2 pages.
CAS and Chary XR, "Oculus Go & Your Phone As 2nd Controller !!—An Inexpensive Way To Play PC VR Games", posted on Mar. 8, 2019, https://www.youtube.com/watch?v=i_iRVaOkemw, 2019, 4 pages.
Chatterjee et al., "Gaze+Gesture: Expressive, Precise and Targeted Free-Space Interactions", ICMI '15, Nov. 9-13, 2015, 8 pages.
Choe et al., "Augmented-Reality-Based 3D Emotional Messenger for Dynamic User Communication with Smart Devices", Electronics, vol. 9, No. 1127, Jul. 10, 2020, 15 pages.

Dhakal et al., "SLAM-Share: Visual Simultaneous Localization and Mapping for Real-time Multi-user Augmented Reality", CoNEXT '22, Dec. 6-9, 2022, Roma, Italy, 14 pages.
Didehkhorshid et al., "Text Input in Virtual Reality Using a Tracked Drawing Tablet", HCII 2020, LNCS 12428, 2020, pp. 314-329.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Headmaster Introduction, "If You Can Move Your Head, You Can Move Your World", Retrieved from: <https://www.microsoft.com/buxtoncollection/a/pdf/HeadMaster%20Introduction.pdf>, Retrieved on Dec. 26, 2024, 4 pages.
Huang et al., "Proxy-Based Security Audit System for Remote Desktop Access", Computer Communications And Networks, ICCCN 2009. Proceedings of 18th International Conference On, IEEE, Piscataway, NJ, USA, Aug. 3, 2009, 5 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.
Kim et al., "Virtual Object Sizes for Efficient and Convenient Mid-air Manipulation", The Visual Computer, vol. 38, No. 9, Jul. 1, 2022, pp. 3463-3474.
Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.
Lin et al., "Towards Naturally Grabbing and Moving Objects in VR", IS&T International Symposium on Electronic Imaging and The Engineering Reality of Virtual Reality, 2016, 6 pages.
Lin et al., "Ubii: Physical World Interaction Through Augmented Reality", Publisher: IEEE, vol. 16, No. 3, DOI:10.1109/TMC.2016.2567378, May 13, 2016, pp. 872-885.
Locher et al., "Mobile Phone and Cloud—a Dream Team for 3D Reconstruction", 2016 IEEE Winter Conference on Applications of Computer Vision (WACV), 2016, pp. 1-8.
LOR CAS, "Reality Capture: Exporting Mesh", Youtube, https://www.youtube.com/watch?v=PdvTRa2B_s0, Dec. 10, 2020, 2 pages.
Macmostvideo, "A Beginner's Guide to Selecting Items On Your Mac (#1566)", Bibliographic Information, Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30, 2 pages.
Mcgill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
Mendes et al., "Mid-Air Interactions Above Stereoscopic Interactive Tables", IEEE Symposium on 3D User Interfaces (3DUI), Mar. 29-30, 2014, pp. 3-10.
Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Nunez Angulo et al., "Manual for the Design of Didactic Units in Augmented Reality Using the Cospaces EDU Application", 2020, 75 pages.
Pfeuffer et al., "Gaze + Pinch Interaction in Virtual Reality", In Proceedings of SUI '17, Brighton, United Kingdom, Oct. 16-17, 2017, pp. 99-108.
Pfeuffer et al., "Gaze and Touch Interaction on Tablets", UIST '16, Tokyo, Japan, ACM, Oct. 16-19, 2016, pp. 301-311.
Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.
Qi et al., "PointNet++: Deep Hierarchical Feature Learning on Point Sets in a Metric Space", Stanford University, Jun. 7, 2017, 14 pages.

(56) References Cited

OTHER PUBLICATIONS

Ran et al., "Multi-User Augmented Reality with Communication Efficient and Spatially Consistent Virtual Objects", CoNEXT '20, Dec. 1-4, 2020, Barcelona, Spain, 13 pages.

Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.

Schenk et al., "Spock: A Smooth Pursuit Oculomotor Control Kit", CHI'16 Extended Abstracts, San Jose, CA, USA, ACM, May 7-12, 2016, pp. 2681-2687.

Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.

Schuetz Markus, "Interactive Exploration of Point Clouds", Technische Universitat Wien, reposiTUm, https://doi.org/10.34726/hss.2021.91668, Mar. 8, 2021, 119 pages.

Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.

Strand Robin, "Surface Skeletons in Grids With Non-cubic Voxels", 2004 IEEE Xplore, Available Online at: <DOI: 10.1109/ICPR.2004.1334195>, Sep. 2004, 5 pages.

Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.

Tolle et al., "Design of Head Movement Controller System (HEMOCS) for Control Mobile Application through Head Pose Movement Detection", Retrieved from:<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/ijim.v10i3.5552>, Retrieved on Dec. 26, 2024, 2016, 5 pages.

Wood Tyriel, "The HoloLens 2 Tour!—Discovering a World of Holograms", You Tube [online]. YouTube, Mar. 23, 2021 [retrieved on Dec. 7, 2023], Retrieved from the Internet: <URL: https://www.youtube.com/watch?v=rMks7sMzPxI>, 2 pages.

Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.

Yue et al., "Optimal Region Selection for Stereoscopic Video Subtitle Insertion", IEEE Transactions on Circuits and Systems for Video Technology, vol. 28, No. 11, Nov. 2018, 13 pages.

\* cited by examiner

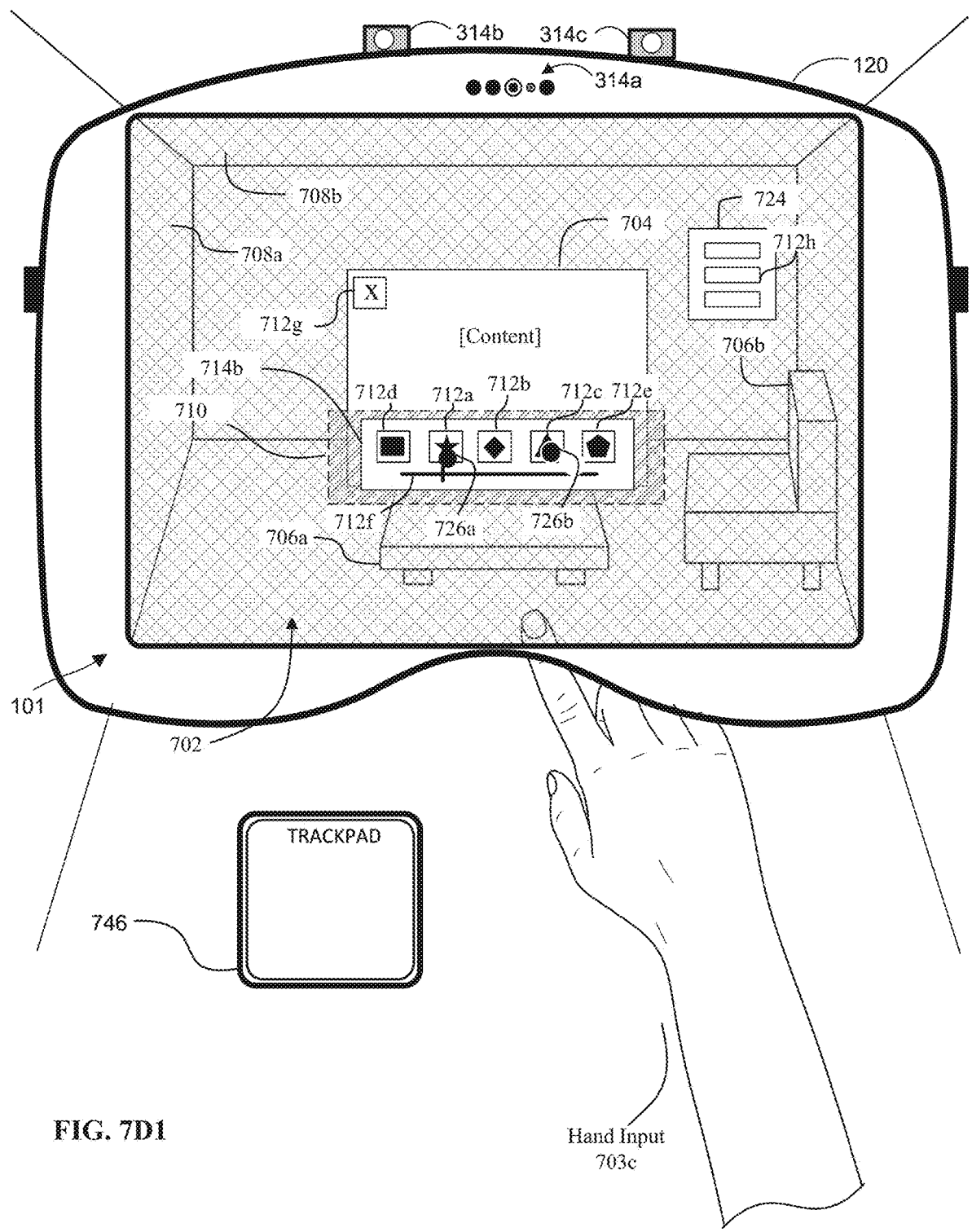
FIG. 7D1

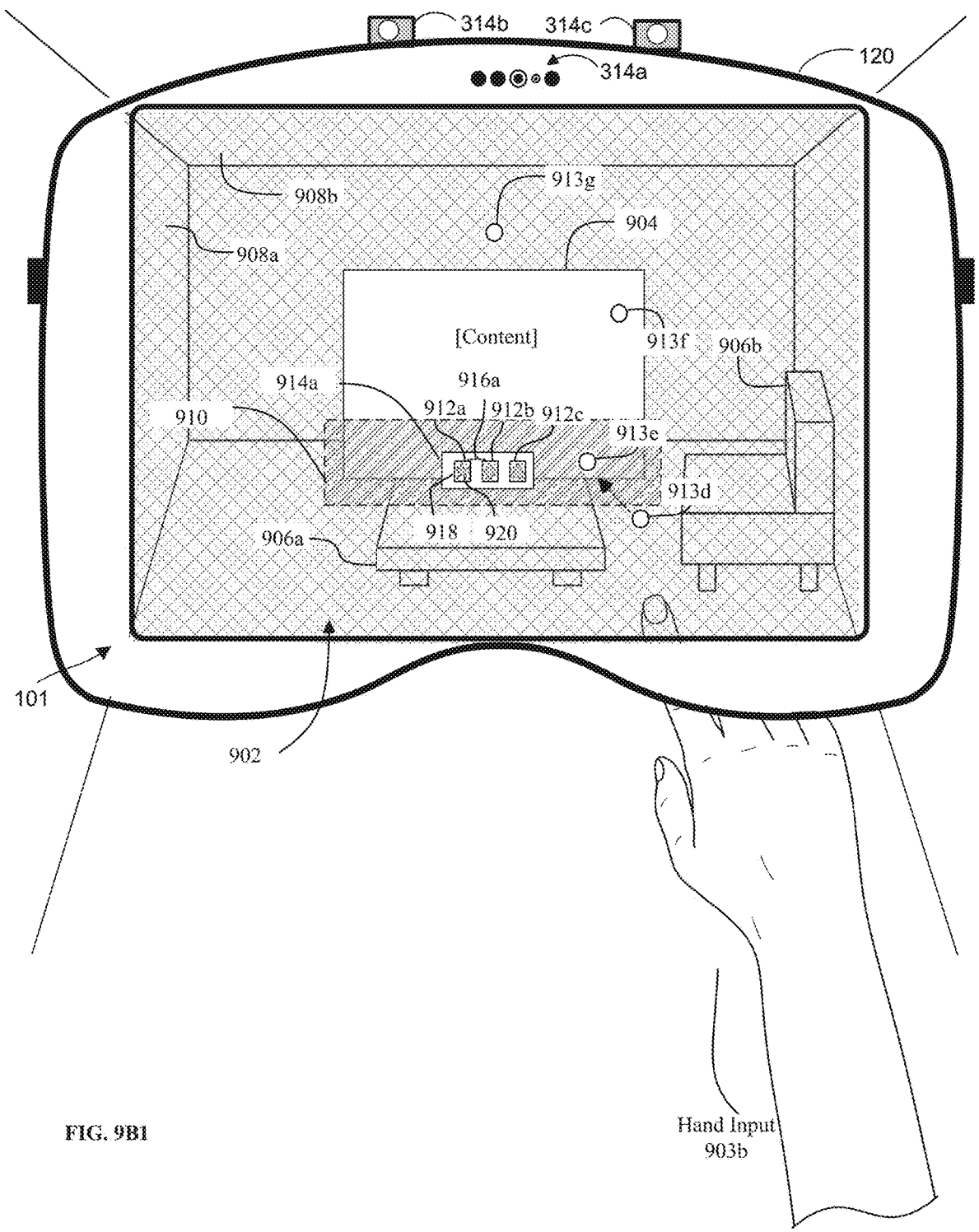
FIG. 9B1

DEVICES, METHODS, AND GRAPHICAL USER INTERFACES FOR DISPLAYING SETS OF CONTROLS IN RESPONSE TO GAZE AND/OR GESTURE INPUTS

CROSS-REFERENCE TO RELATED APPLICATIONS

This application claims the benefit of U.S. Provisional Application No. 63/482,274, filed Jan. 30, 2023, and U.S. Provisional Application No. 63/505,700, filed Jun. 1, 2023, the contents of which are herein incorporated by reference in their entireties for all purposes.

TECHNICAL FIELD

The present disclosure relates generally to computer systems that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
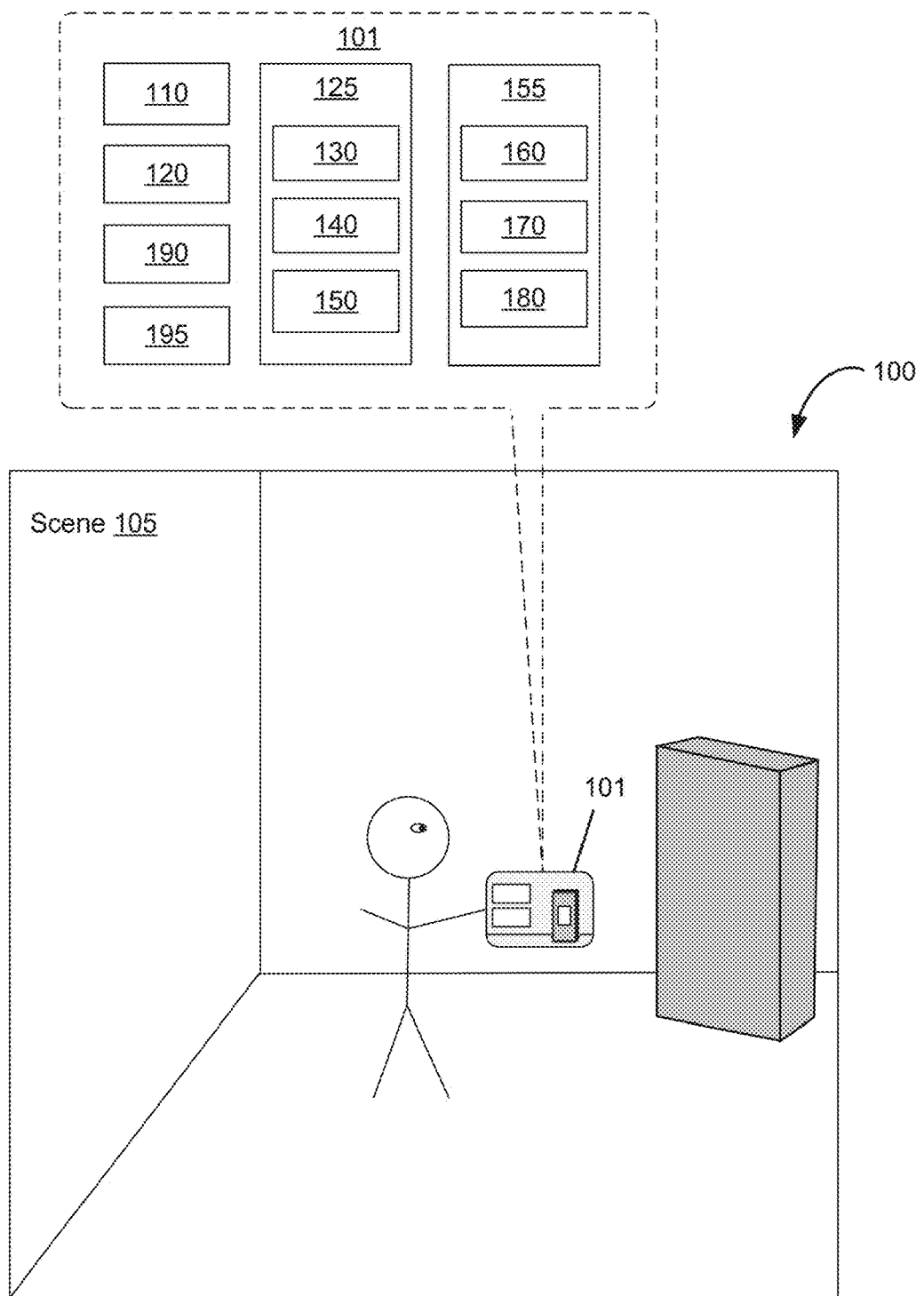
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

FIGS. 1A-6 provide a description of example computer systems for providing XR experiences to users (such as described below with respect to methods 800 and/or 1000). FIGS. 7A-7F illustrate example techniques for using gaze and/or gesture to control display of transport controls, in accordance with some embodiments. FIGS. 8A-8H depict a flow diagram of methods of using gaze and gesture to control display of transport controls, in accordance with various embodiments. The user interfaces in FIGS. 7A-7F are used to illustrate the processes in FIGS. 8A-8H. FIGS. 9A-9F illustrate example techniques for using gaze and/or gesture to control display of transport controls, in accordance with some embodiments. FIGS. 10A-10J depict a flow diagram of methods of using gaze and/or gesture to control display of transport controls, in accordance with various embodiments. The user interfaces in FIGS. 9A-9F are used to illustrate the processes in FIGS. 10A-10J.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof).

For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movment of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
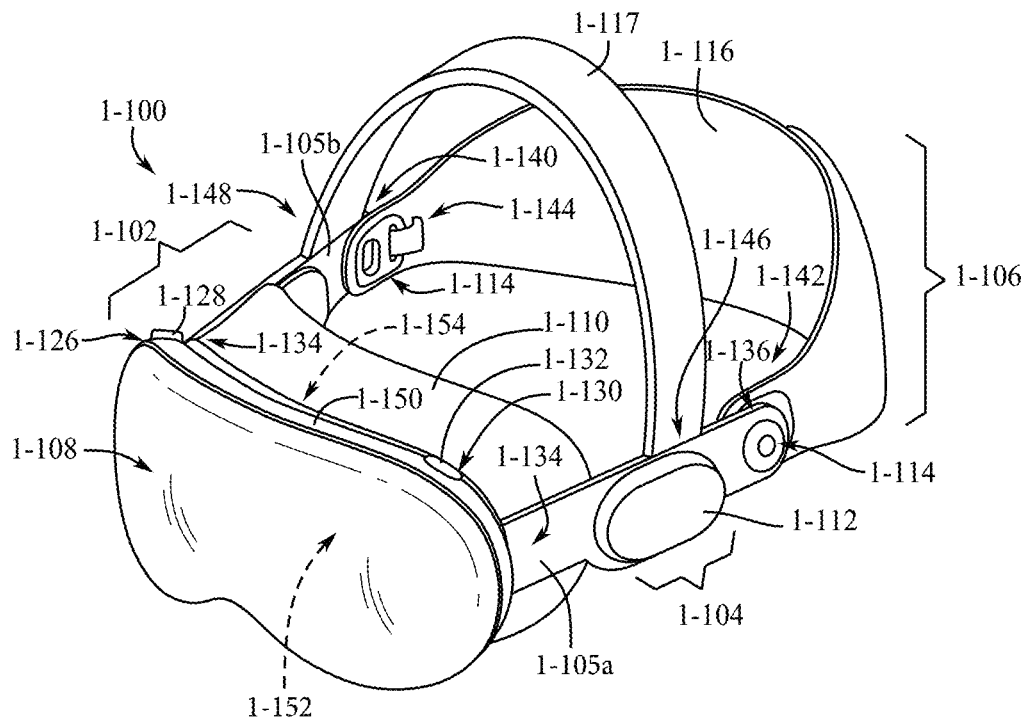
FIGS. 1B-1P are examples of a computer system for providing XR experiences in the operating environment of FIG. 1A.
Figure 1C:
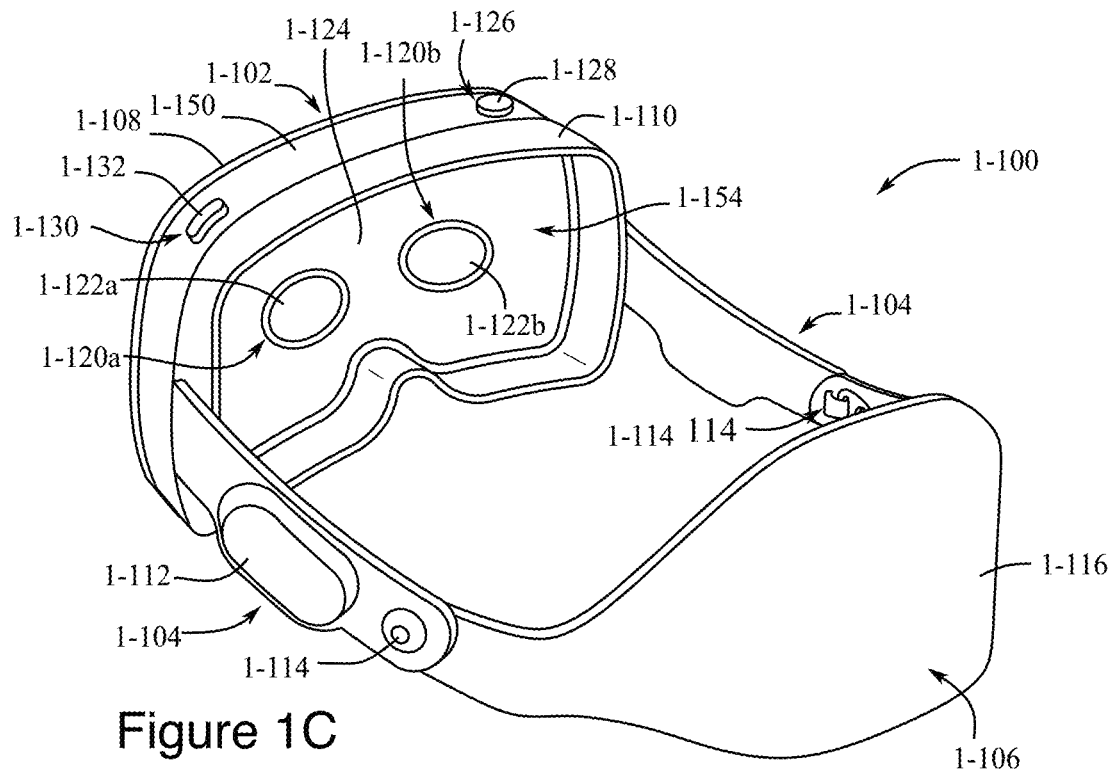
Figure 1D:
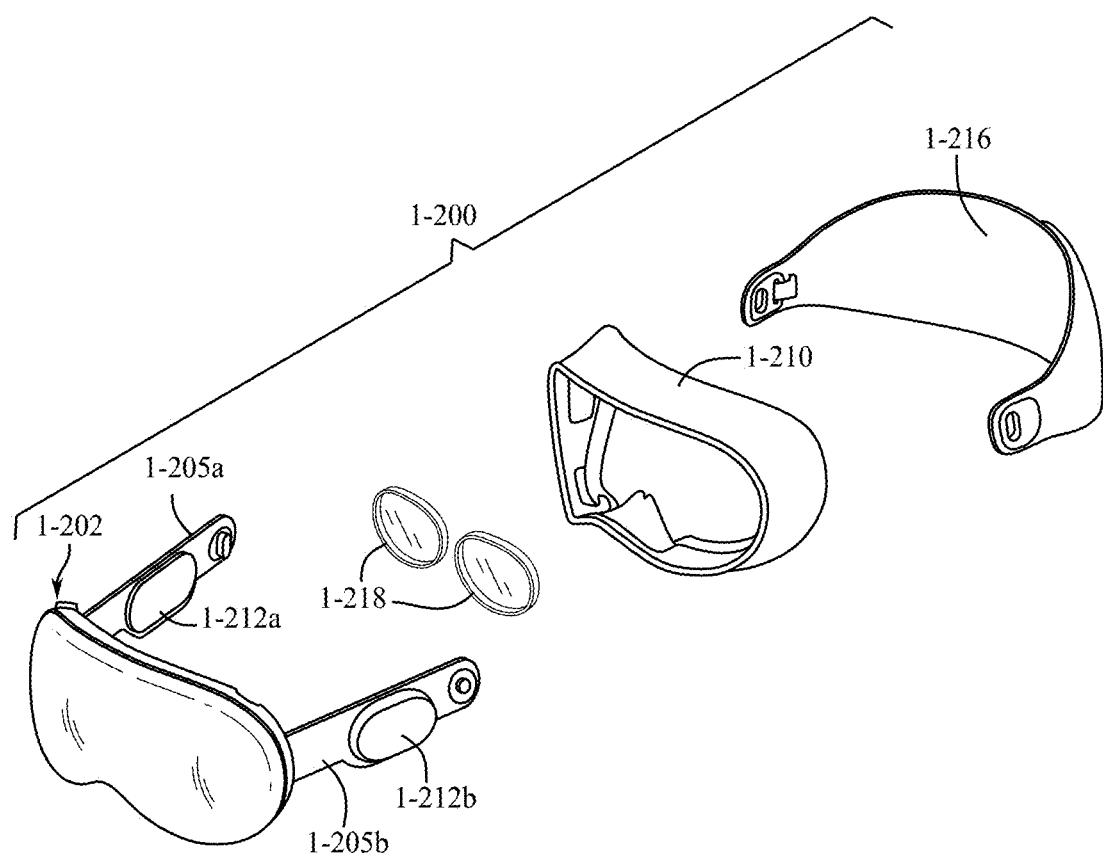
Figure 1E:
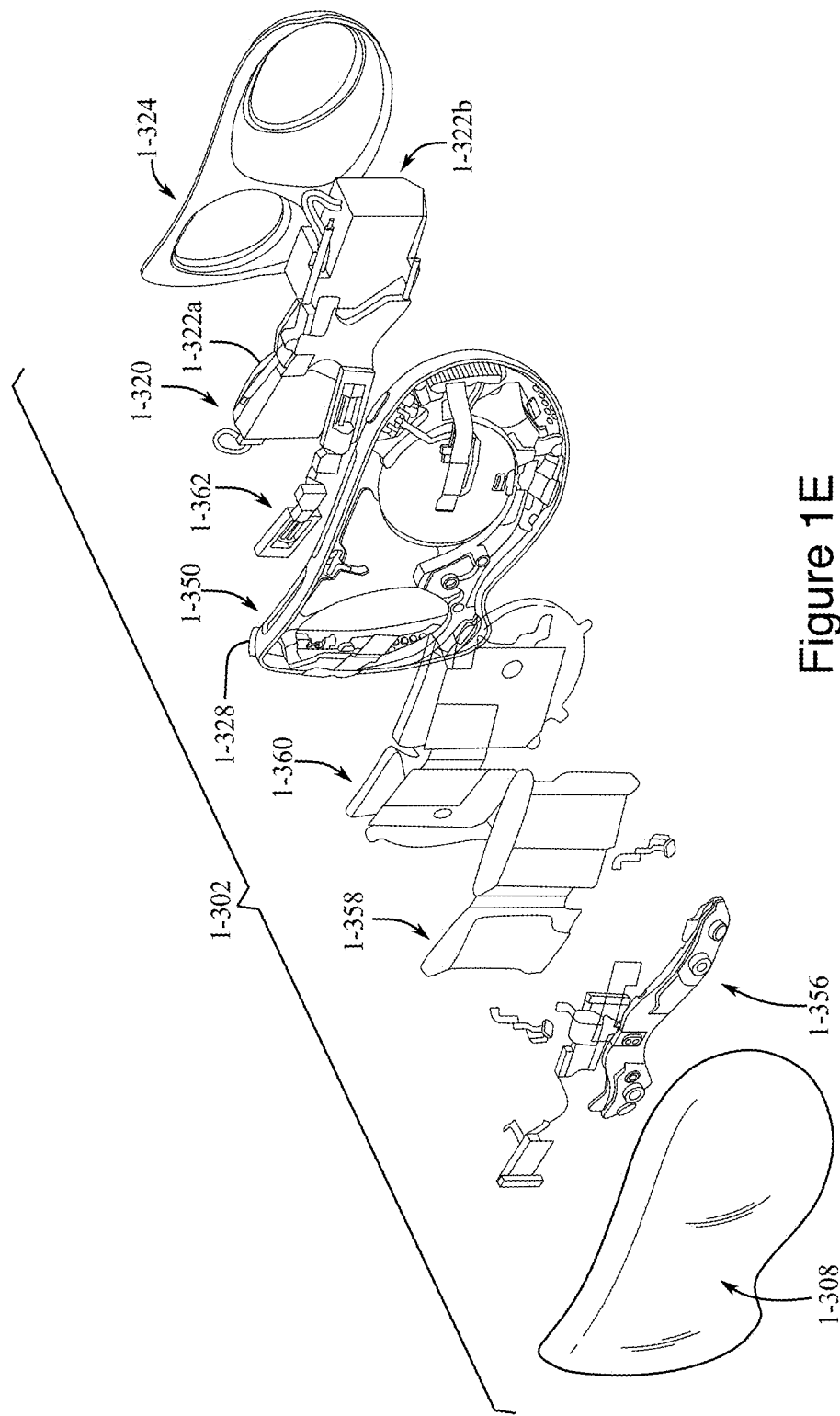
Figure 1F:
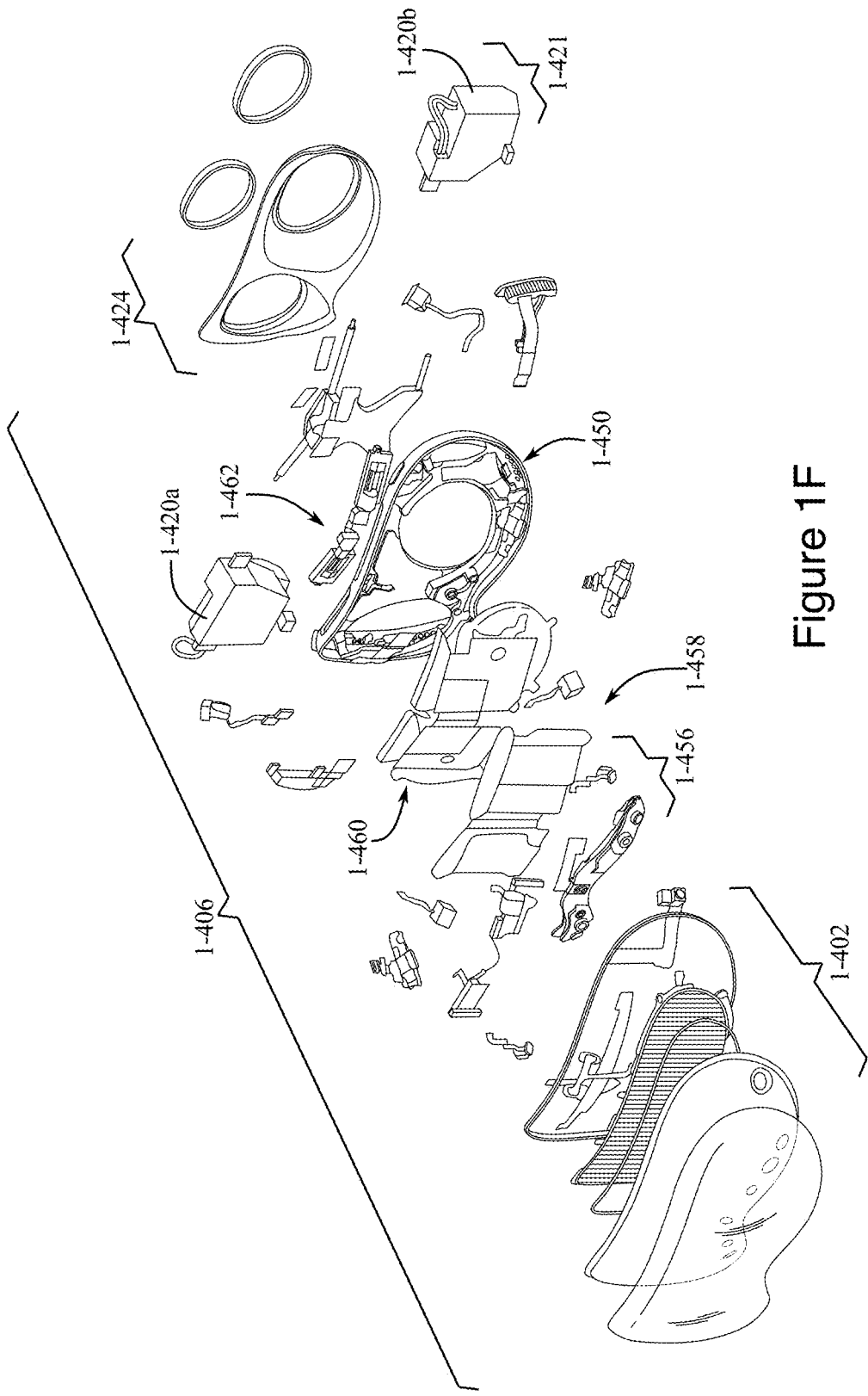
Figure 1G:
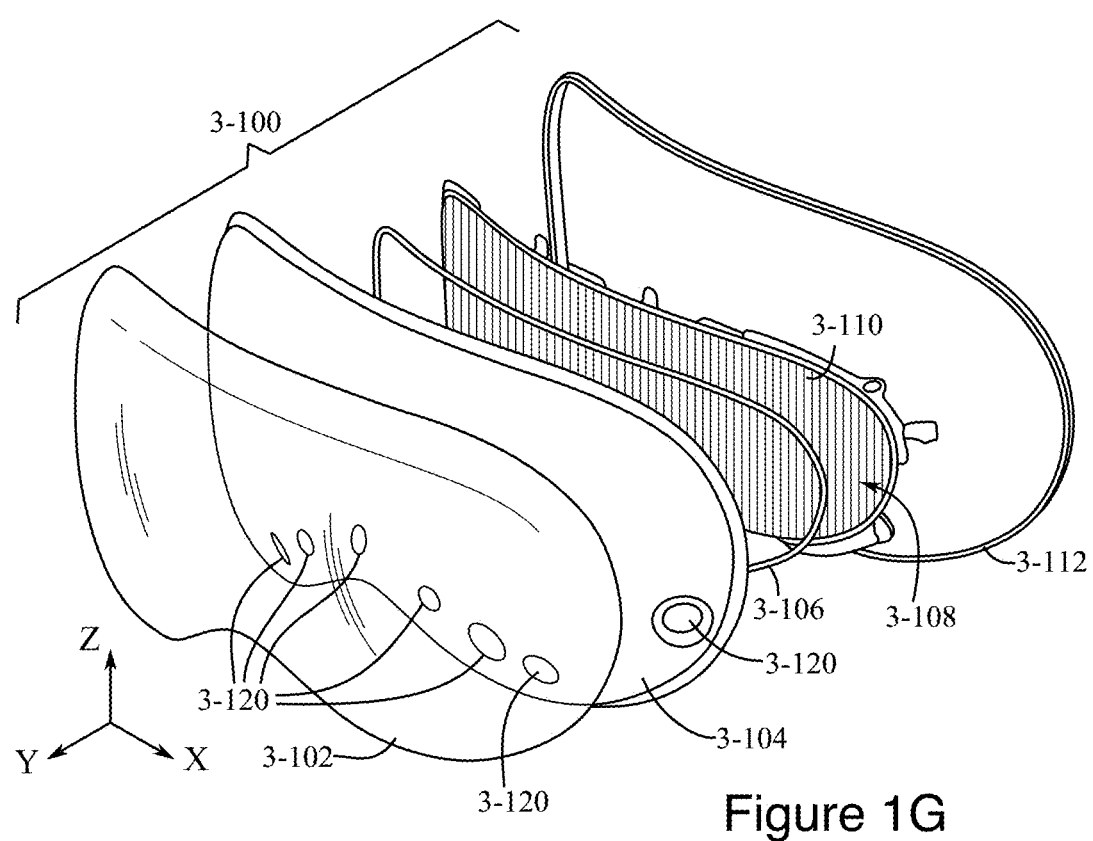
Figure 1H:
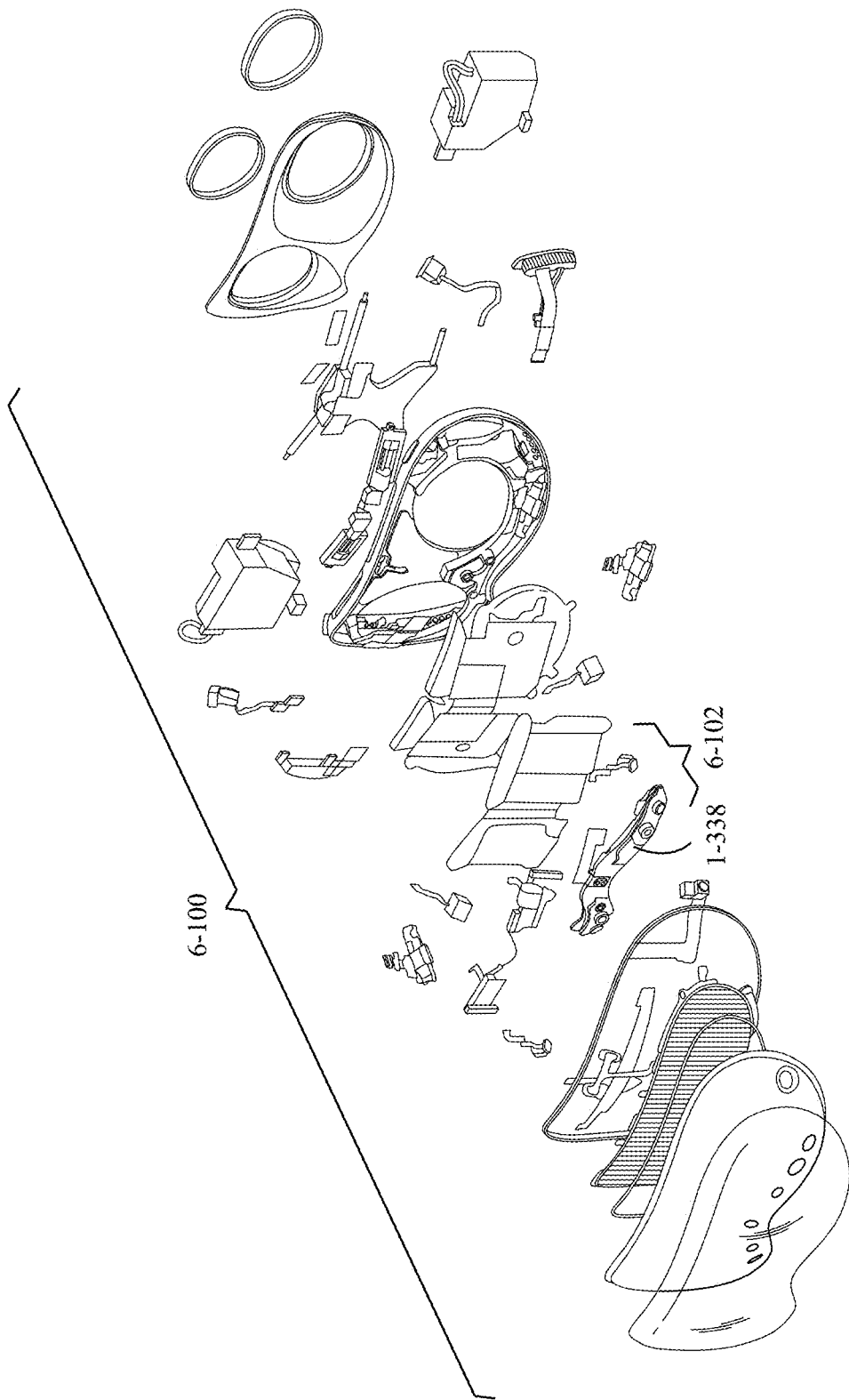
Figure 1I:
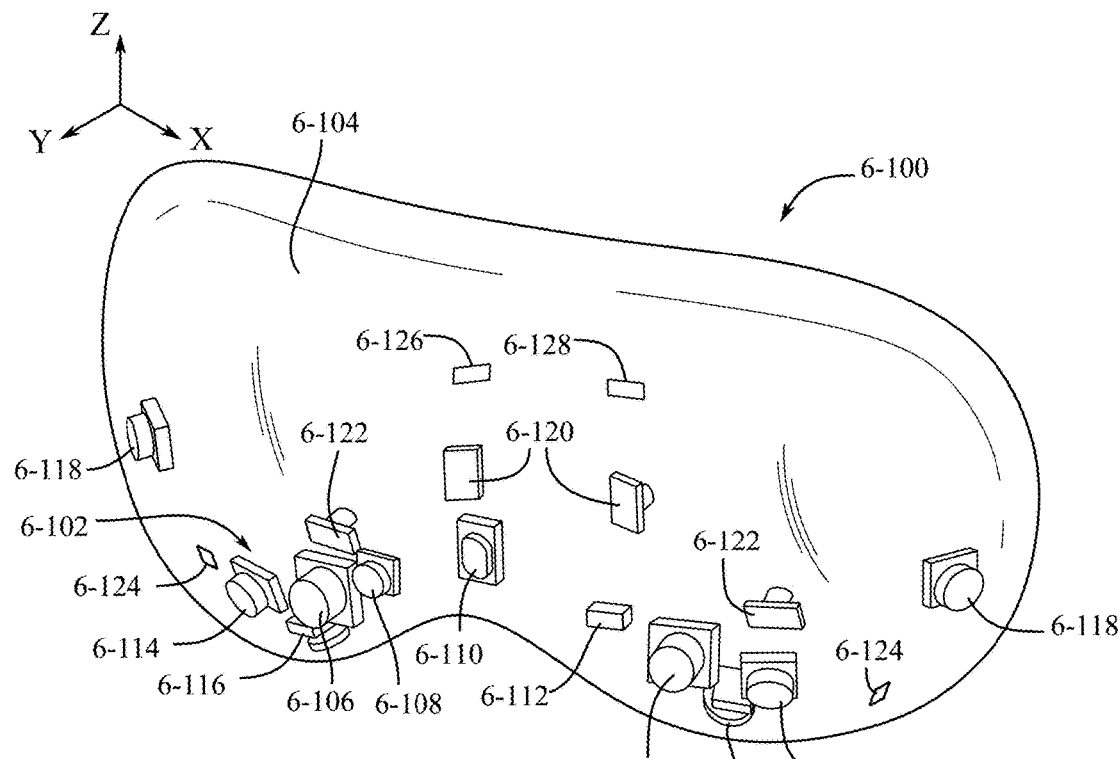
Figure 1J:
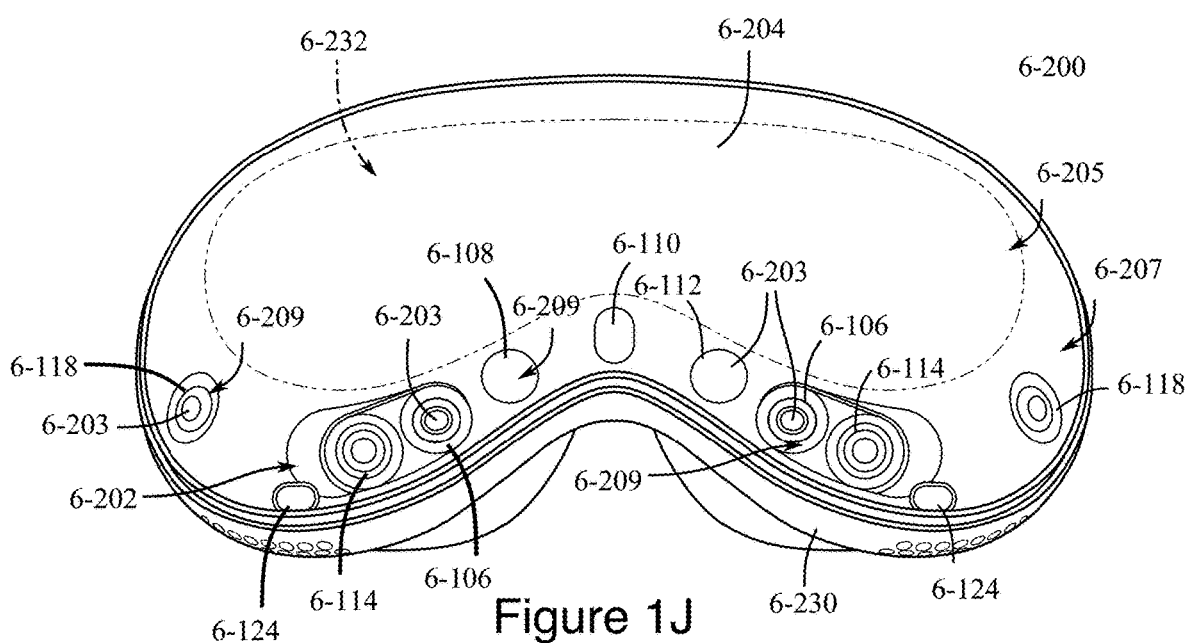
Figure 1K:
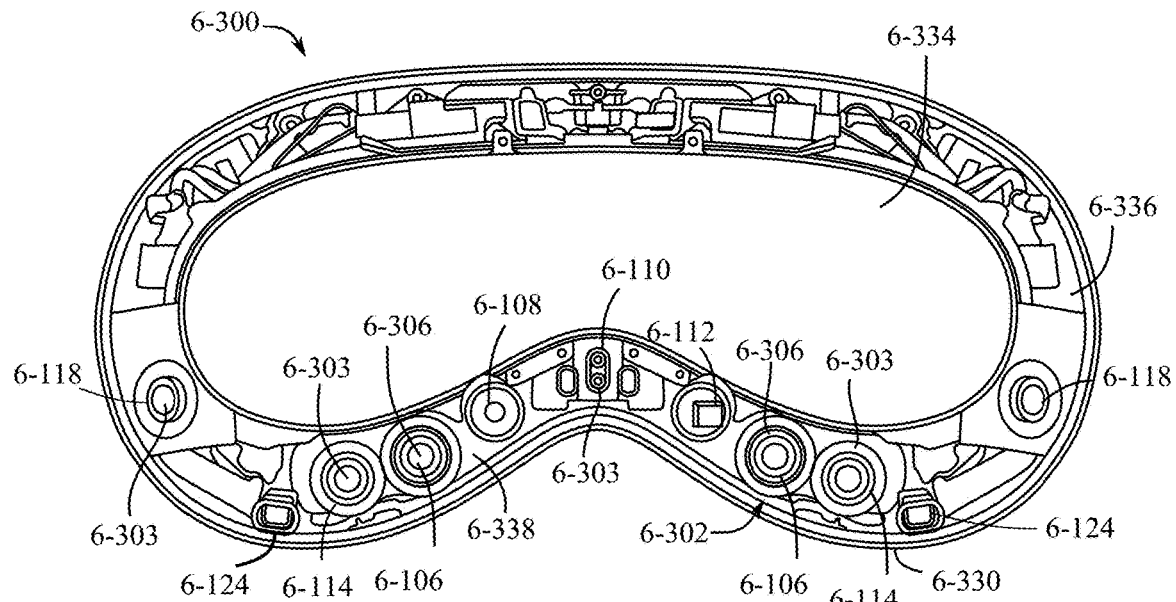
Figure 1L:
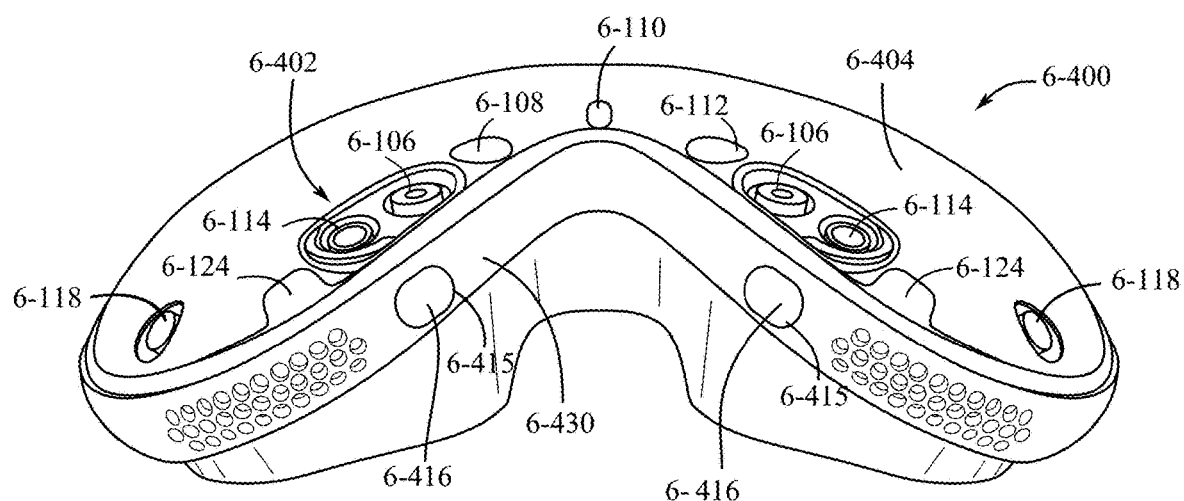
Figure 1M:
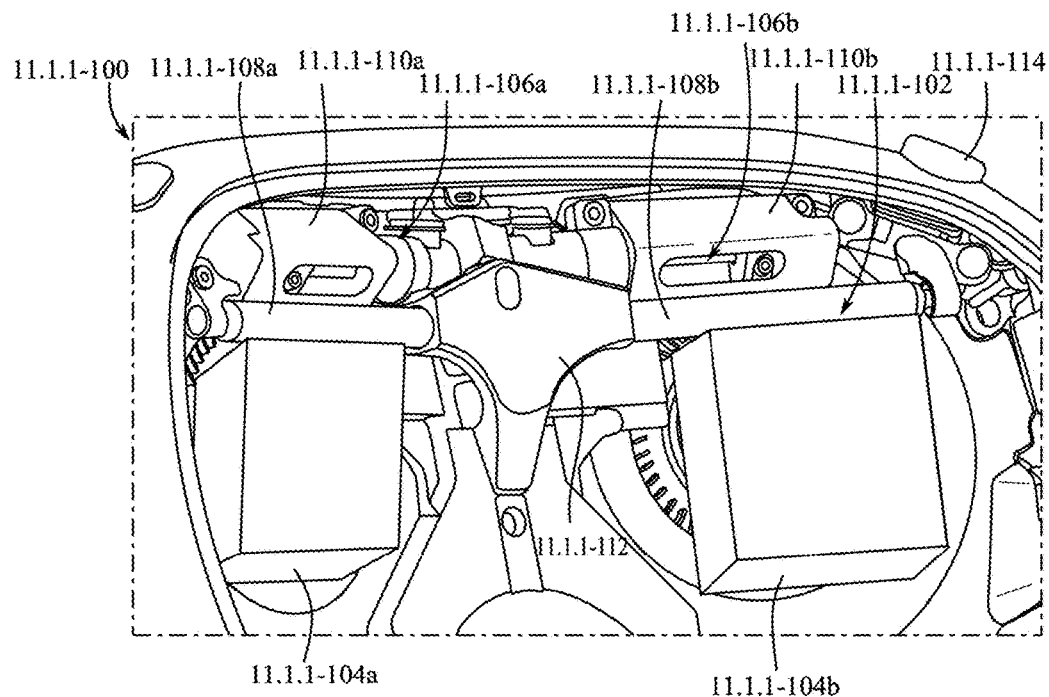
Figure 1N:
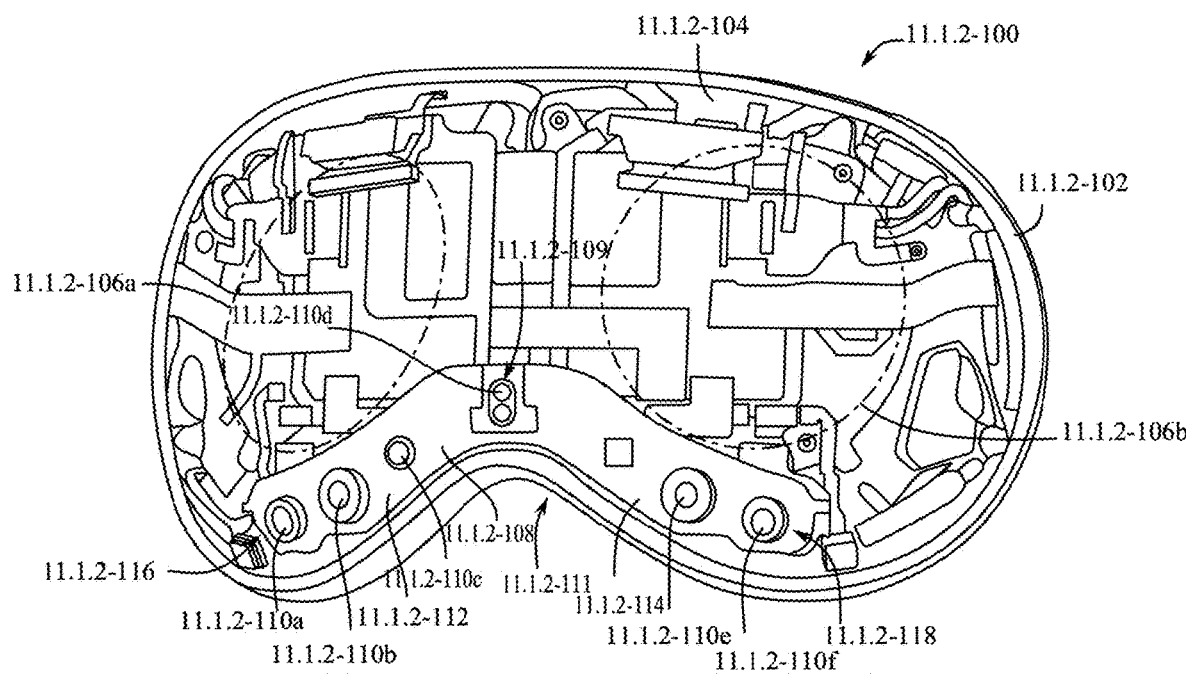
Figure 1O:
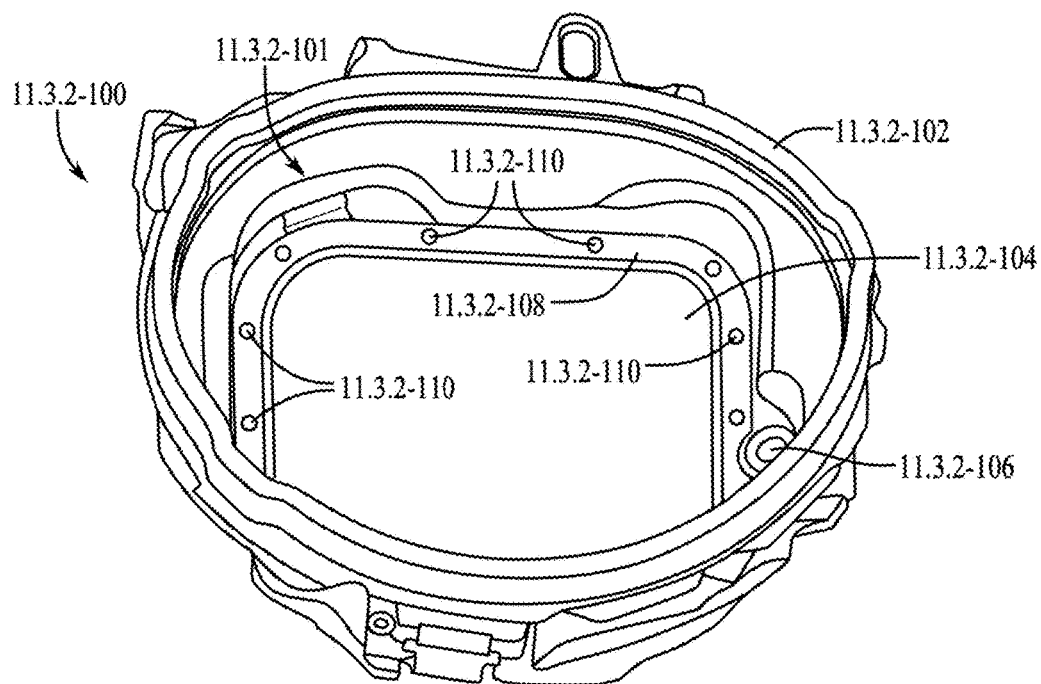
Figure 1P:
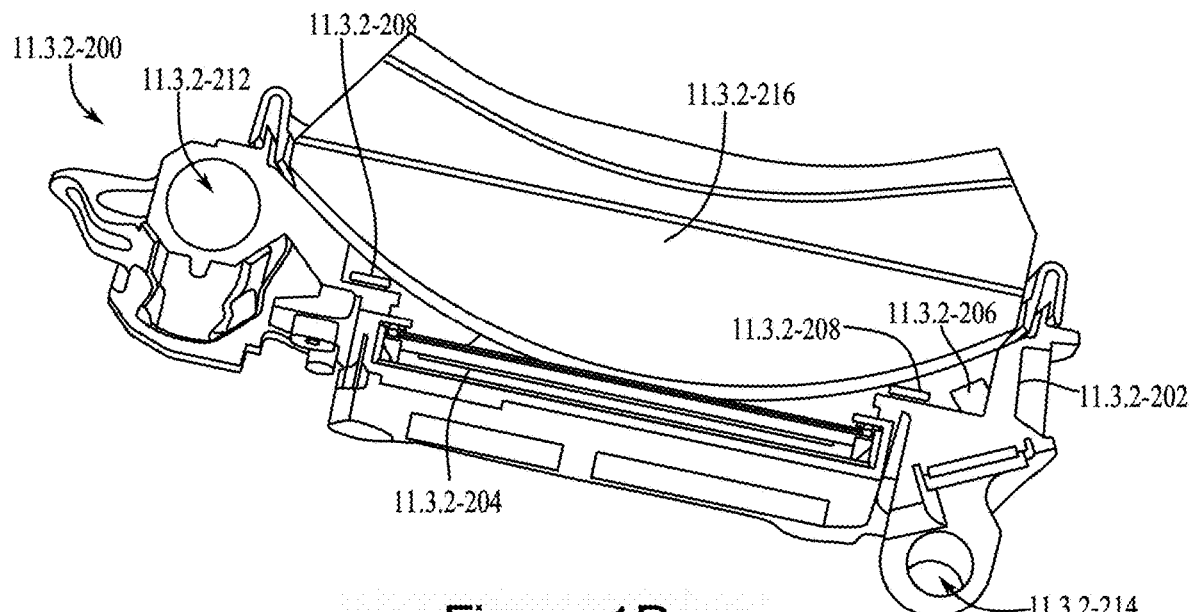

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," "backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
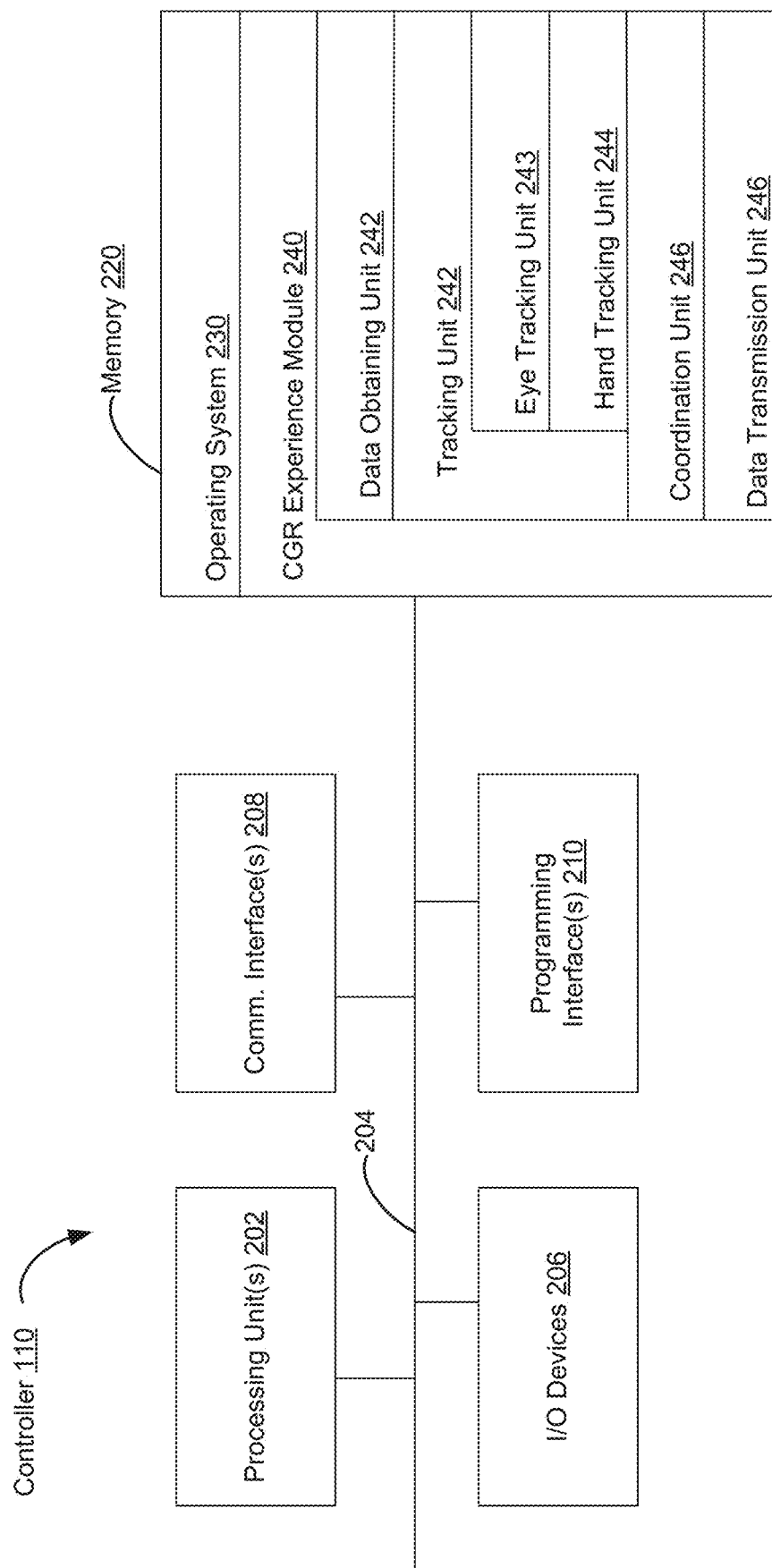
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
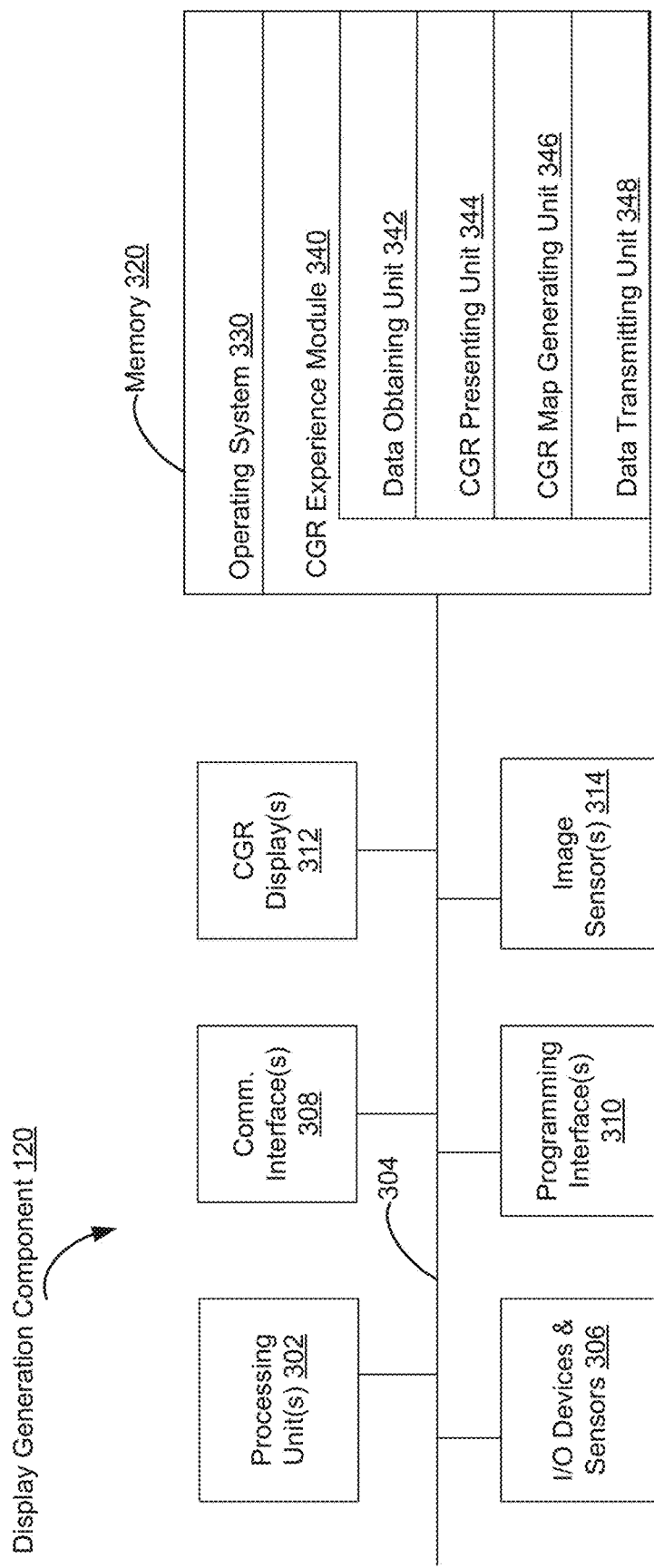
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
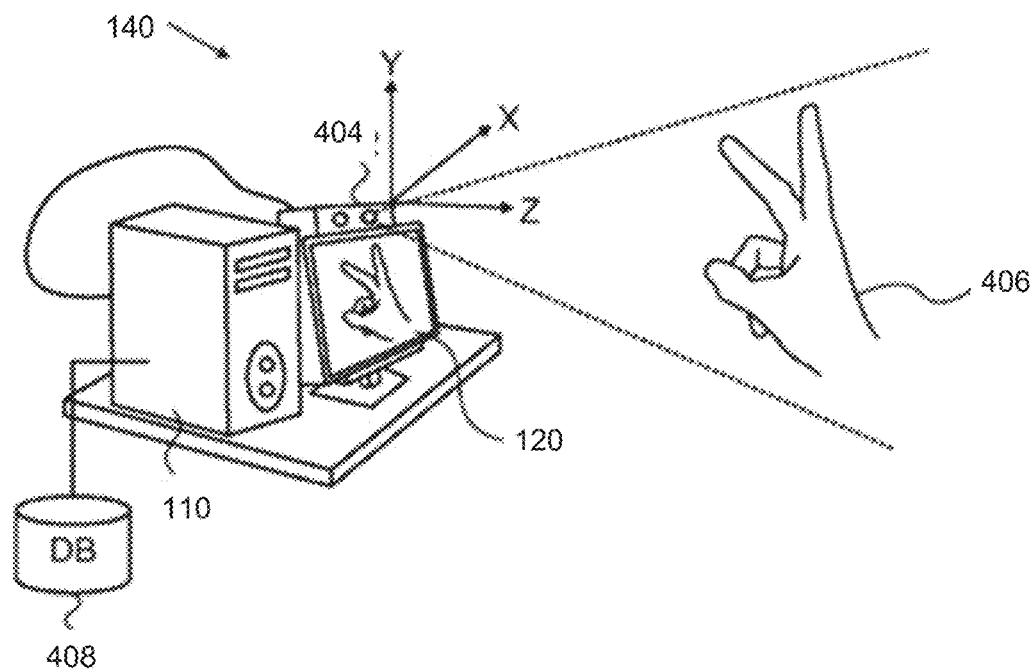
FIG. 4 is a block diagram illustrating a hand tracking unit of a computer system that is configured to capture gesture inputs of the user in accordance with some embodiments.
Figure 4:
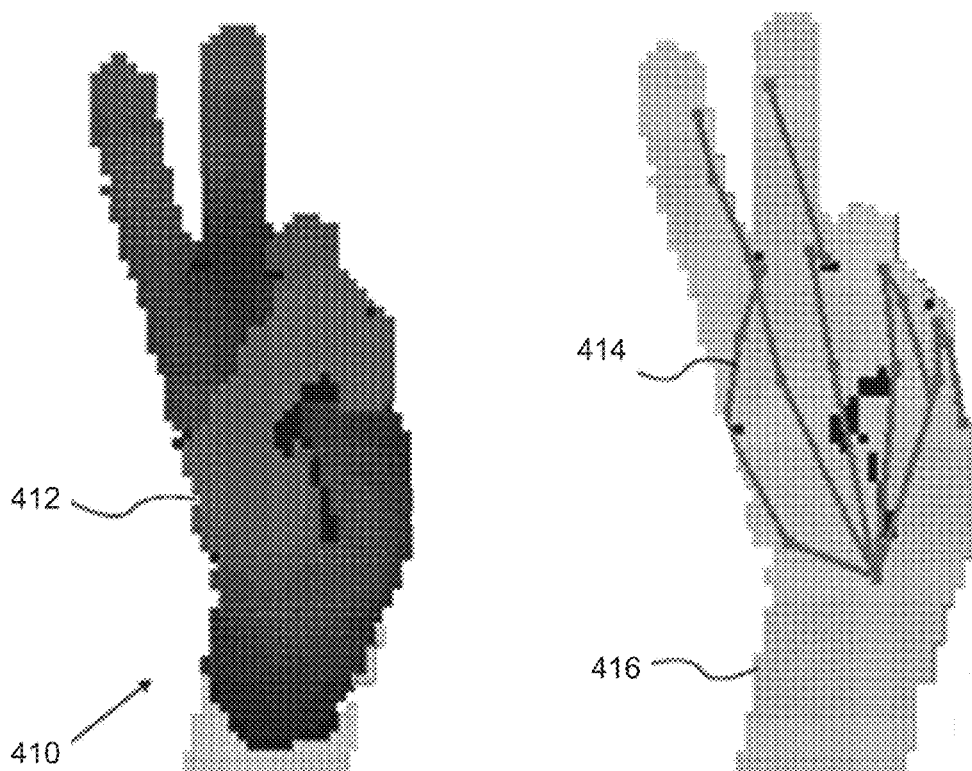

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
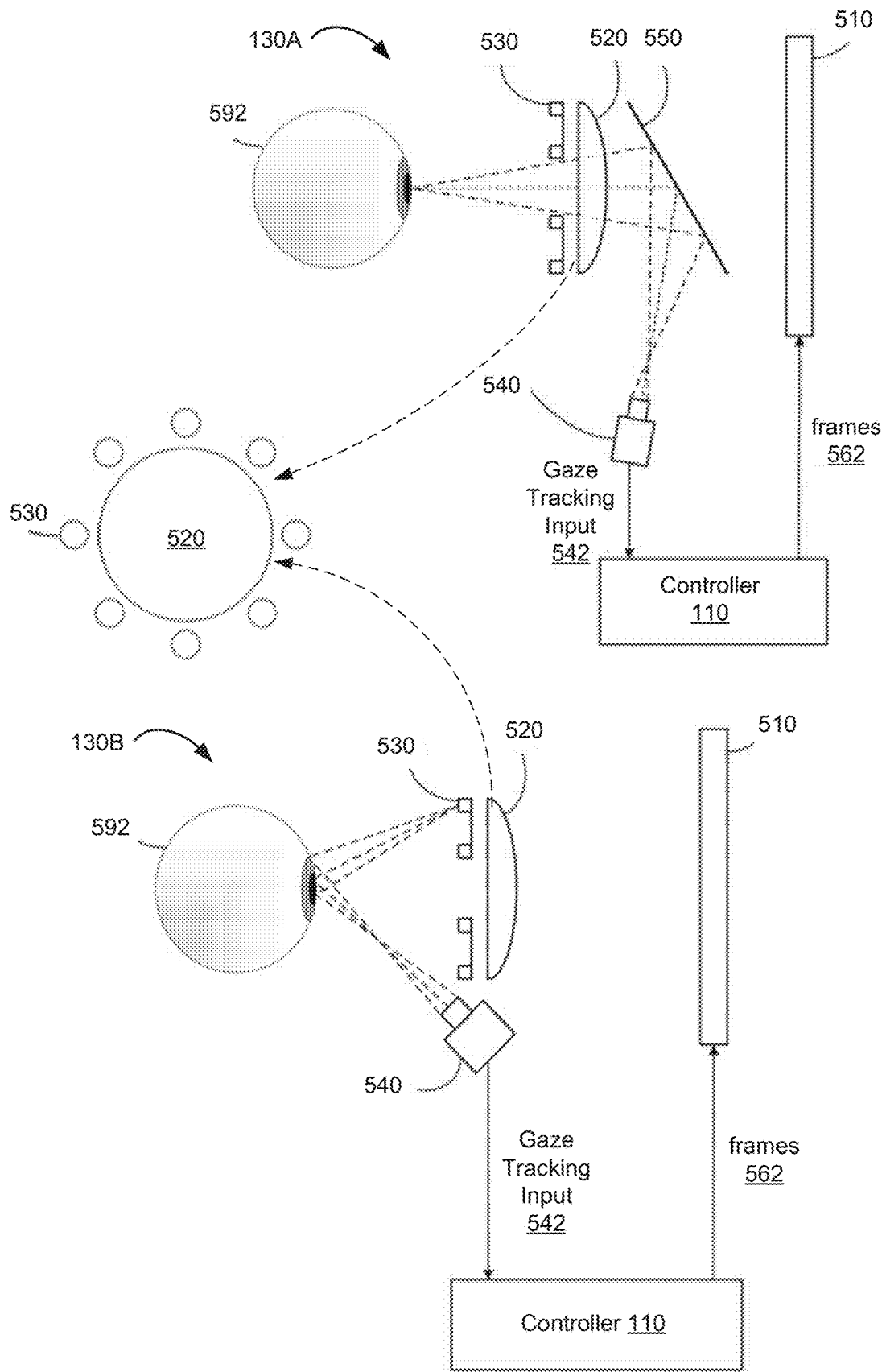
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
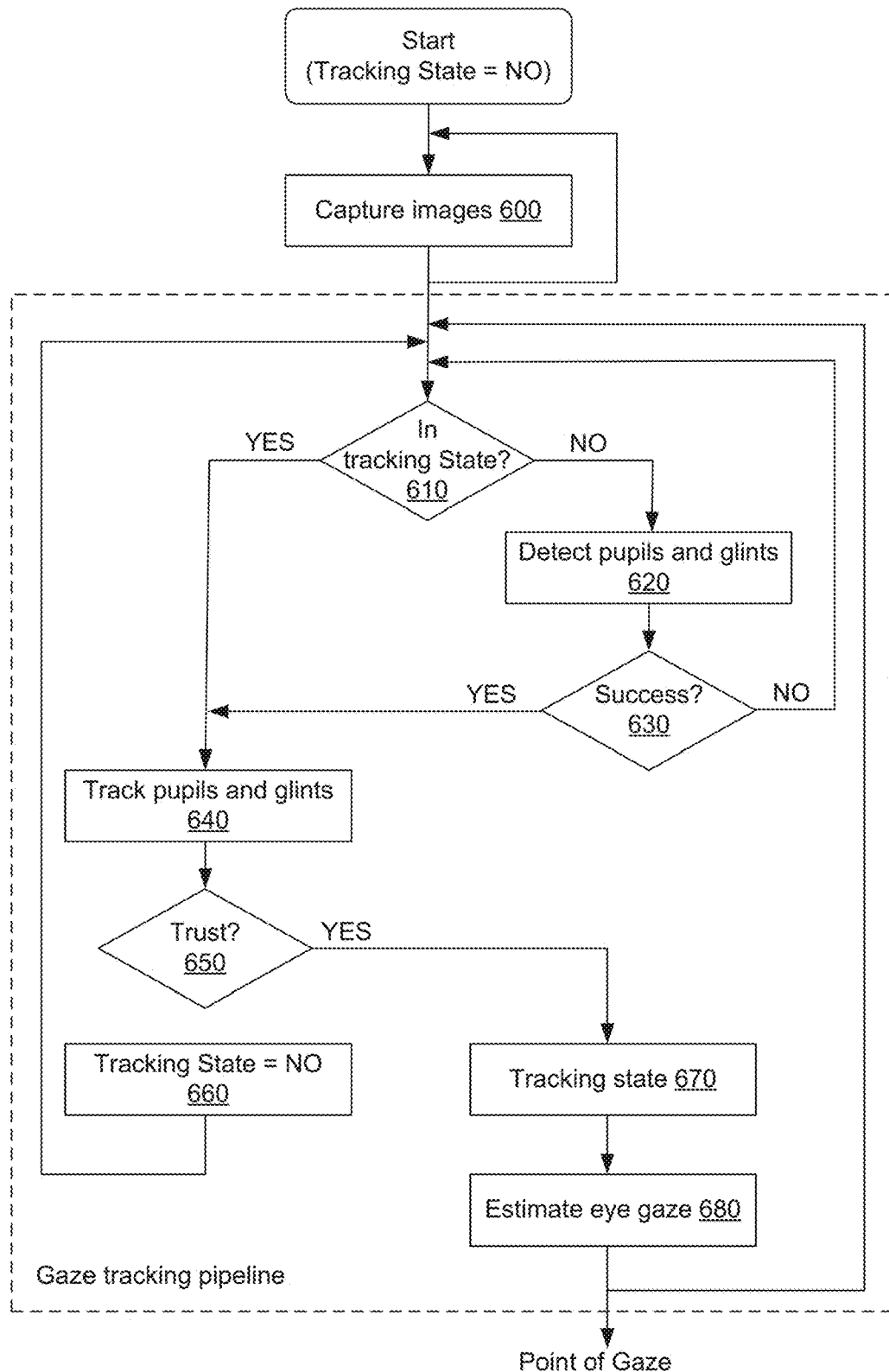
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7F illustrate examples of a computer system displaying sets of controls in response to detecting gaze and/or gesture inputs, in accordance with some embodiments.

Figure 7A:
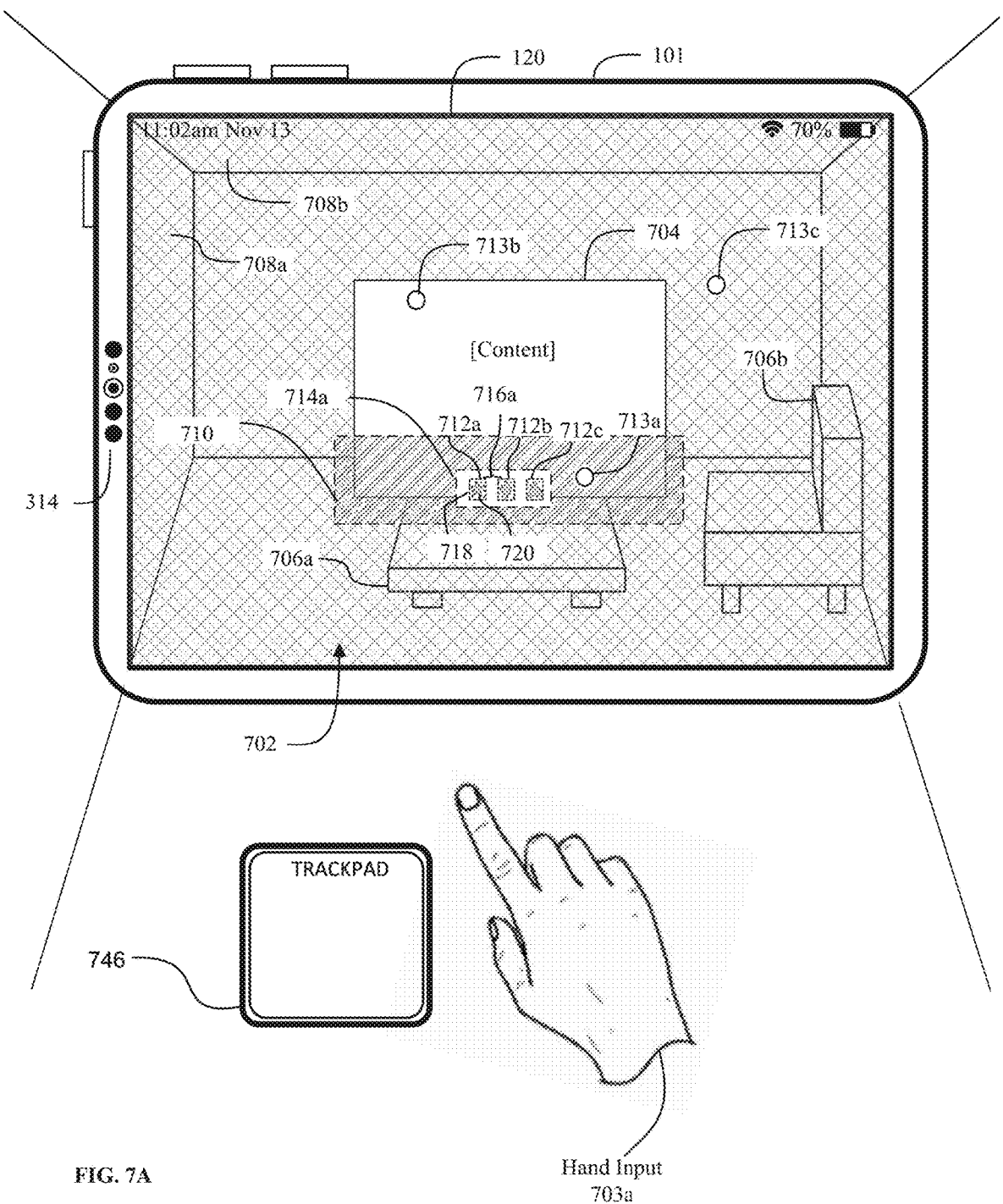
FIGS. 7A-7F illustrate example techniques for displaying sets of controls in response to detecting gaze and/or gesture inputs in accordance with some embodiments.

FIG. 7A illustrates a computer system 101 displaying, via a display generation component 120, a three-dimensional environment 702 (e.g., a three-dimensional user interface). It should be understood that, in some embodiments, computer system 101 utilizes one or more techniques described with reference to FIGS. 7A-7F in a two-dimensional environment without departing from the scope of the disclosure. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system 101 as gestures such as air gestures, and/or gaze of the user (e.g., internal sensors facing inwards towards the face of the user).

In FIG. 7A, the computer system 101 displays first content within a first region 704 of the three-dimensional environment 702. The first content optionally includes two-dimensional or three-dimensional media content that changes over time (e.g., video content, still images, and/or three-dimensional simulated content) and/or audio content. The first region 704 of the three-dimensional environment 702 is optionally a two-dimensional or three-dimensional area within which the first content is presented.

The three-dimensional environment 702 in FIG. 7A further includes representations of real objects in the physical environment of the computer system 101, including a representation 706a of a table, a representation 706b of a chair, a representation 708a of a wall, and a representation 708b of the ceiling.

Optionally, the computer system 101 displays a first set of one or more controls (e.g., icons and/or affordances) associated with the first content, such as for controlling playback of the first content. (Such optionality is indicated by dashed-line borders throughout the FIGS.) In the example of FIG. 7A, the (optionally) displayed first set of one or more controls includes a rewind control 712a, a play/pause control 712b, and a fast-forward control 712c. The controls 712a, 712b, and 712c are optionally associated with performing a corresponding operation to control the playback of first content in response to selection of the corresponding control.

Optionally, the first set of one or more controls (e.g., controls 712a, 712b, and 712c) are displayed partially or fully overlaid on (e.g., on top of and/or in front of) the first region 704 (e.g., overlaid on the first content). Optionally, the first set of one or more controls are displayed as visually overlaying a platter 714a, which is optionally oval-shaped, rectangular, or another shape, and optionally has a solid or patterned fill. Optionally, platter 714a is displayed as partially overlaid on the first region 704, as shown in FIG. 7A, or is displayed in a different location in three-dimensional environment 702. If present, platter 714a provides a visual background for the controls 712a, 712b, and 712c to help visually distinguish the controls 712a, 712b, and 712c from the first content and/or other from objects or areas in the three-dimensional environment 702.

If the first set of one or more controls 712a, 712b, and 712c are displayed, they are optionally displayed in a reduced-prominence state, as depicted in FIG. 7A. Optionally, when controls 712a, 712b, and 712c are displayed in a reduced-prominence state, the controls 712a, 712b, and 712c cannot be selected or otherwise used to perform the corresponding operation. For example, in response to detecting a selection input associated with a respective control of the first set of one or more controls 712a, 712b, and 712c while the respective control is displayed in the reduced-prominence state, computer system 101 forgoes performing the operation associated with the respective control.

In some embodiments, when the controls 712a, 712b, and 712c are displayed in a reduced-prominence state, the controls 712a, 712b, and 712c appear less visually prominent to the user, and are displayed with increased transparency, reduced simulated specular highlights, increased blurring, decreased size, and/or decreased spacing between controls 712a, 712b, and 712c relative to the case when controls are displayed in an increased-prominence state. The reduced-prominence state is described in more detail with reference to methods 800 and 1000.

Optionally, the controls 712a, 712b, and 712c include a first portion of the control (e.g., first portion 720 of control 712a, such as the graphic displayed on the structure of the button) that is overlaid on second portion of the control (e.g., second portion 718 of control 712a, such as the structure of the button itself), as shown in FIG. 7A. Optionally, the first portion of a control corresponds to (e.g., indicates) an operation associated with the control (e.g., an operation that will be performed when the control is selected), and the second portion of the control does not correspond to (e.g., does not indicate) the operation associated with the control. In some embodiments, a control includes a respective first portion of the control that is different from the first portions of other controls. In some embodiments, multiple controls include a respective second portion having the same visual characteristics.

In some embodiments, the first portion of a control (e.g., first portion 720 of control 712a) is a glyph; e.g., a text element and/or a graphical element that corresponds to (e.g., provides an indication of) an operation associated with the control. In some embodiments, the second portion of a control (e.g., second portion 718 of control 712a) is or includes a button.

In some embodiments, the computer system 101 monitors or detects, via one or more input devices (e.g., image sensors 314), the gaze of a user of computer system 101, which may be directed to various items or regions within three-dimensional environment 702.

For example, computer system 101 optionally detects that a gaze of the user is directed to a second region 710 of the three-dimensional environment (e.g., indicated by gaze point 713a). In some embodiments, the second region 710 is a predefined region of the three-dimensional environment. In the example of FIG. 7A, the second region 710 is a region that overlaps with the first region 704 but is different from the first region 704. In other examples, the second region is a region that is the same as the first region 704, a portion (e.g., subset) of the first region 704, or a separate region that is not coincident with the first region 704. The second region 710 optionally corresponds to and/or includes a region in which the first set of controls 712a, 712b, and 712c are displayed, such that if the user directs their gaze to the first set of controls 712a, 712b, and 712c the user is also directing their gaze to the second region 710. Optionally, the second region 710 has one or more of the features described with reference to method 800 and/or method 1000.

As another example, computer system 101 optionally detects that a gaze of the user is directed away from the second region 710, such as when the gaze of the user is directed to an object or area of the three-dimensional environment 702 that is outside of the second region 710 (e.g., indicated by gaze points 713b and 713c) and/or outside of the first region 704 (e.g., indicated by gaze point 713c).

While computer system 101 is displaying the three-dimensional environment 702 and is not displaying a second set of one or more controls associated with the first content in an increased-prominence state (e.g., while computer system 101 is not displaying the first set of one or more controls and the second set of one or more controls at all, or is displaying the second set of one or more controls in a reduced-prominence state, or is displaying the first set of one or more controls in a reduced-prominence state, such as shown in FIG. 7A), computer system 101 optionally detects, via one or more input devices (e.g., image sensors 314, trackpad 746), a first input from a first portion of the user, such as an air pinch gesture, such as shown by hand input 703a in FIG. 7A. Optionally, the one or more input devices have one or more of the features described with reference to method 800 and/or method 1000. Optionally, the first input has one or more of the features described with reference to method 800 and/or method 1000. Optionally, the first portion of the user has one or more of the features described with reference to method 800 and/or method 1000.

In some embodiments, in response to detecting the first input (e.g., hand input 703a), computer system 101 determines a direction of a gaze of the user (e.g., by determining where the gaze of the user is directed when or immediately after the first input is detected) and responds to the detection of the first input and the determination of the direction of the gaze as described with reference to FIGS. 7B-7C.

Figure 7B:
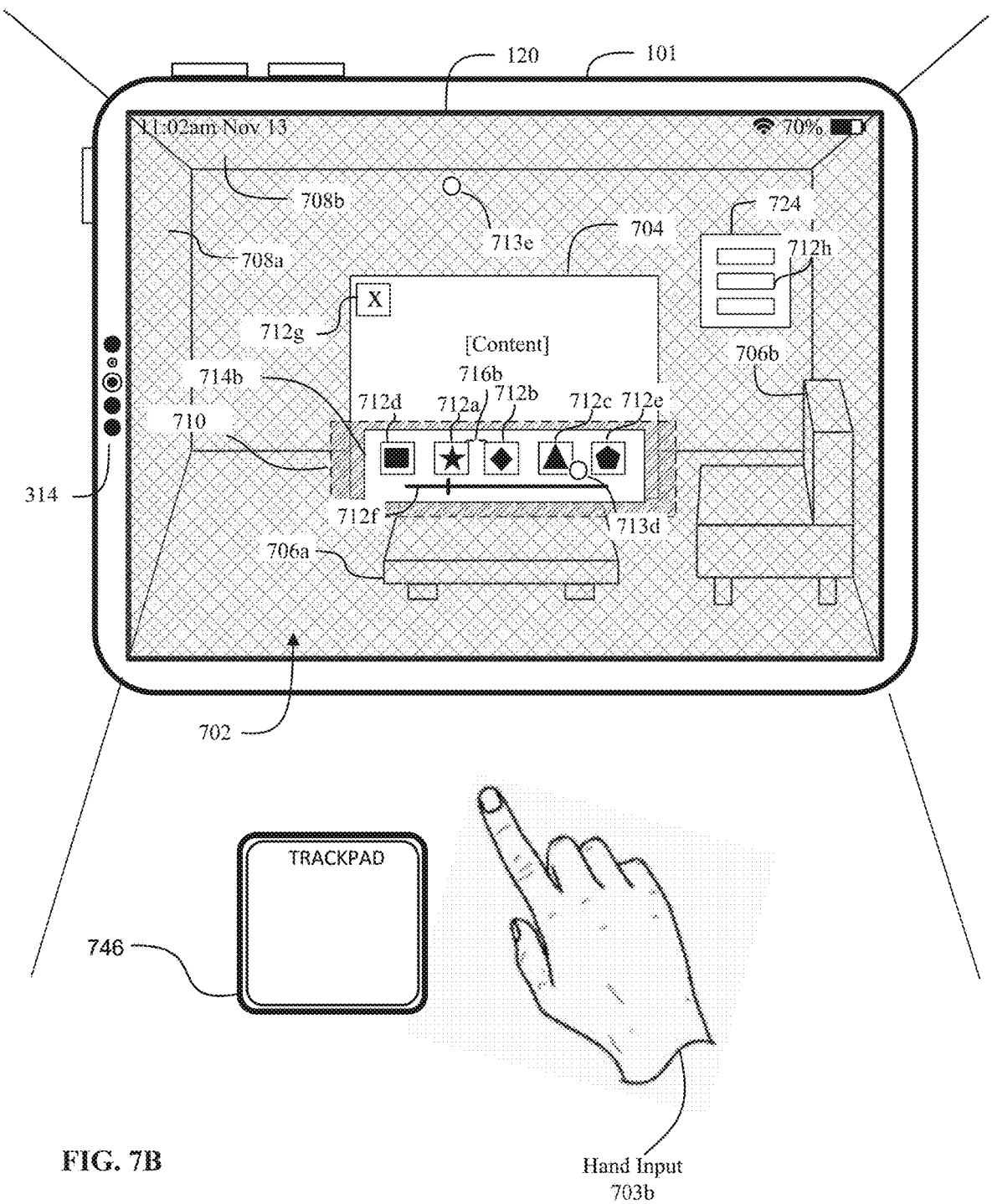

FIG. 7B illustrates a response of computer system 101 when computer system 101 detects the first input from the first portion of the user (e.g., hand input 703a of FIG. 7A) while the gaze of the user is directed to the second region 710 of three-dimensional environment 702 (e.g., as depicted by gaze point 713a in second region 710 of FIG. 7A).

In some embodiments, in response to detecting the first input and in accordance with a determination that the gaze of the user is directed to the second region, the computer system 101 displays a second set of one or more controls 712a, 712b, 712c, 712d, 712e, 712f, 712g, and 712h for controlling playback of the first content displayed in the first region 704, as shown in FIG. 7B.

In some embodiments, the second set of controls includes more (e.g., a larger quantity of) controls than the first set of one or more controls (e.g., controls 712a, 712b, and 712c described with reference to FIG. 7A). In the example of FIG. 7B, the second set of one or more controls 712a, 712b, 712c, 712d, 712e, 712f, 712g, and 712h includes the first set of one or more controls 712a, 712b, and 712c. For example, the second set of one or more controls 712a, 712b, 712c, 712d, 712e, 712f, 712g, and 712h shown in the example of FIG. 7B includes rewind control 712a, play/pause control 712b, and fast-forward control 712c. In the example of FIG. 7B, the second set of controls also includes additional controls (e.g., controls 712d, 712e, 712f, 712g, and 712h) for controlling playback of the first content.

Optionally, some or all of the controls of the second set of one or more controls are displayed as being visually overlaid on a platter 714b, which is optionally oval-shaped, rectangular, or another shape, and optionally has a solid or patterned fill. In some embodiments, platter 714b is larger than platter 714a described with reference to FIG. 7A, such as to accommodate display of additional controls.

In the example of FIG. 7B, controls 712a, 712b, 712c, 712d, 712e, and 712f are displayed as being visually overlaid on platter 714b, and controls 712g and 712h are not displayed as being visually overlaid with platter 714b. In some embodiments, one or more controls of the second set of one or more controls are displayed outside of platter 714b and/or outside of the second region 710, such as shown by control 712g and control 712h in the example of FIG. 7B. In some embodiments, one or more controls of the second set of one or more controls are displayed outside of platter 714b and overlaid on the first content displayed in first region 704, as shown by control 712g in the example of FIG. 7B. In some embodiments, one or more controls are displayed outside of first region 704, as shown by control 712h in the example of FIG. 7B.

Optionally, controls 712a, 712b, 712c, 712d, 712e, 712f, 712g, and 712h include a first portion of the control that is, optionally, overlaid on a second portion of the control, such as described with reference to first portion 720 and second portion 718 of FIG. 7A.

Optionally, the second set of one or more controls are displayed in an increased-prominence state, such as shown in FIG. 7B. When controls 712a, 712b, 712c, 712d, 712e, 712f, 712g, and 712h are displayed in an increased-prominence state, the controls 712a, 712b, 712c, 712d, 712e, 712f, 712g, and 712h optionally appear more visually prominent to the user relative to controls displayed in the reduced-prominence state, and are optionally displayed with decreased transparency, increased simulated specular highlights (e.g., with increased brightness, increased size, increased intensity, and/or with an increased quantity of highlights), decreased blurring, increased size, and/or increased spacing between the controls relative to the case when controls are displayed in a reduced-prominence state (e.g., distance 716b is optionally larger than distance 716a). That is, one or more visual characteristics (transparency, simulated specular highlights, blurring, size, and/or spacing) of controls 712a, 712b, 712c, 712d, 712e, 712f, 712g, and 712h displayed in an increased-prominence state are optionally different than the visual characteristics of controls displayed in a reduced-prominence state. The increased-prominence state is described in more detail with reference to method 800 and method 1000.

In some embodiments, controls that are displayed in an increased-prominence state can be selected, by the user, to perform operations associated with the controls. For example, in some embodiments, control 712a, when selected, causes the computer system 101 to adjust the playback position of the first content backward by a predetermined amount (e.g., 5, 10, 15, 30, or 60 seconds) or to adjust a playback direction and/or speed of the first content (e.g., to rewind the first content). In some embodiments, control 712b, when selected, causes the electronic device 101 to pause playback of the first content. In some embodiments, control 712c, when selected, causes the electronic device to adjust the playback position of the first content forward by a predetermined amount (e.g., 5, 10, 15, 30, or 60 seconds) or to adjust a playback direction and/or speed of the first content (e.g., to fast-forward the first content). In some embodiments, control 712d, when selected, causes the computer system 101 to display the first content in a picture-in-picture element. In some embodiments, control 712e, when selected, causes the computer system 101 to expand a view of the first content, such as by expanding the first region 704.

In some embodiments, control 712f includes an indication of the current playback position of the first content displayed in first region 704 and, in response to an input moving the indication of the current playback position, causes the computer system 101 to adjust the playback position of the first content and resume playback of the first content from the adjusted playback position. In some embodiments, control 712g, when selected, causes the computer system 101 to cease to display the first content in the first region 704 (e.g., to close the first content). In some embodiments, after the first content has ceased to be displayed, other content, objects, or areas are displayed by computer system 101 in the same location of and/or in place of the first content (e.g., in the first region 704) in the three-dimensional environment 702. In some embodiments, control 712g, when selected, also causes the second set of one or more controls 712a, 712b, 712c, 712d, 712e, 712f, 712g, and 712h to cease to be displayed.

In some embodiments, menu 724 is a navigation menu for browsing different content that is available via a content application (e.g., a media player application) associated with displaying content in first region 704. Optionally, displaying the second set of one or more controls includes displaying menu 724; e.g., menu 724 is displayed when the second set of one or more controls is displayed and menu 724 is not displayed when the first set of one or more controls is displayed. In some embodiments, control 712h, when selected from menu 724, causes the computer system 101 to navigate to and/or display second (different) content associated with control 712h. In some embodiments, menu 724 includes a plurality of controls that are associated with different content, as shown in FIG. 7B. In some embodiments, menu 724 (in addition to control 712h) is displayed in the increased-prominence state; for example, the size of menu 724 displayed in the increased-prominence state is optionally larger than the size of menu 724 displayed in the reduced-prominence state.

Optionally, menu 724 (including control 712h) is displayed outside of the first region 704, as shown in the example of FIG. 7B. In some embodiments, the second content (e.g., content associated with control 712h) includes two-dimensional or three-dimensional media content (e.g., video content, still images, and/or three-dimensional simulated content) and/or audio content. In some embodiments, in response to detecting a selection of control 712h, the second content is displayed and, optionally, the first content ceases to be displayed. In some embodiments, the second content is displayed in the first region 704 (e.g., the same region in which the first content was displayed), a subset of the first region 704, a region that overlaps with the first region 704 but is different from the first region 704, or a separate region that is not coincident with the first region 704.

In some embodiments, if the computer system 101 detects a second input (e.g., hand input 703b in FIG. 7B) that is a repeat of the first input (e.g., hand input 703a in FIG. 7A) while displaying the second set of one or more controls in the increased-prominence state, computer system 101 dismisses (e.g., ceases to display) the second set of one or more controls 712a, 712b, 712c, 712d, 712e, 712f, 712g, and 712h in the increased-prominence state. For example, repeating the input that invoked display of the second set of one or more controls in the increased prominence state optionally causes the computer system 101 to dismiss display of the second set of one or more controls 712a, 712b, 712c, 712d, 712c, 712f, 712g, and 712h. In some embodiments, the second input optionally has one or more of the features of the second input described with reference to method 800 and/or method 1000 (e.g., is an air pinch gesture).

In some embodiments, the computer system 101 determines whether to dismiss the display of the second set of controls based on where the user is looking when the user repeats the first input. In some embodiments, if the computer system 101 detects a second input that is a repeat of the first input while displaying the second set of controls in the increased-prominence state (e.g., as shown in FIG. 7B) and while a gaze of the user is directed to the second region 710 (e.g., indicated by gaze point 713d in FIG. 7B), the computer system 101 ceases to display the second set of controls in the increased-prominence state. For example, repeating the input that invoked display of the second set of controls in the increased prominence state while the user is looking at the second set of controls optionally causes the computer system 101 to dismiss the second set of controls. In some embodiments, in response to detecting the repeat of the first input and after ceasing to display the second set of controls in the second state, computer system 101 displays (or re-displays) the first set of one or more controls in the reduced-prominence state (such as shown in FIG. 7A), or displays the second set of controls in a reduced-prominence state, or forgoes displaying any controls at all.

In some embodiments, if the computer system 101 detects a repeat of the first input from the first portion of the user (e.g., hand input 703b) while displaying the second set of controls in the increased-prominence state (e.g., as shown in FIG. 7B) and while a gaze of the user is not directed to (e.g., is directed away from) the second region 710 (e.g., indicated by gaze point 713c in FIG. 7B), the computer system 101 continues to display the second set of controls in the increased-prominence state (e.g., as shown in FIG. 7B).

In some embodiments, the computer system 101 dismisses the display of the second set of one or more controls in the increased-prominence state if the user looks away from the second set of controls (e.g., indicated by gaze point 713e in FIG. 7B) for a time threshold, or if the user looks at the second set of controls (e.g., indicated by gaze point 713d) and then looks away (e.g., indicated by gaze point 713d) for a time threshold.

For example, in some embodiments, if the computer system 101 detects, while displaying the second set of controls in the increased-prominence state, that a gaze of the user has been directed away from the second set of one or more controls for a first time threshold (e.g., 05, 0.1, 0.25, 0.5, 0.75, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 seconds), the computer system 101 ceases to display the second set of controls in the increased-prominence state.

As another example, in some embodiments, if the computer system 101 detects, while displaying the second set of controls in the increased-prominence state as shown in FIG. 7B, that a gaze of the user has been directed to the second set of controls (e.g., as indicated by gaze point 713d) and then directed away from the second set of one or more controls (e.g., indicated by gaze point 713e) for a first time threshold (e.g., 05, 0.1, 0.25, 0.5, 0.75, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 seconds), the computer system 101 ceases to display the second set of controls in the increased-prominence state.

In some embodiments, the time threshold depends on whether the user previously looked at the second set of controls. For example, the time threshold is optionally shorter if the user previously looked at the second set of controls than if the user has not yet looked at the second set of controls.

For example, in some embodiments, if the computer system 101 detects, while displaying the second set of controls in the increased-prominence state as shown in FIG. 7B, that a gaze of the user has been directed away from the second set of controls (e.g., as indicted by gaze point 713e) for a time duration and that the user has not previously looked at the second set of controls, the computer system optionally ceases to display the second set of one or more controls in the increased-prominence state if the time duration exceeds a first time threshold (e.g., 05, 0.1, 0.25, 0.5, 0.75, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 seconds).

Alternatively, in some embodiments, if the computer system 101 detects, while displaying the second set of controls in the increased-prominence state as shown in FIG. 7B, that a gaze of the user has been directed away from the second set of controls (e.g., as indicated by gaze point 713e) for a time duration and that the user has previously looked at the second set of controls (e.g., the gaze of the user was previously directed to gaze point 713d before being directed away from the second set of controls), the computer system 101 ceases to display the second set of one or more controls in the increased-prominence state if the time duration exceeds a second time threshold shorter than the first time threshold (e.g., 05, 0.1, 0.25, 0.5, 0.75, 1, 2, 3, 4, 5, 6, 7, 8, 9, 10, 11, 12, 13, 14, 15, 16, 17, 18, 19, 20, 21, 22, 23, 24, 25, 26, 27, 28, or 29 seconds).

In some embodiments, in accordance with a determination that a gaze of the user has been directed away from the second set of controls (e.g., as indicated by gaze point 713e) for a time duration, and the gaze of the user was not previously directed to the second set of one or more controls while the second set of one or more controls was displayed in the increased-prominence state (e.g., if the gaze of the user was not previously directed to gaze point 713d), and that the time duration does not exceed the first time threshold, the computer system 101 maintains display of the second set of one or more controls in the increased-prominence state as shown in FIG. 7B.

In some embodiments, in accordance with a determination that a gaze of the user has been directed away from the second set of controls (e.g., as indicated by gaze point 713e) for a time duration, and in accordance with a determination that the gaze of the user was previously directed to the second set of one or more controls while the second set of one or more controls was displayed in the increased-prominence state (e.g., the gaze of the user was previously directed to gaze point 713d before being directed away from the second set of controls) and the time duration does not exceed the second time threshold, the computer system 101 maintains display of the second set of one or more controls in the increased-prominence state as shown in FIG. 7B.

Figure 7C:
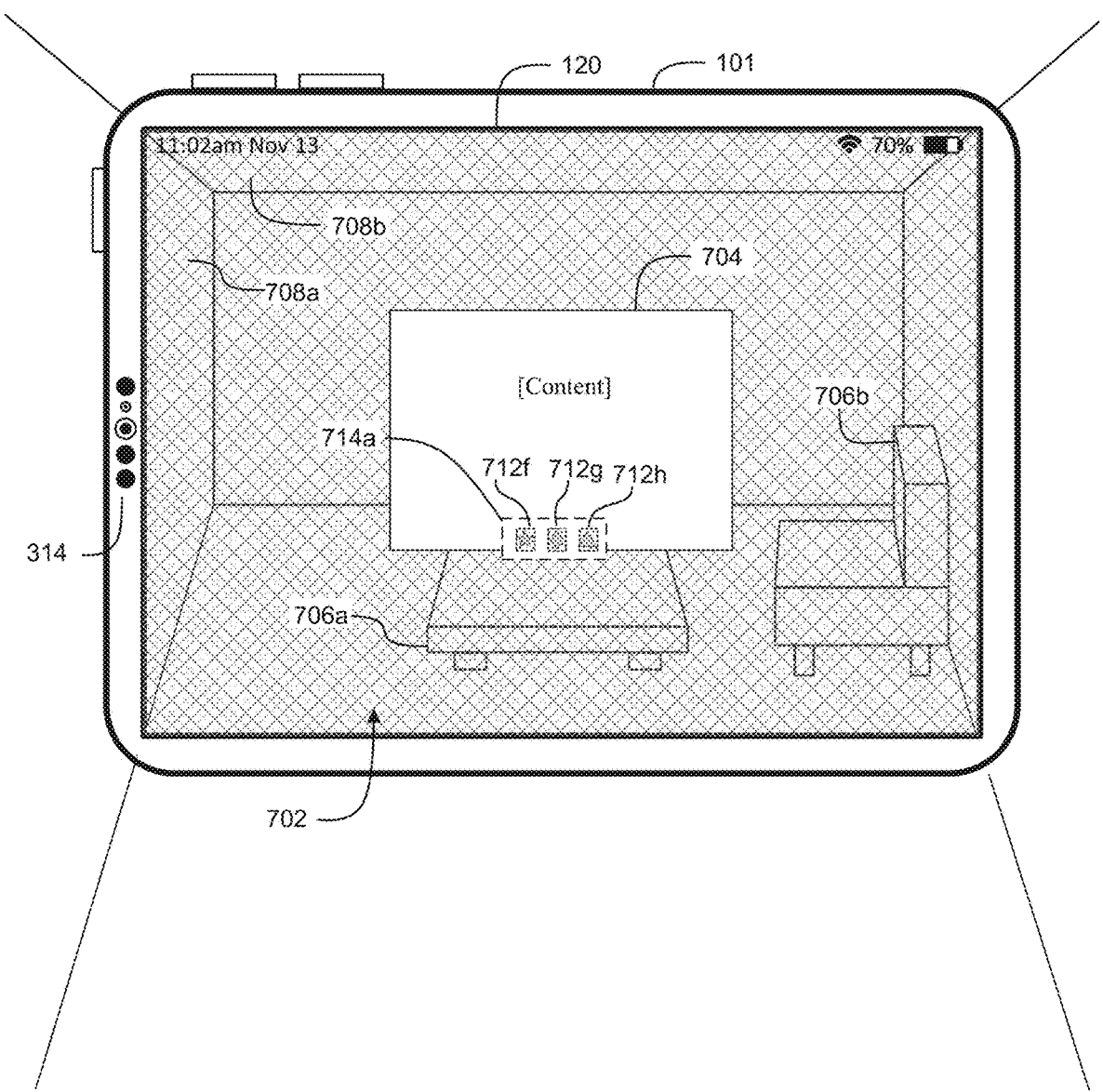

FIG. 7C is an alternative to FIG. 7B and illustrates a response of computer system 101 when computer system 101 detects the first input from the first portion of the user while the gaze of the user is not directed to (e.g., is directed away from) the second region 710 (e.g., as depicted by gaze points 713b, 713c in FIG. 7A).

In some embodiments, in response to detecting the first input from the first portion of the user and in accordance with a determination that the gaze of the user is not directed to the second region (e.g., as depicted by gaze points 713b, 713c in FIG. 7A), the computer system 101 forgoes displaying the second set of one or more controls in the increased-prominence state. For example, the computer system 101 forgoes displaying the second set of one or more controls as shown in FIG. 7B. Optionally, if the first input from the first portion of the user is detected while the first set of one or more controls is displayed in the reduced-prominence state, such as illustrated in FIG. 7A, the computer system 101 continues to display the first set of controls in the reduced-prominence state (as depicted in FIG. 7C) or ceases to display the first set of controls in the reduced-prominence state. Optionally, if the first input from the first portion of the user is detected while the computer system 101 is not displaying any controls (e.g., is not displaying the first set of controls in either the reduced-prominence state as shown in FIG. 7A or in an increased-prominence state), the computer system 101 continues to forgo display of the first set of one or more controls.

Figure 7D:
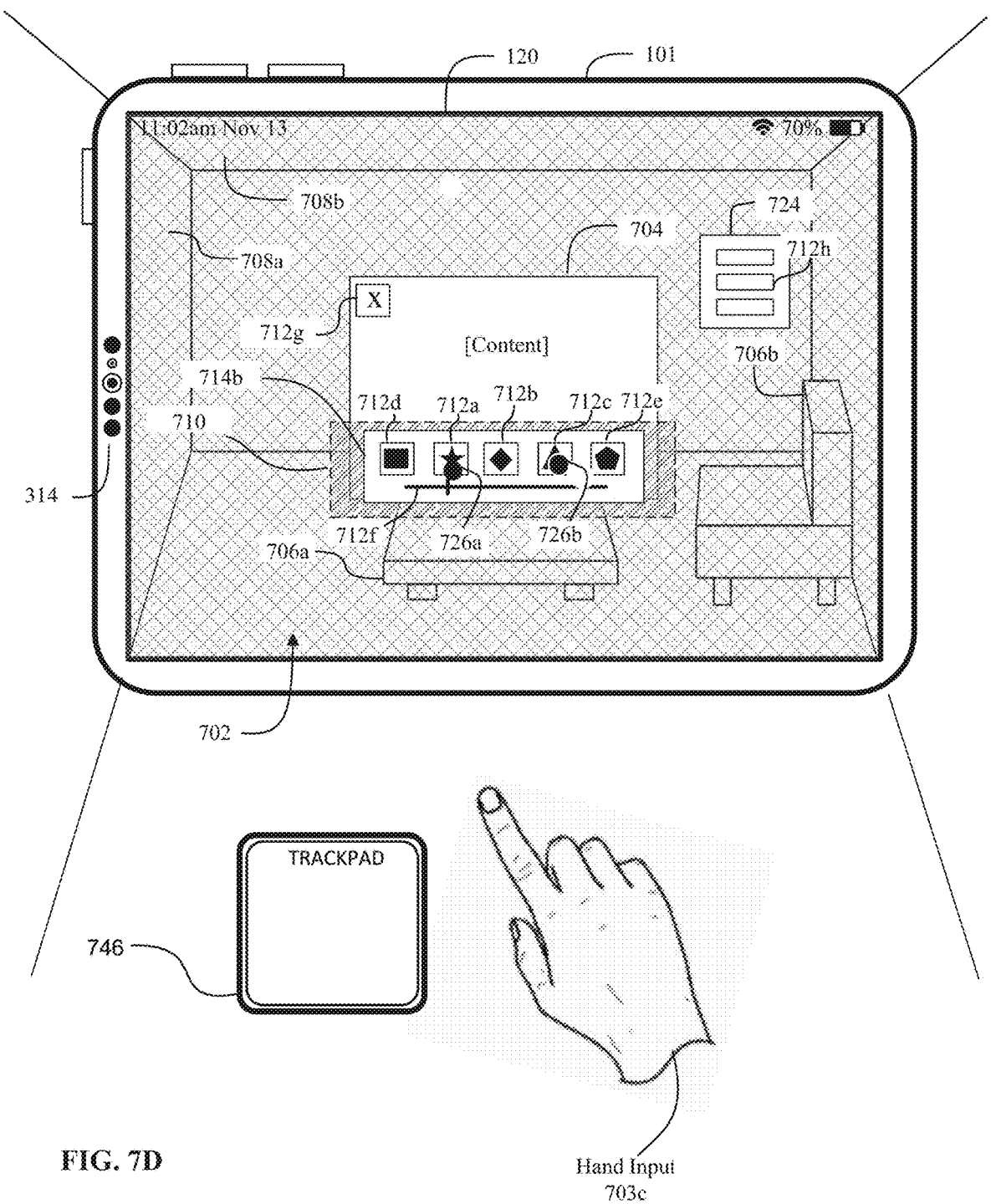
Figure 7E:
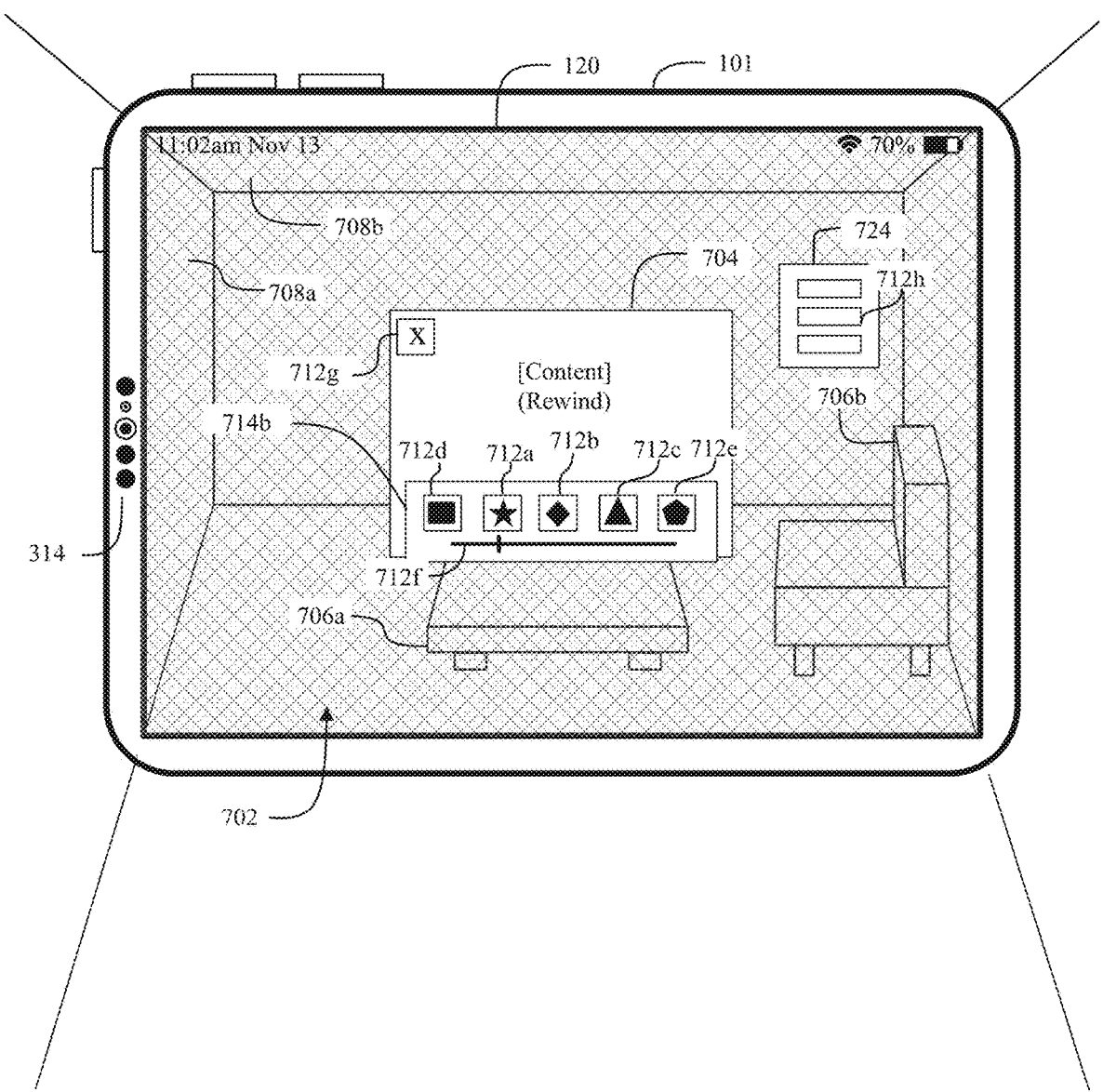
Figure 7F:
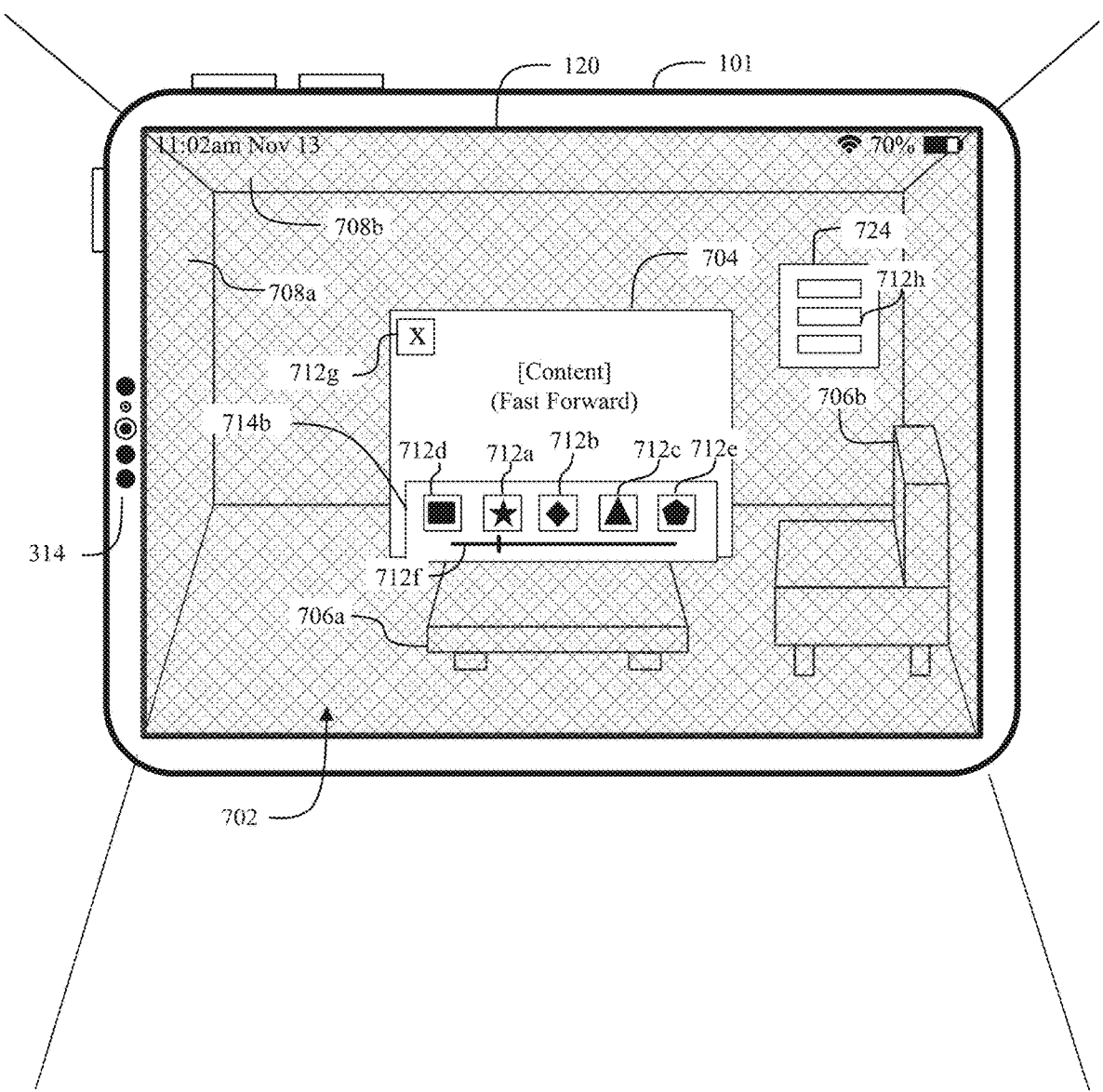
Figure 8A:
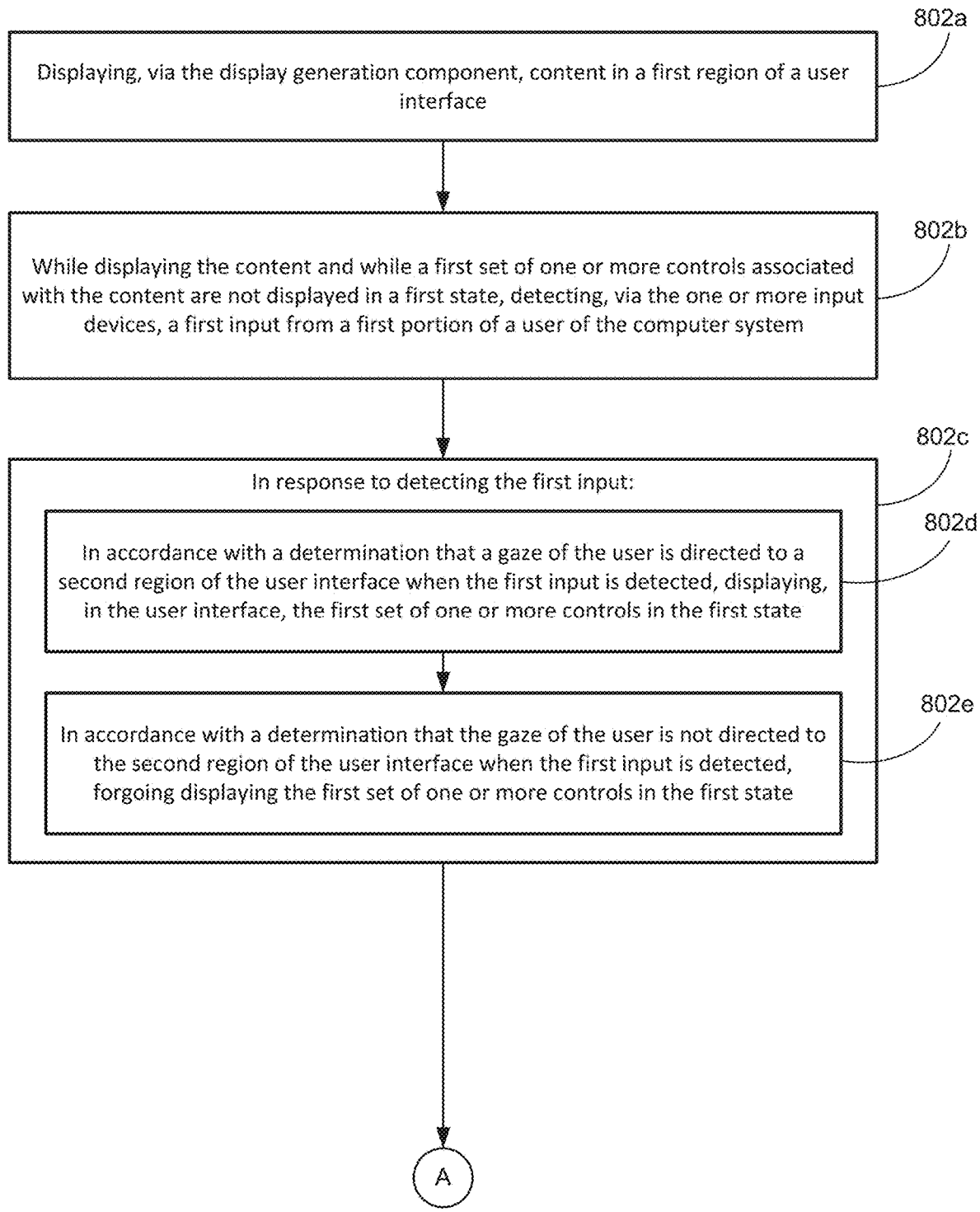
FIGS. 8A-8H depict a flow diagram of methods of displaying sets of controls in response to detecting gaze and/or gesture inputs in accordance with various embodiments.
Figure 8B:
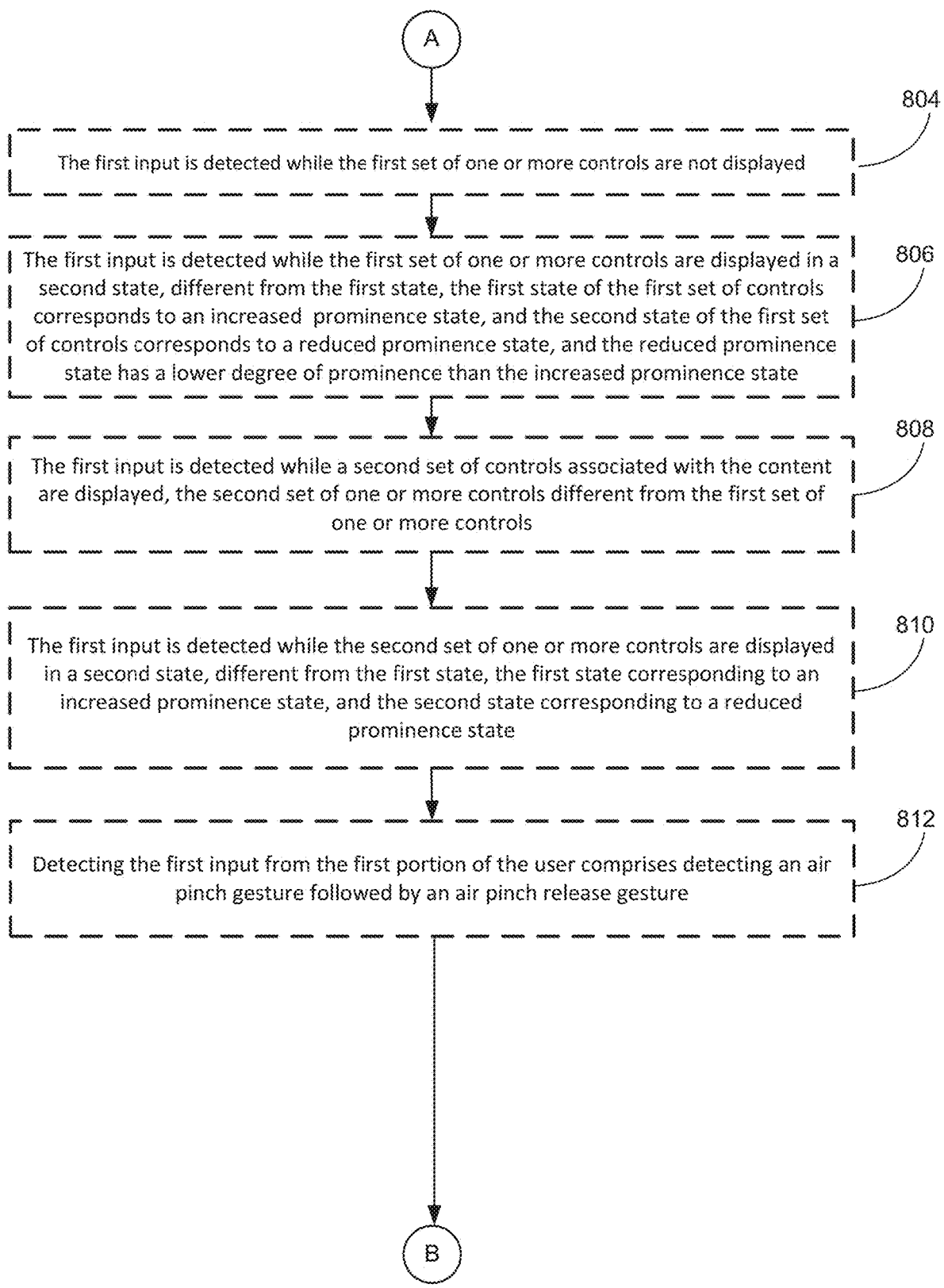
Figure 8C:
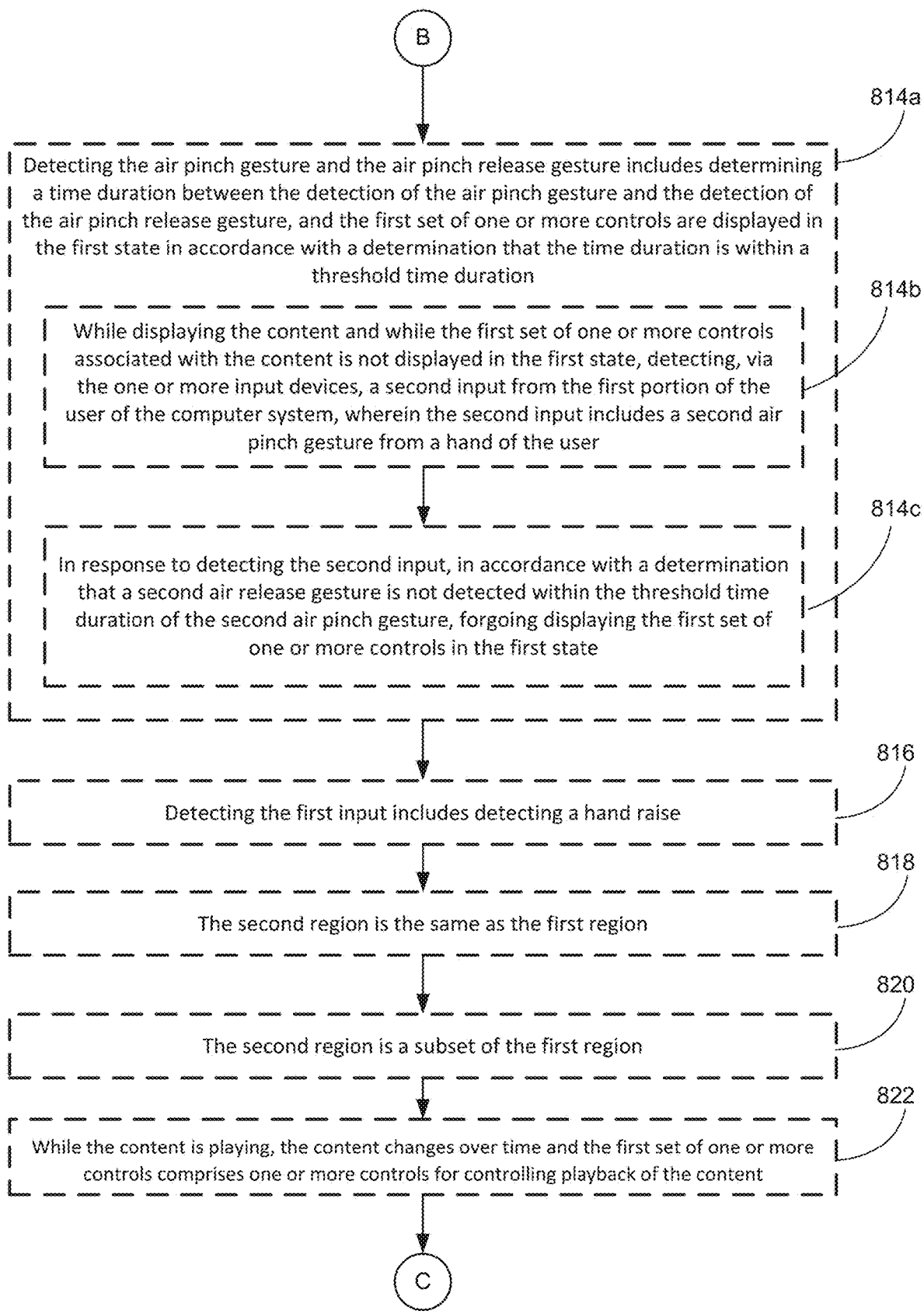
Figure 8D:
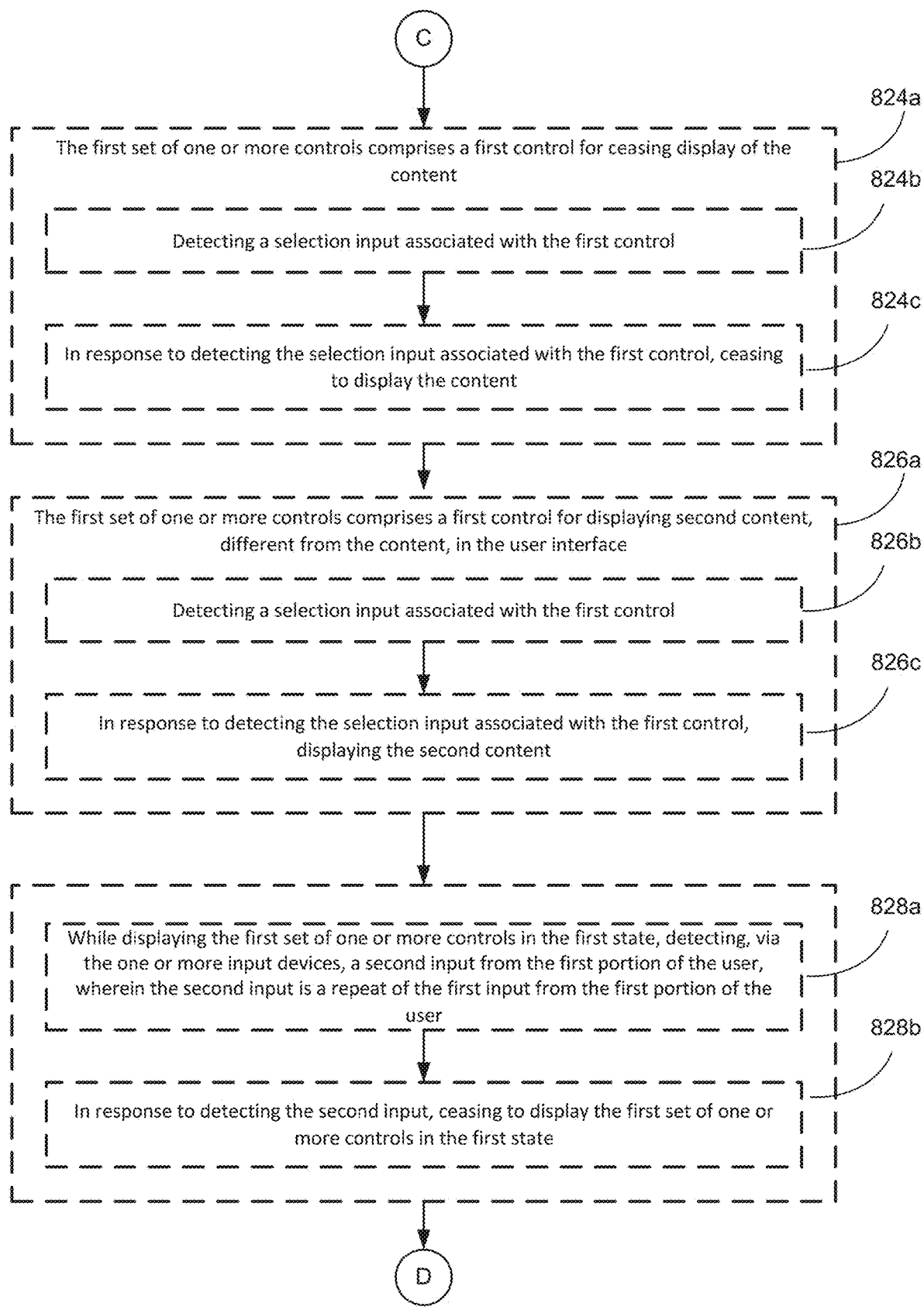
Figure 8E:
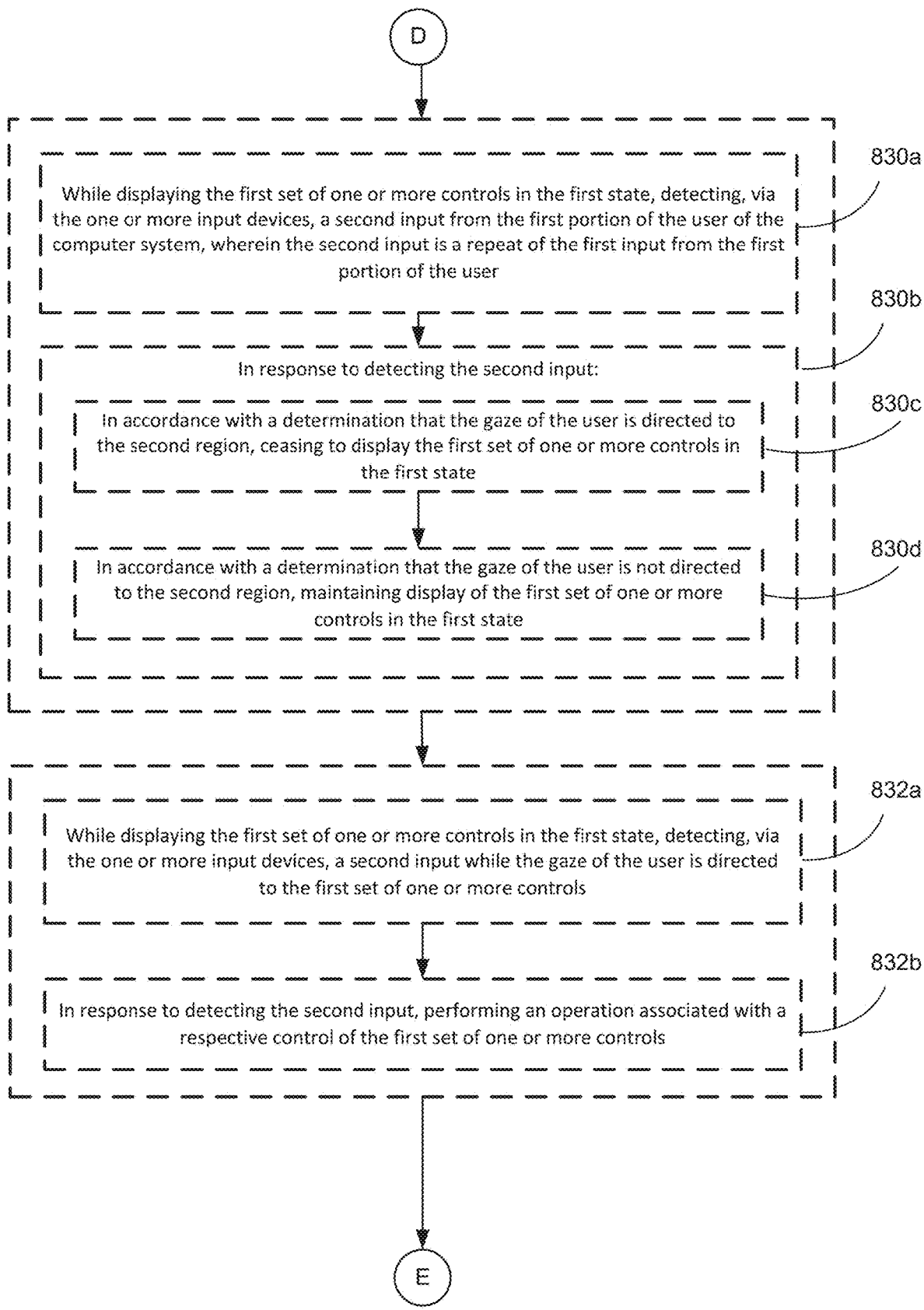
Figure 8F:
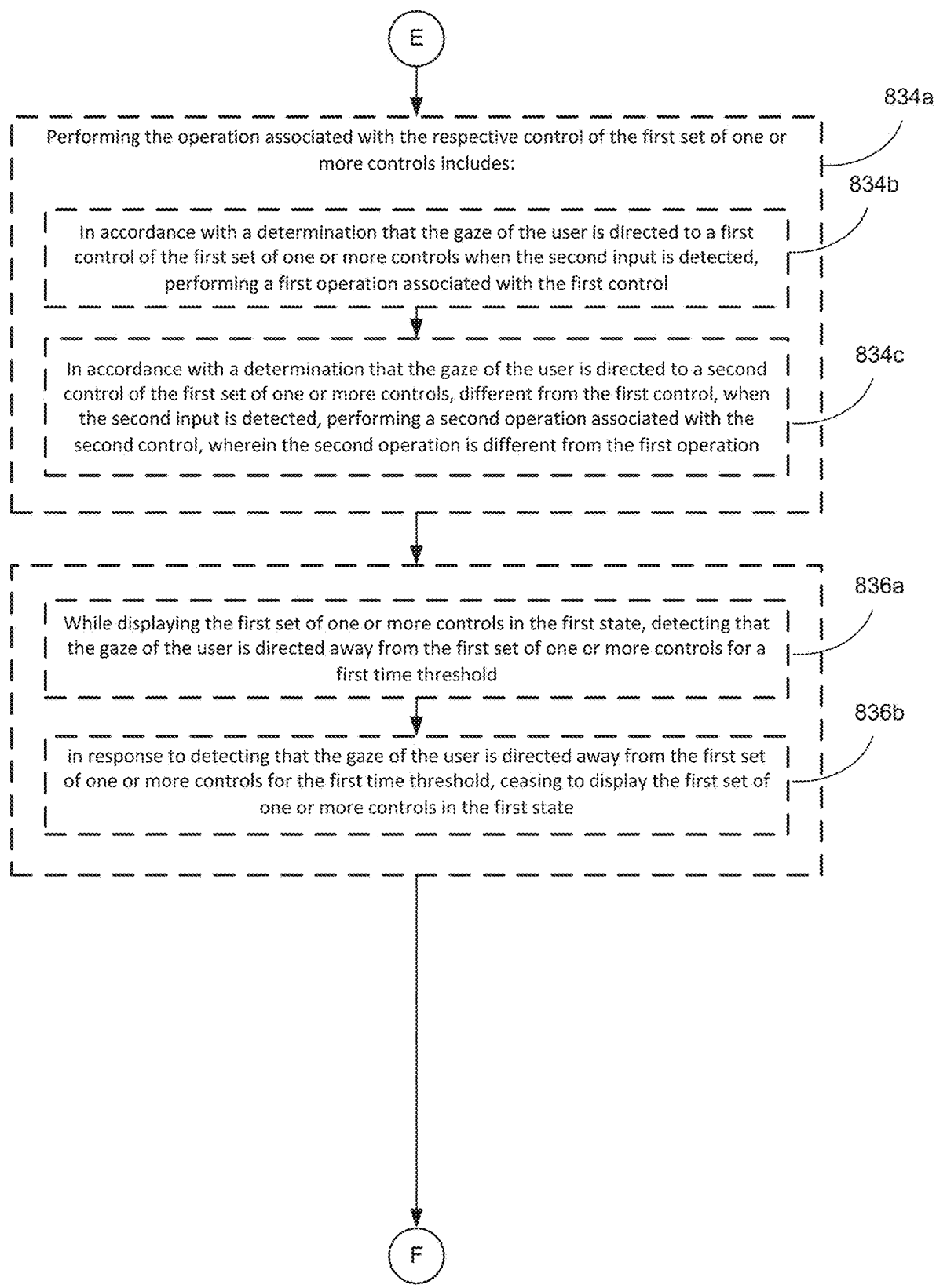
Figure 8G:
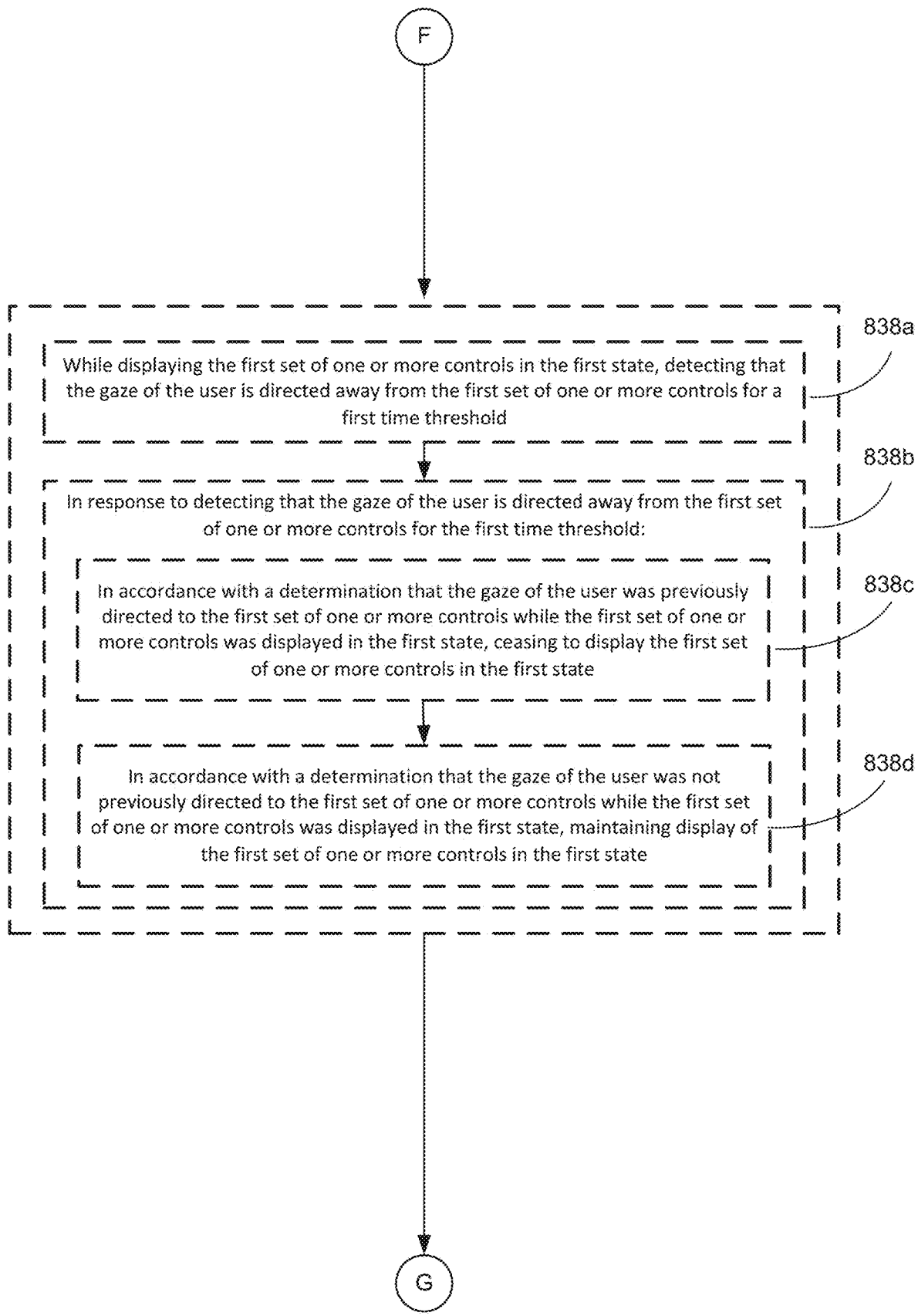
Figure 8H:
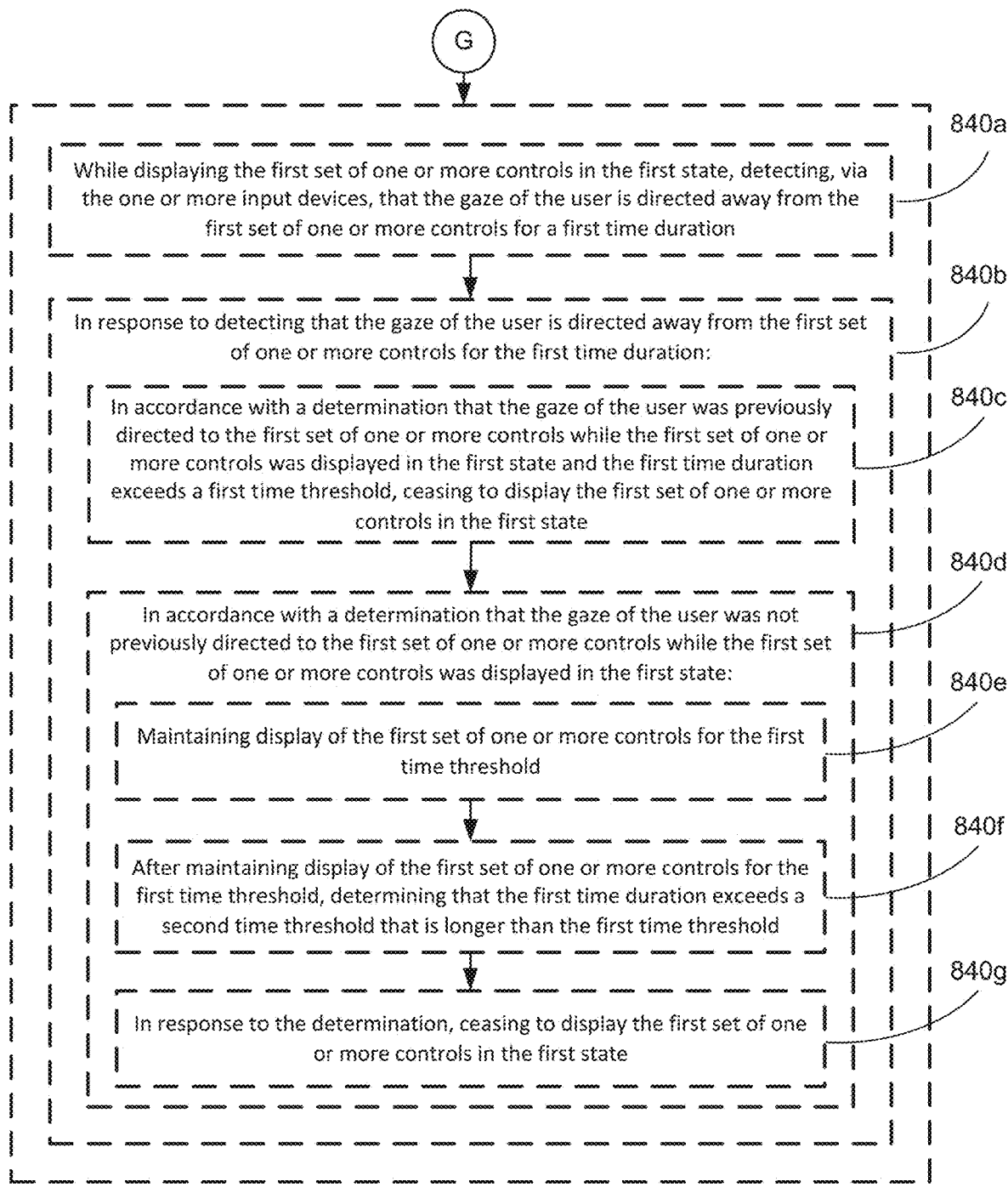

FIGS. 7D-7F depict example responses of computer system 101 when computer system 101 detects a selection input associated with a control that is displayed in an increased-prominence state.

A user may provide a selection input associated with a control of the second set of controls while the second set of one or more controls are displayed in an increased-prominence state (e.g., while the second set of one or more controls are displayed as shown in FIG. 7B). In the example of FIG. 7D, the user provides a selection input directed to location 726a associated with control 712a, or (alternatively) a selection input directed to location 726b associated with control 712c.

The selection input optionally includes an attention of the user (e.g., a gaze directed to the control), a hand input 703c that optionally includes a hand air gesture (e.g., an air pinch gesture with or without an subsequent air release gesture, a hand raise (e.g., to a ready state), a hand drop, and/or a wrist rotation), a finger movement, a head movement (e.g., tilt, and/or nod), and/or a touch input, button press, or rotation input directed to a hand-operated input device such as a remote control, mouse, or trackpad 746. In some embodiments, detecting a selection input associated with a control (e.g., control 712a, 712e) includes detecting a hand input 703c while a gaze of the user is directed to the control, such as by detecting an air pinch gesture while the gaze of the user is directed to the control.

FIG. 7D1 illustrates similar and/or the same concepts as those shown in FIG. 7D (with many of the same reference numbers). It is understood that unless indicated below, elements shown in FIG. 7D1 that have the same reference numbers as elements shown in FIGS. 7A-7F have one or more or all of the same characteristics. FIG. 7D1 includes computer system 101, which includes (or is the same as) display generation component 120. In some embodiments, computer system 101 and display generation component 120 have one or more of the characteristics of computer system 101 shown in FIGS. 9F and 7A-7F and display generation component 120 shown in FIGS. 1 and 3, respectively, and in some embodiments, computer system 101 and display generation component 120 shown in FIGS. 7A-7F have one or more of the characteristics of computer system 101 and display generation component 120 shown in FIG. 7D1.

In FIG. 7D1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 7A-7F.

In FIG. 7D1, display generation component 120 is illustrated as displaying content that optionally corresponds to the content that is described as being displayed and/or visible via display generation component 120 with reference to FIGS. 7A-7F. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7D1.

Display generation component 120 has a field of view (e.g., a field of view captured by external image sensors 314b and 314c and/or visible to the user via display generation component 120, indicated by dashed lines in the overhead view) that corresponds to the content shown in FIG. 7D1. Because display generation component 120 is optionally a head-mounted device, the field of view of display generation component 120 is optionally the same as or similar to the field of view of the user.

In FIG. 7D1, the user is depicted as performing a pointing gesture (e.g., with hand input 703c) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7F.

In some embodiments, computer system 101 responds to user inputs as described with reference to FIGS. 7A-7F.

In the example of FIG. 7D1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 7A-7F and/or described with reference to the corresponding method(s) are optionally implemented on computer system 101 and display generation unit 120 in a manner similar or analogous to that shown in FIG. 7D1.

As shown in FIG. 7E, in response to detecting a selection input directed to location 726a associated with control 712a while control 712a is displayed in the increased-prominence state as shown in FIG. 7D, computer system 101 optionally adjusts the playback position of the first content displayed in first region 704 backward by a predetermined amount or adjusts a playback direction and/or speed of the first content (e.g., rewinds the first content) as described with reference to FIG. 7A and as shown in FIG. 7E.

As shown in FIG. 7F, in response to detecting a selection input directed to location 726b associated with control 712c while control 712c is displayed in the increased-prominence state as shown in FIG. 7D, computer system 101 optionally adjusts the playback position of the first content forward by a predetermined amount or adjusts a playback direction and/or speed of the first content (e.g., fast-forwards the first content) as described with reference to FIG. 7A and as shown in FIG. 7F.

FIGS. 8A-8H depict a flowchart illustrating an exemplary method 800 of displaying sets of controls in response to detecting gaze and/or gesture inputs in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector), and one or more cameras (e.g., one or more cameras that point forward from the user's head or that point downward at a user's hand, such as color sensors, infrared sensors, and other depth-sensing cameras). In some embodiments, the method 800 is governed by instructions that are stored in a non-transitory computer-readable storage medium and that are executed by one or more processors of a computer system, such as the one or more processing units 202 of computer system 101 (e.g., controller 110 in FIG. 1A). Some operations in method 800 are, optionally, combined and/or the order of some operations is, optionally, changed.

In some embodiments, method 800 is performed at a computer system (e.g., 101) in communication with a display generation component (e.g., 120) and one or more input devices (e.g., 314, 746). For example, the computer system is or includes a mobile device (e.g., a tablet, a smartphone, a media player, or a wearable device), or a computer. In some embodiments, the display generation component is a display integrated with the electronic device (optionally a touch screen display), external display such as a monitor, projector, television, and/or a hardware component (optionally integrated or external) for projecting a user interface or causing a user interface to be visible to one or more users. In some embodiments, the one or more input devices include an electronic device or component capable of receiving a user input (e.g., capturing a user input, and/or detecting a user input) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor). In some embodiments, the computer system is in communication with a hand tracking device (e.g., one or more cameras, depth sensors, proximity sensors, and/or touch sensors (e.g., a touch screen, trackpad)). In some embodiments, the hand tracking device is a wearable device, such as a smart glove.

In some embodiments, the computer system displays (802a), via the display generation component, content in a first region (e.g., content displayed in first region 704 of FIG. 7A) of a user interface (e.g., three-dimensional environment 702). The user interface is optionally a two-dimensional user interface or a three-dimensional user interface and/or computer-generated environment. In some embodiments, the content is displayed in a three-dimensional environment such as an extended reality (XR) environment, a virtual reality (VR) environment, a mixed reality (MR) environment, or an augmented reality (AR) environment. The content optionally includes two-dimensional or three-dimensional media content (e.g., video content, still images, and/or three-dimensional simulated content) and/or audio content. The first region of the user interface is optionally a two-dimensional or three-dimensional area within which the content is presented in the user interface, and is optionally located at different locations in the user interface depending on the location of the content relative to the user interface.

In some embodiments, while displaying the content and while a first set of one or more controls associated with the content are not displayed in a first state (e.g., while displaying the content as shown in FIG. 7A and while a second set of one or more controls 712a, 712b, 712c, 712d, 712e, 712f, 712g, 712h as shown in FIG. 7B are not displayed in an increased prominence state), the computer system detects (802b), via the one or more input devices, a first input from a first portion of a user of the computer system (e.g., a hand input 703a as shown in FIG. 7A). The first set of one or more controls optionally include one or more controls for controlling the display of the content (such as a playback control, a fast-forward control, and/or a rewind control), volume controls, picture in a picture, content navigation, content close, and/or content expansion or contraction controls (e.g., as represented by the second set of one or more controls 712a, 712b, 712c, 712d, 712e, 712f, 712g, 712h in FIG. 7B). The first set of one or more controls are selectable to perform operations corresponding to the controls (e.g., as described with reference to FIGS. 7D, D1-7F). The first set of one or more controls optionally has a first number of controls. The first state is optionally an increased prominence state such as described with reference to FIG. 7B, and optionally includes a first transparency, specular highlights, blurring, size, and/or spacing between controls. When the first set of controls is not displayed in the first state, it is optionally displayed in a second state (e.g., with reduced prominence, in a reduced prominence state such as described with reference to FIG. 7A) or not displayed at all. If the first set of controls is not displayed at all, optionally, a second set of one or more controls (e.g., having a different number of controls) is displayed in the first state or a second state (e.g., a first set of one or more controls 712a, 712b, 712c are optionally displayed in a reduced prominence state such as shown in FIG. 7A). The first portion of the user is optionally a hand, finger, arm, or head, and the first input is optionally a hand air gesture (e.g., an air pinch gesture with or without an air pinch release gesture, a hand raise (e.g., to a ready state), a hand drop, and/or a wrist rotation), a finger movement, a head movement (e.g., tilt, and/or nod), and/or a touch input, button press, or rotation input directed to a hand-operated input device such as a remote control, mouse, or trackpad (e.g., trackpad 746 shown in FIG. 7A).

In some embodiments, in response to detecting the first input (802c), and in accordance with a determination that a gaze of the user is directed to a second region (e.g., second region 710 of FIG. 7A) of the user interface (e.g., as represented by gaze point 713a of FIG. 7A) when the first input is detected, the computer system displays (802d), in the user interface, the first set of one or more controls in the first state. For example, the computer system displays the second set of one or more controls 712a, 712b, 712c, 712d, 712e, 712f, 712g, 712h in an increased prominence state as shown in FIG. 7B. The second region of the user interface is optionally a region that is the same as the first region (e.g., the region in which the content is displayed), a portion of the first region, a region that overlaps with the first region but is different from the first region (e.g., as shown in FIG. 7A), or a separate region that is not coincident with the first region. The second region optionally corresponds to a region for displaying the first set of controls in the first state. The first set of one or more controls are optionally displayed within the second region, such as shown in FIG. 7A. The first set of one or more controls are optionally displayed within a visually delineated platter area (e.g., platter 714b of FIG. 7B).

In some embodiments, in response to detecting the first input (802c), and in accordance with a determination that the gaze of the user is not directed to the second region of the user interface when the first input is detected (e.g., as represented by gaze points 713b, 713c of FIG. 7A), the computer system forgoes (802e) displaying the first set of one or more controls in the first state. Optionally, the first set of one or more controls continues not to be displayed at all, or continues to be displayed in a second state (e.g., a reduced prominence state) different from the first state (e.g., with a second transparency, specular highlights, blurring, size, and/or spacing). Optionally, a second set of controls continues to be displayed (e.g., the first set of one or more controls 712a, 712b, 712c continues to be displayed as shown in FIG. 7A). Combining gesture and gaze for invoking display of controls reduces false positives, thereby reducing the likelihood that the user's experience will be interrupted by unintentional display of controls and reducing the need for additional inputs to correct such erroneous display of controls.

In some embodiments, the computer system detects (804) the first input while the first set of one or more controls are not displayed (e.g., while the second set of one or more controls 712*a*, 712*b*, 712*c*, 712*d*, 712*e*, 712*f*, 712*g*, 712*h* shown in FIG. 7B are not displayed). In some embodiments, the first set of one or more controls are not displayed at all; that is, they are not displayed in either the first state, the second state, or another state. Forgoing display of the controls in any state prior to detecting the input reduces visual clutter and avoids distracting the user from the content, thereby reducing errors in interaction between the user and the computer system.

In some embodiments, the computer system detects (806) the first input while the first set of one or more controls are displayed in a second state that is different from the first state. In some embodiments, the first state of the first set of controls corresponds to an increased (visual) prominence state (e.g., as described with reference to FIG. 7B), the second state of the first set of controls corresponds to a reduced (visual) prominence state (e.g., as described with reference to FIG. 7A), and the reduced prominence state has a lower degree of prominence than the increased prominence state. In some embodiments, the increased prominence state and/or reduced prominence state have one or more of the characteristics of the increased prominence state and/or reduced prominence state (respectively) of method 1000. In some embodiments, controls displayed in an increased prominence state have decreased transparency, increased simulated specular highlight effects, increased size, and/or increased spacing between controls relative to controls displayed in a reduced prominence state, such as shown in FIG. 7B relative to FIG. 7A. Initially displaying the set of controls in a reduced prominence state provides feedback to the user that the user has performed an input to invoke display of the controls and provides a visual target for the user to proceed with activating the controls, thereby reducing errors in interaction, without visually distracting from the content if the user performed the input unintentionally.

In some embodiments, the computer system detects the first input while a second set of controls associated with the content are displayed (e.g., first set of one or more controls 712*a*, 712*b*, 712*c* of FIG. 7A), where the second set of one or more controls is different from the first set of one or more controls (808). In some embodiments, the second set of controls includes fewer controls than the first set of controls. For example, the first set of one or more controls 712*a*, 712*b*, 712*c* show in FIG. 7A has fewer controls than the second set of one or more controls 712*a*, 712*b*, 712*c*, 712*d*, 712*e*, 712*f*, 712*g*, 712*h* shown in FIG. 7B. In some examples, the second set of controls is a subset of the first set of controls. For example, the second set of controls optionally includes a play/pause control, a fast-forward control, and/or a reverse control as shown in FIG. 7A, but excludes other controls that are included in the first set of controls, such as a picture-in-picture control, a navigation control, and/or a close control as shown in FIG. 7B. Initially displaying a set of controls with fewer controls consumes less space than displaying the full set of controls, thereby providing feedback to the user that the user has performed an input to invoke display of the controls along with providing a visual target for the user to proceed with activating the controls, thereby reducing errors in interaction, without visually distracting from the content if the user performed the input unintentionally.

In some embodiments, the computer system detects (810) the first input while the second set of one or more controls (e.g., first set of one or more controls 712*a*, 712*b*, 712*c*) are displayed in a second state that is different from the first state (e.g., the controls are displayed in a reduced prominence state as shown in FIG. 7A). In some embodiments, the first state corresponds to an increased (visual) prominence state, and the second state corresponds to a reduced (visual) prominence state. Controls displayed in an increased prominence state optionally have decreased transparency, increased specular highlights, increased size, and/or increased spacing between controls relative to controls displayed in a reduced prominence state. Initially displaying the set of controls in a reduced prominence state provides feedback to the user that the user has performed an input to invoke display of the controls and provides a visual target for the user to proceed with activating the controls, without visually distracting from the content if the user performed the input unintentionally.

In some embodiments, detecting the first input from the first portion of the user includes detecting an air pinch gesture followed by an air pinch release gesture (812), such as if hand input 703*a* in FIG. 7A includes an air pinch gesture followed by an air pinch release gesture. In some embodiments, an air pinch gesture is detected when an index finger and a thumb of a hand of the user come together to make contact. In some embodiments, an air pinch release gesture is detected when the index finger and the thumb move apart and/or are separated and cease to make contact. In some embodiments, the first input is detected via a hand-tracking device and/or a hand motion sensor. Enabling the user to invoke display of the controls using a pinch gesture followed by a release gesture provides a simple input mechanism that is relatively easy to distinguish from other types of user gestures. It is intuitive to the user because it mimics using a hand to grasp or operate a physical control. Including the detection of a release gesture reduces false positives that might otherwise arise when the user performs activities that may include gestures similar to pinching, such as grasping physical items in the user's surroundings.

In some embodiments, detecting the air pinch gesture and the air pinch release gesture (e.g., detecting hand input 703*a* of FIG. 7A) includes determining a time duration between the detection of the air pinch gesture and the detection of the air pinch release gesture (814*a*), and the first set of one or more controls is displayed in the first state in accordance with a determination that the time duration is within a threshold time duration (e.g., 05, 0.1, 0.25, 0.5, 0.75, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 seconds). In some embodiments, while displaying the content and while the first set of one or more controls associated with the content is not displayed in the first state (e.g., while second set of one or more controls 712*a*, 712*b*, 712*c*, 712*d*, 712*e*, 712*f*, 712*g*, 712*h* are not displayed), the computer system detects (814*b*), via the one or more input devices, a second input from the first portion of the user of the computer system, where the second input includes a second air pinch gesture from the hand of the user (e.g. a second hand input 703*a*). In some embodiments, the second input has one or more of the characteristics of the first input. In some embodiments, the second air pinch gesture is followed by a second air pinch release gesture. In some embodiments, the second air pinch gesture is not followed by a second air pinch release gesture, and/or a second air pinch release gesture is not detected following the second air pinch gesture within the threshold time duration. In some embodiments, in response to detecting the second input and in accordance with a determination that a second air pinch release gesture is not detected by the computer system within the threshold time duration of the second air pinch gesture, the computer system forgoes (814*c*) displaying the first set of one or more controls in the first state. For example, the computer system does not display the second set of one or more controls 712a, 712b, 712c, 712d, 712e, 712f, 712g, 712h in the increased prominence state shown in FIG. 7B, and instead, optionally continues to display the first set of one or more controls 712a, 712b, 712c as shown in FIG. 7A (e.g., if the first set of one or more controls was displayed when the second input was detected). In some embodiments, determining the time duration between the detection of the air pinch gesture and the air pinch release gesture includes starting a timer when the air pinch gesture is detected and stopping the timer when the air pinch release gesture is detected. Requiring the pinch release gesture to be detected within a threshold time duration of the pinch gesture provides an additional indication that the user intended to invoke display of the controls, thereby further reducing false positives.

In some embodiments, detecting the first input includes detecting a hand raise (816) (e.g., if hand input 703a in FIG. 7A includes a hand raise). In some embodiments, the hand raise has one or more of the characteristics of the hand raise of method 1000. Optionally, the hand raise is a raise of the same hand used for performing the air pinch gesture and (optionally) air pinch release gesture described with reference to step 812. In some embodiments, a hand raise is detected when a hand of the user moves from a first position to a second position, where the second position is above the first position in a reference frame associated with an environment of the user, such as a reference frame defined by a direction of gravity and/or a direction of horizon orthogonal to the direction of gravity. In some embodiments, the first input is detected via a hand-tracking device and/or a hand motion sensor. In some embodiments, the hand raise requires that the hand move more than a threshold distance (e.g., 0.01, 0.05, 0.1, 0.2, 0.3, 0.4, or 0.5 meters) and/or move at more than a threshold velocity (e.g., 0.001, 0.005, 0.01, 0.02, or 0.03 meters/second); otherwise, the first input optionally does not result in display of the first set one or more controls in the first state. In some embodiments, if the first input corresponds to hand movement that does not include the above characteristics, the first input does not result in display of the first set one or more controls in the first state. Enabling the user to invoke display of the controls using a hand raise provides a simple input mechanism that is relatively easy to distinguish from other types of user gestures. It is intuitive to the user because the hand raise motion "brings up" the controls.

In some embodiments, the second region (e.g., second region 710 of FIG. 7A) is the same as the first region (e.g., first region 704 of FIG. 7A) (818). In some embodiments, the second region includes the full area in which the content is displayed. In some embodiments, the edges and/or area of the second region are coincident with the edges and/or area of the first region. Requiring the user to be looking at the content display region when the input is detected increases the likelihood that the user intended to invoke the controls associated with the content and reduces the likelihood of false positives.

In some embodiments, the second region (e.g., second region 710 of FIG. 7A) is a subset of the first region (e.g., first region 704 of FIG. 7A) (820). The second region is optionally a predefined subset of the first region. The second region is optionally smaller than the first region. In some embodiments, the second region is within or the same as a lower portion of the first region, such as a lower half, third, or quarter of the first region. In some embodiments, the second region is within or the same as an upper portion of the first region, such as an upper half, third, or quarter of the first region. In some embodiments, the second region is within or the same as a middle portion of the first region, such as a middle half, third, or quarter of the first region. In some embodiments, the second region spans a width that is narrower than the first region. In some embodiments, at least one edge of the second region is coincident with an edge of the first region. Requiring the user to be looking at a particular region associated with invoking the controls when the input is detected increases the likelihood that the user intended to invoke the controls and reduces the likelihood of false positives.

In some embodiments, while the content is playing, the content changes over time and the first set of one or more controls (e.g., second set of one or more controls 712a, 712b, 712c, 712d, 712e, 712f, 712g, 712h of FIG. 7B) includes one or more controls for controlling playback of the content (822). In some embodiments, the one or more controls for controlling playback of the content optionally include a play/pause toggle control for pausing (e.g., stopping) and starting playback of the content at a first speed (e.g., control 712b), a fast-forward control for advancing the content forward at a second speed faster than the first speed (e.g., control 712c), a reverse control for reversing playback of the content at the second speed faster than the first speed (e.g., control 712a), a scrubber control for navigating to a particular timestamp in the content (e.g., control 712f), and/or a volume control for changing a volume of the content. In some embodiments, in response to detecting a selection input (e.g., as described herein and represented by inputs directed to location 726a or 726b of FIGS. 7D and 7D1) corresponding to a respective control of the one or more controls (e.g., controls 712a, 712c of FIGS. 7D and 7D1, respectively), the system performs an operation associated with the respective control (e.g., as shown in FIGS. 7E and 7F). Displaying playback controls in response to detecting the user input allows the user to control playback when desired without visually cluttering the display when the user has not indicated that they want to interact with controls associated with the content.

In some embodiments, the first set of one or more controls includes a first control (e.g., 712g of FIG. 7B) for ceasing display of the content (824a). In some embodiments, the computer system detects a selection input associated with the first control (824b). The selection input optionally includes attention (e.g., directed to the first control), a hand air gesture (e.g., an air pinch gesture with or without an air pinch release gesture, a hand raise (e.g., to a ready state), a hand drop, and/or a wrist rotation), a finger movement, a head movement (e.g., tilt, and/or nod), and/or a touch input, button press, or rotation input directed to a hand-operated input device such as a remote control, mouse, or trackball. In some embodiments, in response to detecting the selection input associated with the first control, the computer system ceases to display the content (824c). In some embodiments, selecting the first control causes the content to cease to be displayed. In some embodiments, after the content has ceased to be displayed, other content, objects, or areas are displayed in the same location of and/or in place of the content in the computer-generated environment. In some embodiments, the first control, when selected, also causes the first set of controls to cease to be displayed. Displaying a control for ceasing display of the content in response to detecting the user input allows the user to exit the content when desired without visually cluttering the display when the user has not indicated that they want to interact with controls associated with the content.

In some embodiments, the first set of one or more controls includes a first control for displaying second content that is different from the content (e.g., control 712h of FIG. 7B) in the user interface (826a). In some embodiments, the computer system detects a selection input (e.g., as described with reference to step 824b) associated with the first control (826b). In some embodiments, in response to detecting the selection input associated with the first control, the computer system displays the second content (826c). In some embodiments, the first control allows the user to select or navigate to different content, such as by selecting an affordance (e.g., represented by control 712h) corresponding to the second content. In some embodiments, the second content includes two-dimensional or three-dimensional media content (e.g., video content, still images, and/or three-dimensional simulated content) and/or audio content. In some embodiments, in response to detecting a selection of the first control, the second content is displayed and, optionally, the content ceases to be displayed. In some embodiments, the second content is displayed in the first region (e.g., first region 704 of FIG. 7B, the same region in which the content was displayed), a subset of the first region, a region that overlaps with the first region but is different from the first region, or a separate region that is not coincident with the first region. In some embodiments, the first control is included in a navigation menu (e.g., menu 724) for the application that is playing the content, such that selection of the first control causes the application to display a different portion of the content that is available via the application. Displaying a control for switching to different content in response to detecting the user input allows the user to switch to different content when desired without visually cluttering the display when the user has not indicated that they want to interact with controls associated with the content.

In some embodiments, while displaying the first set of one or more controls in the first state, the computer system detects (828a), via the one or more input devices, a second input from the first portion of the user (e.g., hand input 703b of FIG. 7B), where the second input is a repeat of the first input from the first portion of the user (e.g., hand input 703a of FIG. 7A). In some embodiments, the second input has one or more of the characteristics of the first input. In some embodiments, the second input includes an air pinch gesture, an air pinch release gesture (e.g., following the air pinch gesture), and/or a hand raise gesture. In some embodiments, in response to detecting the second input, the computer system ceases (828b) to display the first set of one or more controls in the first state. For example, the computer system ceases to display the second set of one or more controls 712a, 712b, 712c, 712d, 712e, 712f, 712g, 712h in the increased prominence state shown in FIG. 7B. In some embodiments, after ceasing to display the first set of controls in the first state, the computer system forgoes displaying any set of controls in any state in response to the second input. In some embodiments, after ceasing to display the first set of one or more controls in the first state, the computer system displays the first set of one or more controls in the second state (e.g., in a reduced prominence state) in response to the second input. In some embodiments, after ceasing to display the first set of one or more controls in the first state, the computer system displays a second set of one or more controls in the second state in response to the second input. For example, the computer system displays the first set of one or more controls 12a, 712b, 712c in a reduced prominence state as shown in FIG. 7A. Enabling the user to dismiss display of the first set of controls in the first state (e.g., in an increased prominence state) using the same input as was previously used to invoke the display of the first set of controls in the first state provides an intuitive and simple interface for the user because the user does not need to remember multiple types of inputs for invoking and dismissing display of the controls, thereby simplifying the operation of the user interface.

In some embodiments, while displaying the first set of one or more controls in the first state (e.g., as shown in FIG. 7B), the computer system detects (830a), via the one or more input devices, a second input from the first portion of the user (e.g., hand input 703b of FIG. 7B) of the computer system, where the second input is a repeat of the first input from the first portion of the user (e.g., hand input 703a of FIG. 7A). In some embodiments, the second input has one or more of the characteristics of the first input. In some embodiments, the second input includes an air pinch gesture, an air pinch release gesture (e.g., following an air pinch gesture), and/or a hand raise gesture. In some embodiments, in response to detecting the second input (830b) and in accordance with a determination that the gaze of the user (e.g., represented by gaze point 713d of FIG. 7B) is directed to the second region (e.g., second region 710 of FIG. 7B), the computer system ceases (830c) to display the first set of one or more controls in the first state For example, the computer system ceases to display the second set of one or more controls 712a, 712b, 712c, 712d, 712e, 712f, 712g, 712h in the increased prominence state shown in FIG. 7B. In some embodiments, after ceasing to display the first set of controls in the first state, the computer system forgoes displaying any set of controls in any state in response to the second input. In some embodiments, after ceasing to display the first set of one or more controls in the first state, the computer system displays the first set of one or more controls in the second state (e.g., in a reduced prominence state, as described with reference to FIG. 7A). In some embodiments, after ceasing to display the first set of one or more controls in the first state, the computer system displays a second set of one or more controls in the second state. For example, the computer system displays the first set of one or more controls 712a, 712b, 712c in a reduced prominence state as shown in FIG. 7A. In some embodiments, in response to detecting the second input (830b) and in accordance with a determination that the gaze of the user is not directed to the second region, the computer system maintains (830d) display of the first set of one or more controls in the first state. For example, the computer system continues to display the second set of one or more controls 712a, 712b, 712c, 712d, 712e, 712f, 712g, 712h in the increased prominence state shown in FIG. 7B. Dismissing display of the controls only when the user is looking at a particular region (such as a region in which the content and/or the set of controls is displayed) provides an additional verification that the second input indicates that the user intended to dismiss the controls, thereby reducing false positives. If the user is not looking at the particular region when the second input was detected, the user may not have intended to dismiss the controls, and thus the display of controls is maintained.

In some embodiments, while displaying the first set of one or more controls in the first state (e.g., as shown in FIGS. 7D and 7D1), the computer system detects (832a), via the one or more input devices, a second input (e.g., hand input 703c) while the gaze of the user is directed to the first set of one or more controls (e.g., as represented by locations 726a and 726b). In some embodiments, the second input has one or more characteristics of the first input (e.g., hand input 703a). In some embodiments, the second input includes a hand air gesture (e.g., an air pinch gesture with or without an air pinch release gesture, a hand raise (e.g., to a ready state), a hand drop, and/or a wrist rotation), a finger movement, a head movement (e.g., tilt, and/or nod), and/or a touch input, button press, or rotation input directed to a hand-operated input device such as a remote control, mouse, or trackball. In some embodiments, in response to detecting the second input, the computer system performs (832*b*) an operation associated with a respective control of the first set of one or more controls (e.g., as shown in FIGS. 7E and 7F). In some embodiments, the gaze of the user is directed to the first set of one or more controls when the gaze of the user is directed to a respective control of the first set of one or more controls (e.g., to control 712*a*, 712*b*, 712*c*, 712*d*, 712*e*, 712*f*, 712*g*, or 712*h*), or to the second region (e.g., second region 710), and/or to a platter area (e.g., platter 714*b*) within which and/or on which the first set of one or more controls are displayed. In some embodiments, the operation causes the speed of the display of the content to change (such as by causing playing, pausing, fast-forwarding, or reversing of the content), causes the volume of the content to change (such as by increasing or decreasing the volume), causes the display of the content to change to a picture-in-a-picture display, causes the device to display different content, causes the content to close, and/or causes the display of the content to expand or contract (e.g., such that an area in which the content is displayed becomes larger or smaller). The described technique allows a user to look at the set of controls and then provide an input to perform an operation associated with one of the controls. In this approach, the user need only look in the direction of the controls to begin the process of using the controls, rather than needing to (for example) navigate a cursor towards the controls. The user can then provide the input to activate the operation associated with the control without looking away from the content; that is, the user need not look at another device or another user interface to perform the operation, thereby enabling the user to continue to focus on the content and improving the user experience.

In some embodiments, performing the operation associated with the respective control of the first set of one or more controls includes (834*a*), in accordance with a determination that the gaze of the user is directed to a first control (e.g., control 712*a*) of the first set of one or more controls when the second input (e.g., hand input 703*c*) is detected, performing (834*b*) a first operation associated with the first control (e.g., as shown in FIG. 7E). In some embodiments, performing the operation associated with the respective control of the first set of one or more controls includes (834*a*), in accordance with a determination that the gaze of the user is directed to a second control (e.g., control 712*c*) of the first set of one or more controls, different from the first control, when the second input (e.g., hand input 703*c*) is detected, performing (834*c*) a second operation associated with the second control (e.g., as shown in FIG. 7F), where the second operation is different from the first operation. Therefore, in some embodiments, the control that is selected in response to the second input is different depending on the direction of the user's gaze when the second input was detected. In some embodiments, the first operation causes the speed of the display of the content to change (such as by causing playing, pausing, fast-forwarding, or reversing of the content), causes the volume of the content to change (such as by increasing or decreasing the volume), causes the display of the content to change to a picture-in-a-picture display, causes the device to display different content, causes the content to close, and/or causes the display of the content to expand or contract (e.g., such that an area in which the content is displayed becomes larger or smaller). Determining which control is selected based on the gaze of the user provides allows the user to select and activate a control without looking away from the content; that is, the user need not look at another device or another user interface to navigate to the desired control and perform an operation, thereby improving the user experience by enabling the user to continue to focus on the content.

In some embodiments, while displaying the first set of one or more controls in the first state (e.g., as shown in FIG. 7B), the computer system detects (836*a*) that the gaze of the user is directed away from the first set of one or more controls (e.g., as represented by gaze point 713*c*) for a first time threshold (e.g., 05, 0.1, 0.25, 0.5, 0.75, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 seconds). In some embodiments, in response to detecting that the gaze of the user is directed away from the first set of one or more controls for the first time threshold, the computer system ceases to display (836*b*) the first set of one or more controls in the first state. In some embodiments, the gaze of the user is directed away from the first set of one or more controls when the gaze of the user is directed away from all of the controls of the first set of one or more controls, away from the second region (e.g., second region 710), and/or away from a platter area (e.g., platter 714*b*) within which the first set of one or more controls are displayed. In some embodiments, detecting that the gaze of the user is directed away from the set of controls for the first time threshold includes starting a timer when the gaze of the user is detected to be directed away the first set of controls and measuring the time duration during which the gaze of the user is continuously directed away from the first set of controls. In some embodiments, the computer system maintains display of the first set of one or more controls in the first state until the first time threshold is reached. Using the direction of the user's gaze to determine whether the user wants to interact with the first set of controls and dismissing display of the controls if it appears, based on the direction of gaze, that the user does not want to interact with the controls allows the device to predict what the user wants to do and respond appropriately without requiring the user to provide explicit inputs to dismiss the controls, thereby improving the user experience.

In some embodiments, while displaying the first set of one or more controls in the first state (e.g., as shown in FIG. 7B), the computer system detects (838*a*) that the gaze of the user is directed away from the first set of one or more controls (e.g., as represented by gaze point 713*c*) for a first time threshold (e.g., 05, 0.1, 0.25, 0.5, 0.75, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 seconds). In some embodiments, in response to detecting that the gaze of the user is directed away from the first set of one or more controls for the first time threshold (838*b*) and in accordance with a determination that the gaze of the user was previously directed to the first set of one or more controls while the first set of one or more controls was displayed in the first state (e.g., as represented by gaze point 713*d*), the computer system ceases to display (838*c*) the first set of one or more controls in the first state. In some embodiments, the computer system maintains display of the first set of one or more controls in the first state (e.g., as shown in FIG. 7B) until the first time threshold is reached. In some embodiments, in response to detecting that the gaze of the user is directed away from the first set of one or more controls for the first time threshold (838*b*) and in accordance with a determination that the gaze of the user was not previously directed to the first set of one or more controls while the first set of one or more controls was displayed in the first state, the computer system maintains display (838d) of the first set of one or more controls in the first state (e.g., as shown in FIG. 7B). In some embodiments, the gaze of the user is directed away from the first set of one or more controls when the gaze of the user is directed away from all of the controls of the first set of one or more controls (e.g., controls 712a, 712b, 712c, 712d, 712e, 712f, 712g, 712h), away from the second region (e.g., second region 710), and/or away from a platter area (e.g., platter 714b) within which the first set of one or more controls are displayed. In some embodiments, the gaze of the user was previously directed to the first set of one or more controls when the gaze of the user was directed to a respective control of the first set of one or more controls, or to the second region, and/or to a platter area within which the first set of one or more controls are displayed (e.g., as represented by gaze point 713d), before detecting that the gaze of the user is directed away from the first set of one or more controls. In some embodiments, detecting that the gaze of the user is directed away from the set of controls for the first time threshold includes starting a timer when the gaze of the user is detected to be directed away the first set of controls and measuring the time duration during which the gaze of the user is continuously directed away from the first set of controls. In some embodiments, the first time threshold is 0.05, 0.1, 0.25, 0.5, 0.75, 1, 2, 3, 4, or 5 seconds. The described approach uses the direction of the user's gaze (and optionally, a change in the direction of the user's gaze) to better predict whether the user intends to interact with the set of controls, and to dismiss the controls if it is unlikely that the user intends to interact with them. For example, if the user invokes display of the controls, looks at the controls, and then looks away, it is less likely to that the user wants to interact with the controls. Thus, in this case, the display of the controls is dismissed. In contrast, if the user invokes display of the controls but has not yet looked at them, the user may still want to interact with the controls, and thus the display of the controls is maintained. This approach provides a better user experience by anticipating the needs of the user, thereby requiring fewer user inputs for ceasing display of the controls and reducing erroneous display or dismissal of the controls.

In some embodiments, while displaying the first set of one or more controls in the first state (e.g., as shown in FIG. 7B), the computer system detects, via the one or more input devices, that the gaze of the user is directed away from the first set of one or more controls (e.g., as represented by gaze point 713e) for a first time duration (840a). In some embodiments, in response to detecting that the gaze of the user is directed away from the first set of one or more controls for the first time duration (840b) and in accordance with a determination that the gaze of the user was previously directed to the first set of one or more controls while the first set of one or more controls was displayed in the first state (e.g., as represented by gaze point 713d) and the first time duration exceeds a first time threshold (e.g., 05, 0.1, 0.25, 0.5, 0.75, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 seconds) the computer system ceases to display (840c) the first set of one or more controls in the first state. In some embodiments, in response to detecting that the gaze of the user is directed away from the first set of one or more controls for the first time duration (840a) and in accordance with a determination that the gaze of the user was not previously directed to the first set of one or more controls while the first set of one or more controls was displayed in the first state, the computer system maintains display (840c) of the first set of one or more controls for the first time threshold. In some embodiments, after maintaining display of the first set of one or more controls for the first time threshold, the computer system determines (840f) that the first time duration exceeds a second time threshold that is longer than the first time threshold (e.g., 05, 0.1, 0.25, 0.5, 0.75, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 seconds), and in response to the determination, the computer system ceases to display (840g) the first set of one or more controls in the first state. In some embodiments, in accordance with a determination that the gaze of the user was previously directed to the first set of one or more controls while the first set of one or more controls was displayed in the first state and the first time duration does not exceed the first time threshold, the computer system maintains display of the first set of one or more controls in the first state (e.g., as shown in FIG. 7B). The described approach uses the direction of the user's gaze (and optionally, a change in the direction of the user's gaze) to better predict whether the user intends to interact with the set of controls, and to dismiss the controls if it is unlikely that the user intends to interact with them. For example, if the user invokes display of the controls and doesn't look at them for a first time threshold, or looks at the controls and then looks away for a second time threshold shorter than the first time threshold, it is less likely to that the user wants to interact with the controls. Thus, in these cases, the display of the controls is dismissed. The use of two different time thresholds provides more refined predictive ability and causes the controls to be dismissed more quickly if it is more likely that the user does not want to interact with the controls (as evidenced by looking at the controls and then looking away). In other cases, the controls continue to be displayed. This approach provides a better user experience by anticipating the needs of the user thereby requiring fewer user inputs for ceasing display of the controls and reducing erroneous display or dismissal of the controls.

FIGS. 9A-9F illustrate examples of a computer system displaying sets of controls in response to detecting gaze and/or gesture inputs in accordance with some embodiments.

Figure 9A:
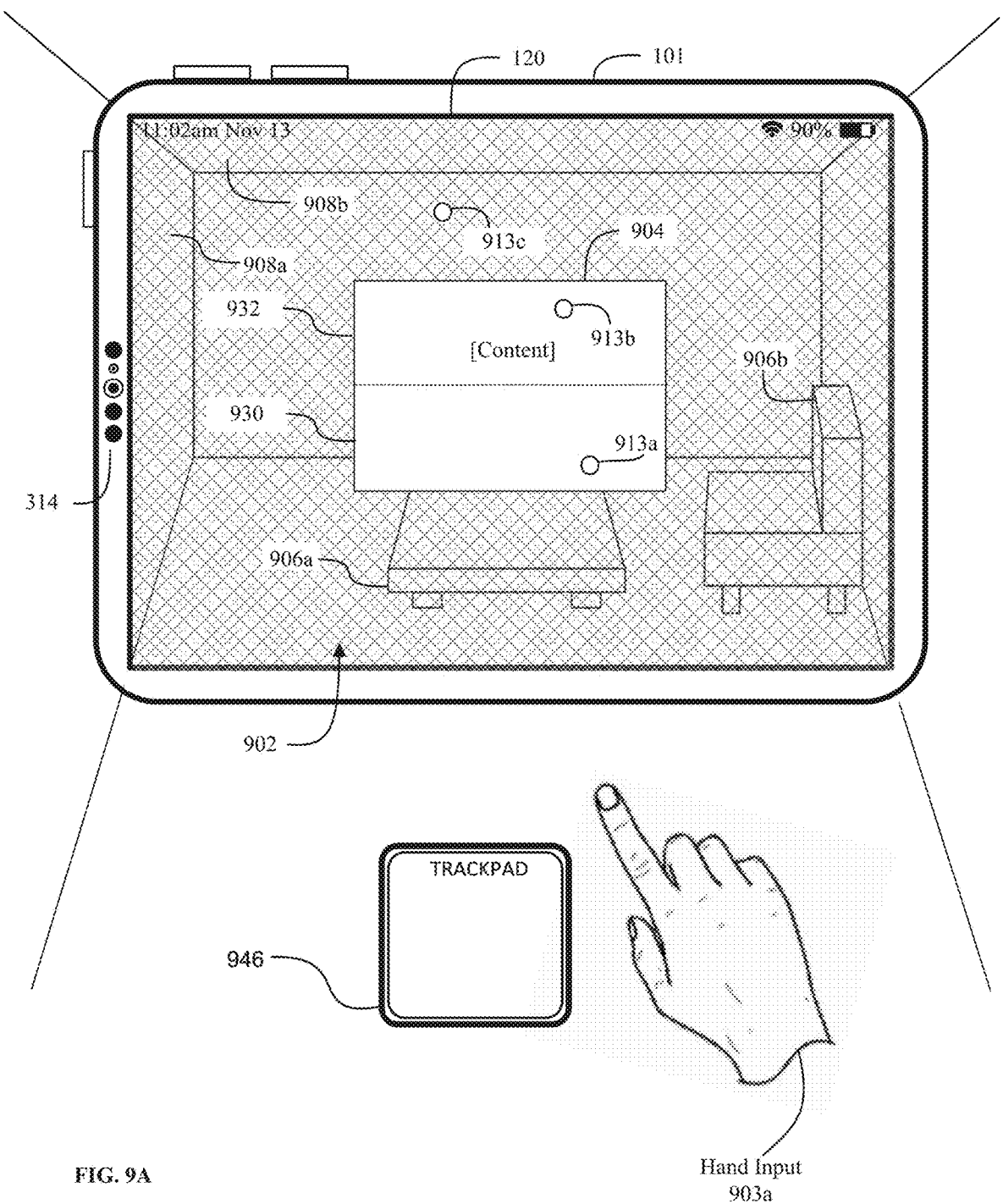
FIGS. 9A-9F illustrate example techniques for displaying sets of controls in response to detecting gaze and/or gesture inputs in accordance with some embodiments.

FIG. 9A illustrates a computer system 101 displaying, via a display generation component 120, a three-dimensional environment 902 (e.g., a three-dimensional user interface). It should be understood that, in some embodiments, computer system 101 utilizes one or more techniques described with reference to FIGS. 9A-9F in a two-dimensional environment without departing from the scope of the disclosure. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system 101 as gestures such as air gestures, and/or gaze of the user (e.g., internal sensors facing inwards towards the face of the user).

In FIG. 9A, the computer system 101 displays first content within a first region 904 of the three-dimensional environment 902. The first content optionally includes two-dimensional or three-dimensional media content that changes over time during playback (e.g., video content, still images, and/or three-dimensional simulated content) and/or audio content. The first region 904 of the three-dimensional environment 902 is optionally a two-dimensional or three-dimensional area within which the first content is presented.

In some embodiments, an upper portion of the content (e.g., an upper 20, 30, 40, 50, or 60% of the content) is displayed in an upper portion 932 of first region 904, and a lower portion of the content (e.g., a lower 20, 30, 40, 50, or 60% of the content) is displayed in a lower portion 930 of first region 904 (e.g., below upper portion 932). In the example of FIG. 9A, the upper portion 932 and lower portion 930 are conceptually delineated by a dashed line; this dashed line is optionally not displayed in the three-dimensional environment 902.

The three-dimensional environment 902 further includes representations of real objects in the physical environment of the computer system 101, including a representation 906a of a table, a representation 906b of a chair, a representation 908a of a wall, and a representation 908b of a ceiling.

While computer system 101 is displaying the content in the first region 904 of the three-dimensional environment 902, computer system 101 optionally detects, via one or more input devices (e.g., image sensors 314, trackpad 946), a first input based on a movement of a first portion of the user. Optionally, the one or more input devices have one or more of the features described with reference to method 800 and/or method 1000. Optionally, the first input has one or more of the features described with reference to method 800 and/or method 1000. Optionally, the first portion of the user has one or more of the features described with reference to method 800 and/or method 1000.

The first input optionally includes a hand input 903a that includes a movement of a hand of the user, such as an air gesture (e.g., an air pinch gesture with or without a subsequent air pinch release gesture, a hand raise (e.g., to a ready state), a hand drop, and/or a wrist rotation), such as described with reference to method 800 and/or method 1000. Optionally, hand input 903a is detected based on meeting various movement criteria as described with reference to method 800 and/or method 1000. Optionally, hand input 903a is detected based on detecting a hand raise of the user while the user's hand is in a respective pose as described with reference to method 800 and/or method 1000.

In some embodiments, in response to detecting the first input (e.g., hand input 903a in FIG. 9A), computer system 101 displays a first set of controls as described with reference to FIG. 9B. Optionally, computer system 101 uses the direction of attention of the user to help determine whether the user intended, by providing the first input, to invoke display of the first set of controls. For example, optionally, in response to detecting the first input, computer system 101 determines whether attention of the user is directed to first region 904, such as by detecting whether a gaze of the user is directed to first region 904. In some embodiments, computer system 101 determines whether attention of the user is directed to an upper portion 932 of first region 904 (indicated by gaze point 913b), to a lower portion 930 of first region 904 (indicated by gaze point 913a), or away from first region 904 (indicated by gaze point 913c). In some embodiments, computer system 101 displays the first set of controls in response to detecting the first input while attention of the user is directed to first region 904 (or, optionally, to the lower portion 930 of the first region 904), and forgoes displaying the first set of controls in response to detecting the first input while the attention of the user is directed away from the first region 904 (or, optionally, away from the lower portion 930 of the first region 904), such as when the gaze of the user is directed to gaze point 913c or 913b, respectively.

Figure 9B:
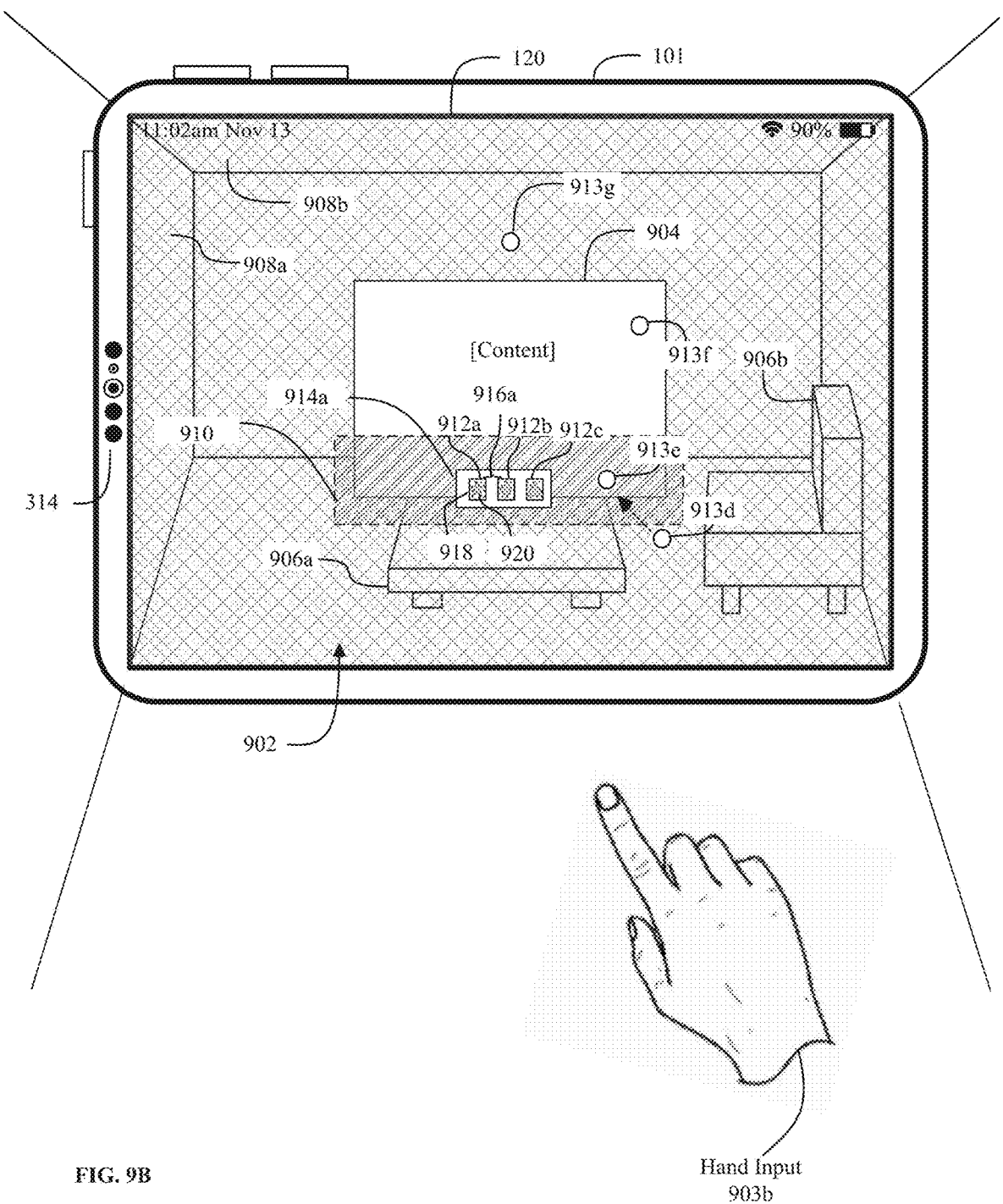

FIG. 9B illustrates a response of computer system 101 when computer system 101 detects the first input from the first portion of the user (e.g., hand input 903a in FIG. 9A) and determines that the attention of the user is directed to the lower portion 930 of first region 904 (e.g., as depicted by gaze point 913a in FIG. 9A).

In some embodiments, in response to detecting the first input from the first portion of the user (and optionally, in accordance with a determination that attention of the user is directed to the lower portion 930 of first region 904), computer system 101 displays a first set of one or more controls 912a, 912b, and 912c (e.g., icons, and/or affordances) associated with the first content, such as controls for controlling playback of the first content. Optionally, the controls 912a, 912b, and 912c are associated with performing a corresponding operation to control the playback of the first content.

In the example of FIG. 9B, the first set of one or more controls includes a rewind control 912a, a play/pause control 912b, and a fast-forward control 912c. In some embodiments, the first set of one or more controls 912a, 912b, and 912c has one or more of the characteristics of the first set of one or more controls described with reference to method 800 and/or method 1000.

In some embodiments, the first set of one or more controls 912a, 912b, and 912c are displayed in a second region 910 of three-dimensional environment 902. The second region 910 is optionally a two-dimensional or three-dimensional area that is within first region 904, a portion of first region 904, a region that overlaps with first region 904 but is different from first region 904 (such as shown in FIG. 9B), or a separate region that is not coincident with first region 904. The second region 910 is optionally visually bounded or visually distinguished from other regions (e.g., via a border, shading or other visual treatment).

Optionally, the first set of one or more controls 912a, 912b, and 912c are displayed as visually overlaying a platter 914a, which is optionally oval-shaped, rectangular, or another shape, and optionally has a solid or patterned fill. Platter 914a is optionally displayed as partially overlaid on the first region 904 (or on a lower portion 930 of first region 904), as shown in FIG. 9B, or optionally displayed in a different location in three-dimensional environment 902. Platter 914a optionally provides a visual background for controls 912a, 912b, and 912c to help visually distinguish the controls 912a, 912b, and 912c from the first content and/or other from objects or areas in the three-dimensional environment 902.

In some embodiments, the first set of one or more controls 912a, 912b, and 912c are displayed in a reduced-prominence state, such as described with reference to FIG. 7A. The reduced-prominence state is described in more detail with reference to method 800 and method 1000. When the controls 912a, 912b, and 912c are displayed in a reduced-prominence state, the controls 912a, 912b, and 912c optionally appear less visually prominent to the user than controls displayed in an increased-prominence state, and are optionally displayed with increased transparency, reduced simulated specular highlights, increased blurring, decreased size, and/or decreased spacing between controls 912a, 912b, and 912c relative to the case when controls are displayed in an increased-prominence state. For example, one or more visual characteristics (e.g., transparency, simulated specular highlights, blurring, size, and/or spacing) of controls 912a, 912b, and 912c displayed in a reduced-prominence state are different than the visual characteristics of controls displayed in an increased-prominence state. In some embodiments, when the first set of one of more controls 912a, 912b, and 912c are displayed in the reduced-prominence state, the first set of one of more controls 912a, 912b, and 912c cannot be selected or otherwise used to perform an operation corresponding to controls 912a, 912b, and 912c. For example, in response to detecting a selection input associated with a respective control of the first set of one or more controls 912a, 912b, and 912c while the respective control is displayed in the reduced-prominence state, computer system 101 optionally forgoes performing the operation associated with the respective control.

Optionally, the controls 912a, 912b, and 912c include a first portion of the control (e.g., first portion 920 of control 912a) that is optionally overlaid on a second portion of the control (e.g., second portion 918 of control 912a), such as described with reference to FIG. 7A.

In some embodiments, while displaying the first set of one or more controls 912a, 912b, and 912c as shown in FIG. 9B, computer system 101 monitors or detects, via one or more sensors 314, the gaze of a user of computer system 101, which may be directed to various objects or regions within three-dimensional environment 902. For example, the computer system 101 optionally monitors or detects whether the user has looked at or near the first set of one or more controls 912a, 912b, and 912c, such as to help determine whether the user is interested in interacting with the displayed first set of one or more controls 912a, 912b, and 912c.

For example, in FIG. 9B, the gaze of the user may be directed to the first region 904 (e.g., as indicated by gaze point 913f), to a second region 910 of the three-dimensional environment 902 (e.g., as indicated by gaze point 913e), or away from the first region 904 and the second region 910 (e.g., as indicated by gaze points 913d, 913g).

Optionally, the computer system 101 monitors or detects a movement of a gaze of the user of the computer system 101, such as a movement from a first gaze point to a second gaze point (e.g., from gaze point 913d to gaze point 913e). Computer system 101 optionally detects that the gaze of the user is directed to a region or object in the three-dimensional environment 902 based on a movement of a second portion of the user, such as based on a movement of an eye or eyes of the user.

Figure 9C:
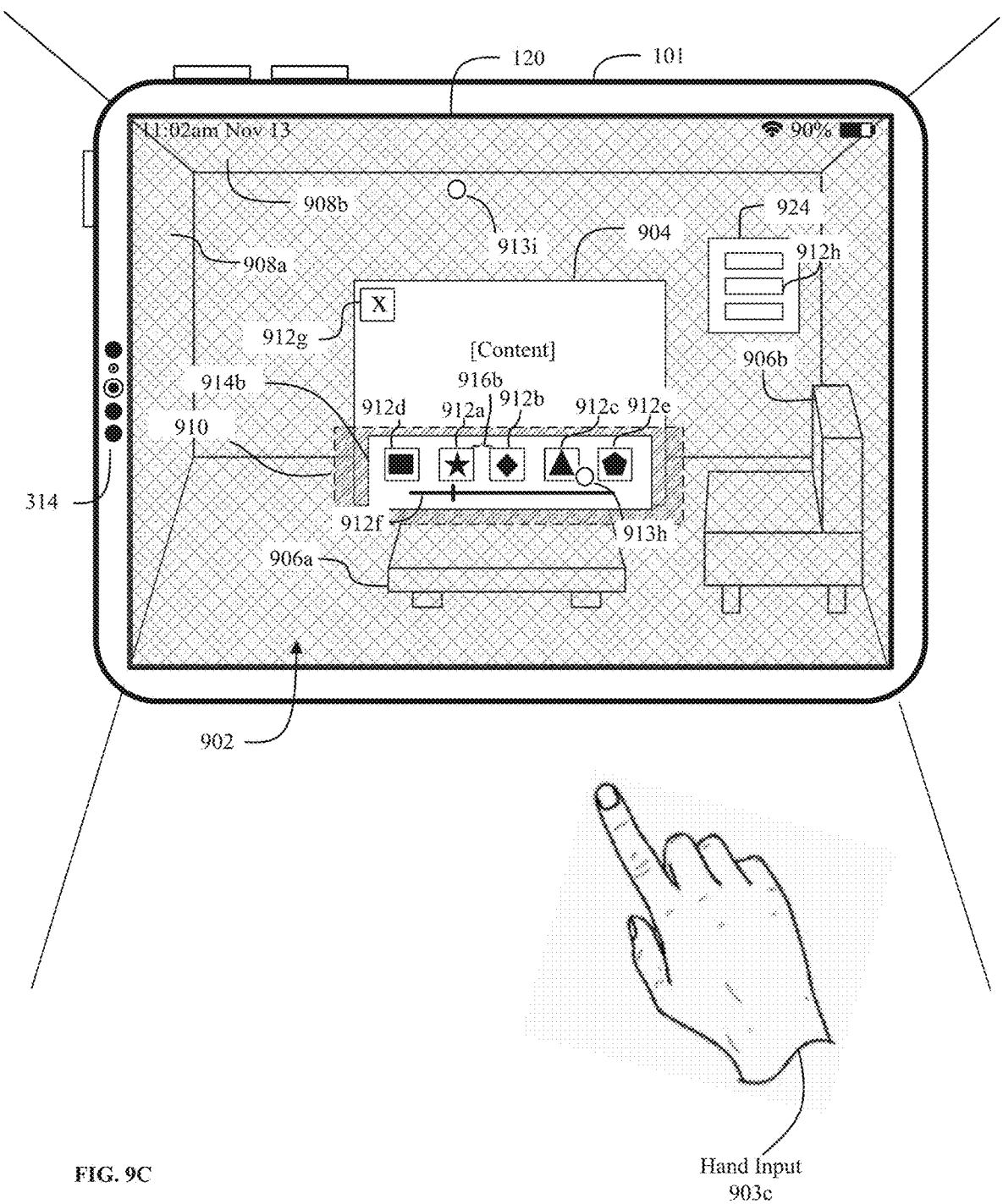

In some embodiments, in accordance with a determination that the attention of the user is directed to the second region 910 of the three-dimensional environment 902 (e.g., based on a movement of the eyes of the user) while computer system 101 is displaying the first set of one or more controls 912a, 912b, and 912c, computer system 101 transitions from displaying the first set of one or more controls 912a, 912b, and 912c as shown in FIG. 9B to displaying a second set of one or more controls, as shown in FIG. 9C. For example, if the user looks at or near the first set of one or more controls 912a, 912b, and 912c (e.g., such as by looking at second region 910), the computer system 101 responds by displaying a second set of one or more controls as shown in FIG. 9C.

In some embodiments, in accordance with a determination that the attention of the user is directed away from the second region 910 of the three-dimensional environment 902 while computer system 101 is displaying the first set of one or more controls 912a, 912b, and 912c, computer system 101 forgoes displaying the second set of one or more controls. For example, if the user does not look at or near the first set of one or more controls 912a, 912b, and 912c (e.g., within a time threshold after the computer system 101 displays the first set of one or more controls 912a, 912b, and 912c, such as within 1, 2, or 3 seconds, or within another time threshold as described with reference to method 1000), computer system 101 optionally continues to display the first set of one or more controls 912a, 912b, and 912c as shown in FIG. 9B, or optionally ceases to display the first set of one or more controls 912a, 912b, and 912c and displays the first content as shown in FIG. 9A. Optionally, ceasing to display the first set of one or more controls 912a, 912b, and 912c includes ceasing to display the platter 914a.

Optionally, if hand input 903a of FIG. 9A is a hand raise and computer system 101 detects, while subsequently displaying the first set of one or more controls 912a, 912b, and 912c as shown in FIG. 9B, that the user has dropped their hand after providing the hand input 903a, computer system 101 ceases to display the first set of one or more controls 912a, 912b, and 912c. Optionally, computer system 101 continues to display the first set of one or more controls 912a, 912b, and 912c as shown in FIG. 9B while the user continues to hold their hand in a raised position.

Optionally, if hand input 903a of FIG. 9A is a hand raise and computer system 101 detects, while subsequently displaying the first set of one or more controls 912a, 912b, and 912c as shown in FIG. 9B, that the user has dropped their hand after providing the hand input 903a and that the gaze of the user is directed towards the first set of one or more controls 912a, 912b, and 912c, the computer system 101 continues to display the first set of one or more controls 912a, 912b, and 912c as shown in FIG. 9B while the user continues to direct their gaze towards the first set of one or more controls 912a, 912b, and 912c, and ceases to display the first set of one or more controls 912a, 912b, and 912c when the user directs their gaze away from the first set of one or more controls 912a, 912b, and 912c.

Optionally, if hand input 903a is a hand raise and computer system 101 determines that the user has not looked at or near the displayed first set of one or more controls 912a, 912b, and 912c within a time threshold (e.g., within 1, 2, or 3 seconds or within another time threshold as described with reference to method 1000) of displaying the first set of one or more controls 912a, 912b, and 912c, computer system 101 ceases to display the first set of one or more controls 912a, 912b, and 912c even if the user continues to hold their hand in a raised position (e.g., even if the user does not drop their hand after providing hand input 903a).

FIG. 9B 1 illustrates similar and/or the same concepts as those shown in FIG. 9B (with many of the same reference numbers). It is understood that unless indicated below, elements shown in FIG. 9B1 that have the same reference numbers as elements shown in FIGS. 9A-9F have one or more or all of the same characteristics. FIG. 9B1 includes computer system 101, which includes (or is the same as) display generation component 120. In some embodiments, computer system 101 and display generation component 120 have one or more of the characteristics of computer system 101 shown in FIGS. 9F and 9A-9F and display generation component 120 shown in FIGS. 1 and 3, respectively, and in some embodiments, computer system 101 and display generation component 120 shown in FIGS. 9A-9F have one or more of the characteristics of computer system 101 and display generation component 120 shown in FIG. 9B1.

In FIG. 9B1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 9A-9F.

In FIG. 9B1, display generation component 120 is illustrated as displaying content that optionally corresponds to the content that is described as being displayed and/or visible via display generation component 120 with reference to FIGS. 9A-9F. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 9B1.

Display generation component 120 has a field of view (e.g., a field of view captured by external image sensors 314b and 314c and/or visible to the user via display generation component 120, indicated by dashed lines in the overhead view) that corresponds to the content shown in FIG. 9B1. Because display generation component 120 is optionally a head-mounted device, the field of view of display generation component 120 is optionally the same as or similar to the field of view of the user.

In FIG. 9B1, the user is depicted as performing pointing gesture (e.g., with hand input 903b) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 9A-9F.

In some embodiments, computer system 101 responds to user inputs as described with reference to FIGS. 9A-9F.

In the example of FIG. 9B1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 9A-9F and/or described with reference to the corresponding method(s) are optionally implemented on computer system 101 and display generation unit 120 in a manner similar or analogous to that shown in FIG. 9B1.

FIG. 9C illustrates a response of computer system 101 when computer system 101 determines that the attention of the user is directed to the second region 910 of the three-dimensional environment 902 (e.g., based on a movement of the eyes of the user) while computer system 101 is displaying the first set of one or more controls 912a, 912b, and 912c (e.g., as shown in FIG. 9B).

In some embodiments, in accordance with a determination that the attention of the user is directed to the second region 910 of the three-dimensional environment 902 while computer system 101 is displaying the first set of one or more controls 912a, 912b, and 912c, computer system 101 displays a second set of one or more controls 912a, 912b, 912c, 912d, 912e, 912f, 912g, and 912h associated with the first content as shown in FIG. 9C. In some embodiments, the second set of one or more controls 912a, 912b, 912c, 912d, 912e, 912f, 912g, and 912h has one or more of the characteristics of the second set of one or more controls described with reference to method 800 and/or method 1000.

In some embodiments, the second set of controls 912a, 912b, 912c, 912d, 912e, 912f, 912g, and 912h includes more (e.g., a larger quantity of) controls than the first set of one or more controls (e.g., controls 912a, 912b, and 912c described with reference to FIG. 9A). In the example of FIG. 9C, the second set of one or more controls 912a, 912b, 912c, 912d, 912e, 912f, 912g, and 912h includes the first set of one or more controls 912a, 912b, and 912c. For example, the second set of one or more controls 912a, 912b, 912c, 912d, 912e, 912f, 912g, and 912h shown in the example of FIG. 9C includes rewind control 912a, play/pause control 912b, and fast-forward control 912c. In the example of FIG. 9C, the second set of controls also includes additional controls (e.g., controls 912d, 912e, 912f, 912g, 912h) for controlling playback of the first content.

Optionally, some or all of the controls of the second set of one or more controls are displayed as being visually overlaid on a platter 914b, which is optionally oval-shaped, rectangular, or another shape, and optionally has a solid or patterned fill. In some embodiments, platter 914b is larger than platter 914a described with reference to FIG. 9B, such as to accommodate display of additional controls. In the example of FIG. 9C, controls 912a, 912b, and 912c, 912d, 912e, and 912f are displayed as being visually overlaid on platter 914b, and controls 912g and 912h are not displayed as being visually overlaid with platter 914b.

Optionally, controls 912a, 912b, 912c, 912d, 912e, 912f, 912g, and 912h include a first portion of the control that is, optionally, overlaid on a second portion of the control, such as described with reference to first portion 920 and second portion 918 of FIG. 9B.

Optionally, the second set of one or more controls are displayed in an increased-prominence state, such as shown in FIG. 9C. Optionally, controls displayed in the increased-prominence state have one or more of the characteristics of controls displayed in the increased-prominence state as described with reference to FIG. 7B. The increased-prominence state is described in more detail with reference to method 800 and method 1000.

In some embodiments, controls that are displayed in an increased-prominence state can be selected, by the user, to perform operations associated with the controls. For example, in some embodiments, control 912a, when selected, causes the computer system 101 to adjust the playback position of the first content backward by a predetermined amount (e.g., 5, 10, 15, 30, or 60 seconds) or to adjust a playback direction and/or speed of the first content (e.g., to rewind the first content). In some embodiments, control 912b, when selected, causes the electronic device to 101 to pause playback of the first content. In some embodiments, control 912c, when selected, causes the electronic device to adjust the playback position of the first content forward by a predetermined amount (e.g., 5, 10, 15, 30, or 60 seconds) or to adjust a playback direction and/or speed of the first content (e.g., to fast-forward the first content). In some embodiments, control 912*d*, when selected, causes the computer system 101 to display the first content in a picture-in-picture element. In some embodiments, control 912*e*, when selected, causes the computer system 101 to expand a view of the first content, such as by expanding the first region 904.

In some embodiments, control 912*f* includes an indication of the current playback position of the first content displayed in first region 904 and, in response to an input moving the indication of the current playback position, causes the computer system 101 to adjust the playback position of the first content and resume playback of the first content from the adjusted playback position.

In some embodiments, control 912*g*, when selected, causes the computer system 101 to cease to display the first content in the first region 904 (e.g., to close the first content). In some embodiments, after the first content has ceased to be displayed, other content, objects, or areas are displayed by computer system 101 in the same location of and/or in place of the first content (e.g., in the first region 904) in the three-dimensional environment 902. In some embodiments, control 912*g*, when selected, also causes the second set of one or more controls 912*a*, 912*b*, 912*c*, 912*d*, 912*e*, 912*f*, 912*g*, and 912*h* to cease to be displayed. Optionally, ceasing to display the second set of one or more controls 912*a*, 912*b*, 912*c*, 912*d*, 912*e*, 912*f*, 912*g*, and 912*h* includes ceasing to display the platter 914*b*.

In some embodiments, menu 924 is a navigation menu for browsing different content that is available via a content application (e.g., a media player application) associated with displaying content in first region 904. Optionally, displaying the second set of one or more controls includes displaying menu 924; e.g., menu 924 is displayed when the second set of one or more controls is displayed and menu 924 is not displayed when the first set of one or more controls is displayed. In some embodiments, control 912*h*, when selected from menu 924, causes the computer system 101 to navigate to and/or display second (different) content associated with control 912*h*. In some embodiments, menu 924 includes a plurality of controls that are associated with different content, as shown in FIG. 9B. In some embodiments, menu 924 (in addition to control 912*h*) is displayed in the increased-prominence state; for example, the size of menu 924 displayed in the increased-prominence state is optionally larger than the size of menu 924 displayed in the reduced-prominence state.

Optionally, menu 924 (including control 912*h*) is displayed outside of the first region 904, as shown in the example of FIG. 9C. In some embodiments, the second content (e.g., content associated with control 912*h*) includes two-dimensional or three-dimensional media content (e.g., video content, still images, and/or three-dimensional simulated content) and/or audio content. In some embodiments, in response to detecting a selection of control 912*h*, the second content is displayed and, optionally, the first content ceases to be displayed. In some embodiments, the second content is displayed in the first region 904 (e.g., the same region in which the first content was displayed), a subset of the first region 904, a region that overlaps with the first region 904 but is different from the first region 904, or a separate region that is not coincident with the first region 904.

In some embodiments, computer system 101 responds to detecting a selection input (e.g., an air pinch gesture) associated with a respective control of the second set of one or more controls 912*a*, 912*b*, 912*c*, 912*d*, 912*e*, 912*f*, 912*g*, and 912*h* as described with reference to FIGS. 7D, D1-7F, method 800, and/or method 1000.

In some embodiments, computer system 101 determines whether to cease to display the second set of one or more controls 912*a*, 912*b*, 912*c*, 912*d*, 912*e*, 912*f*, 912*g*, and 912*h* (and, optionally, platter 914*b*) as described with reference to FIG. 7B, method 800, and/or method 1000.

Figure 9D:
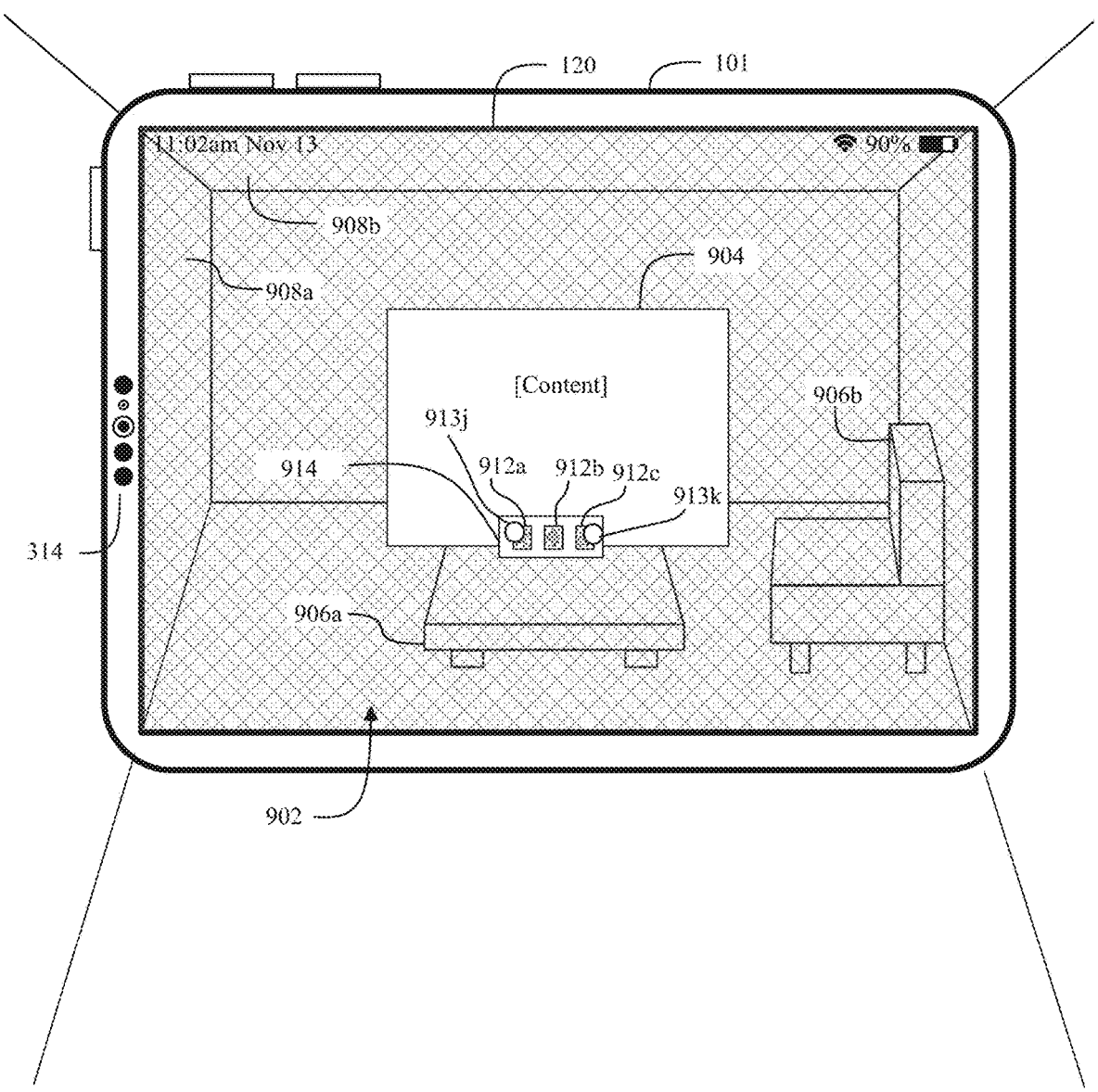
Figure 9E:
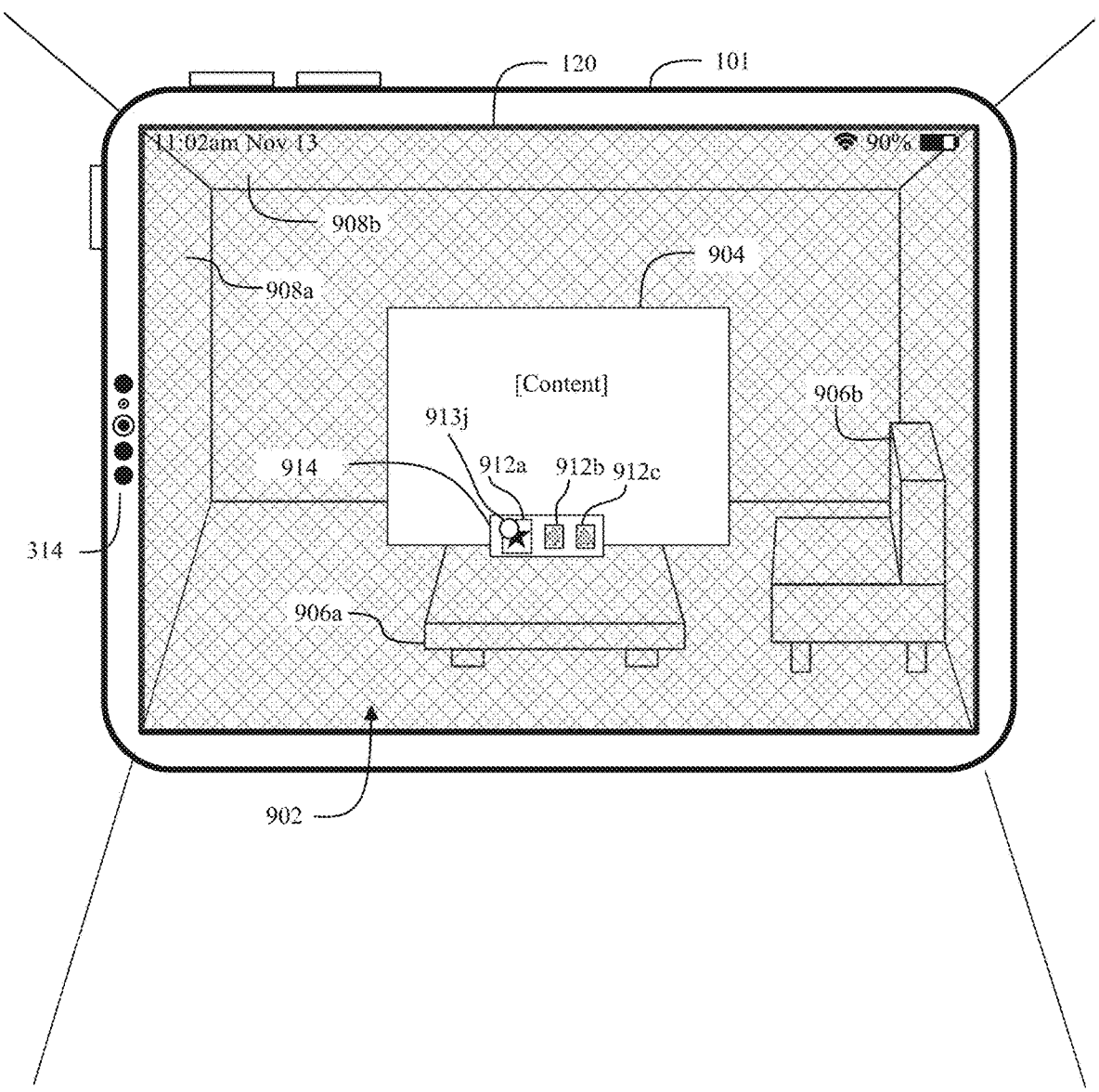
Figure 9F:
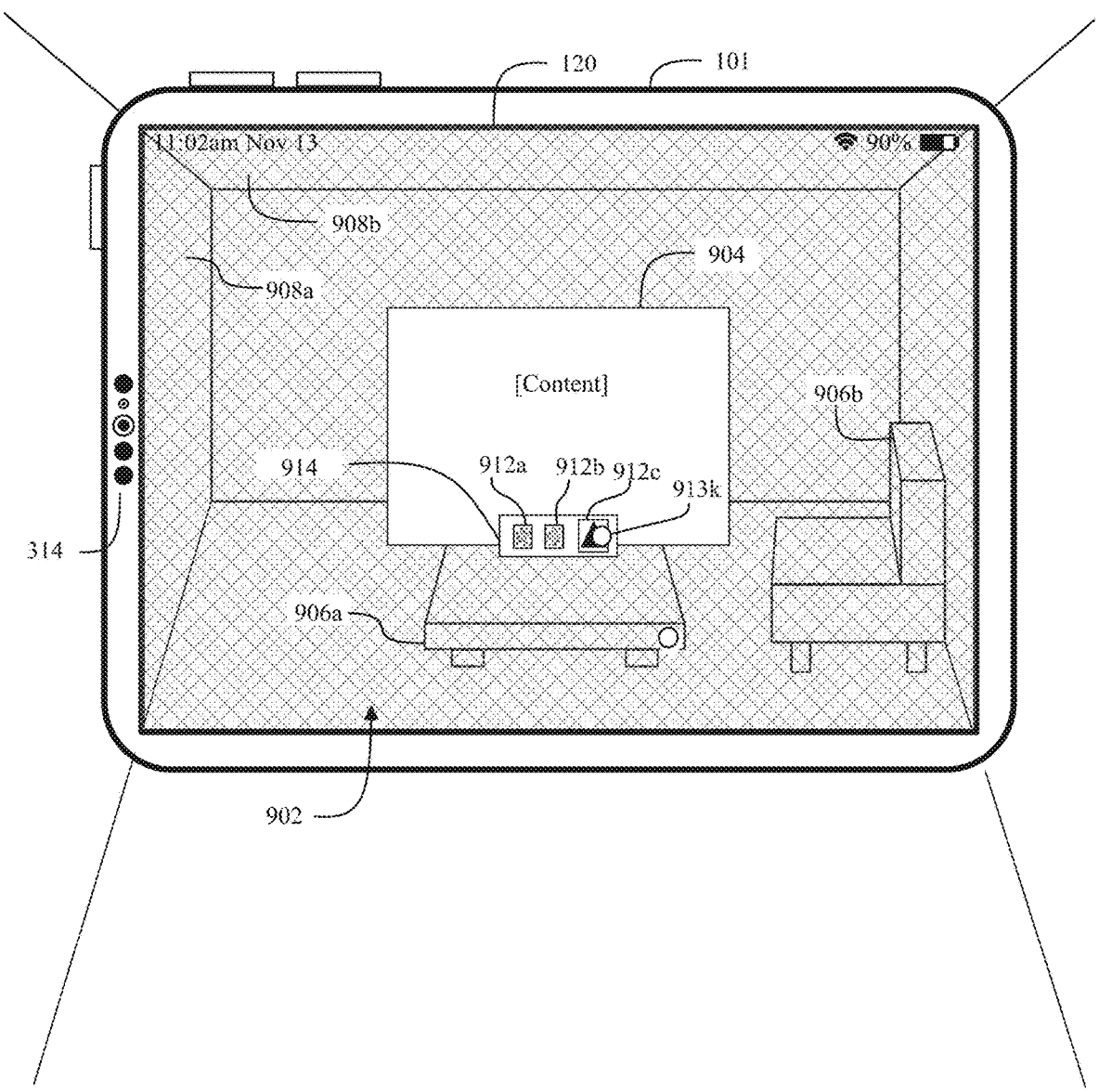
Figure 10A:
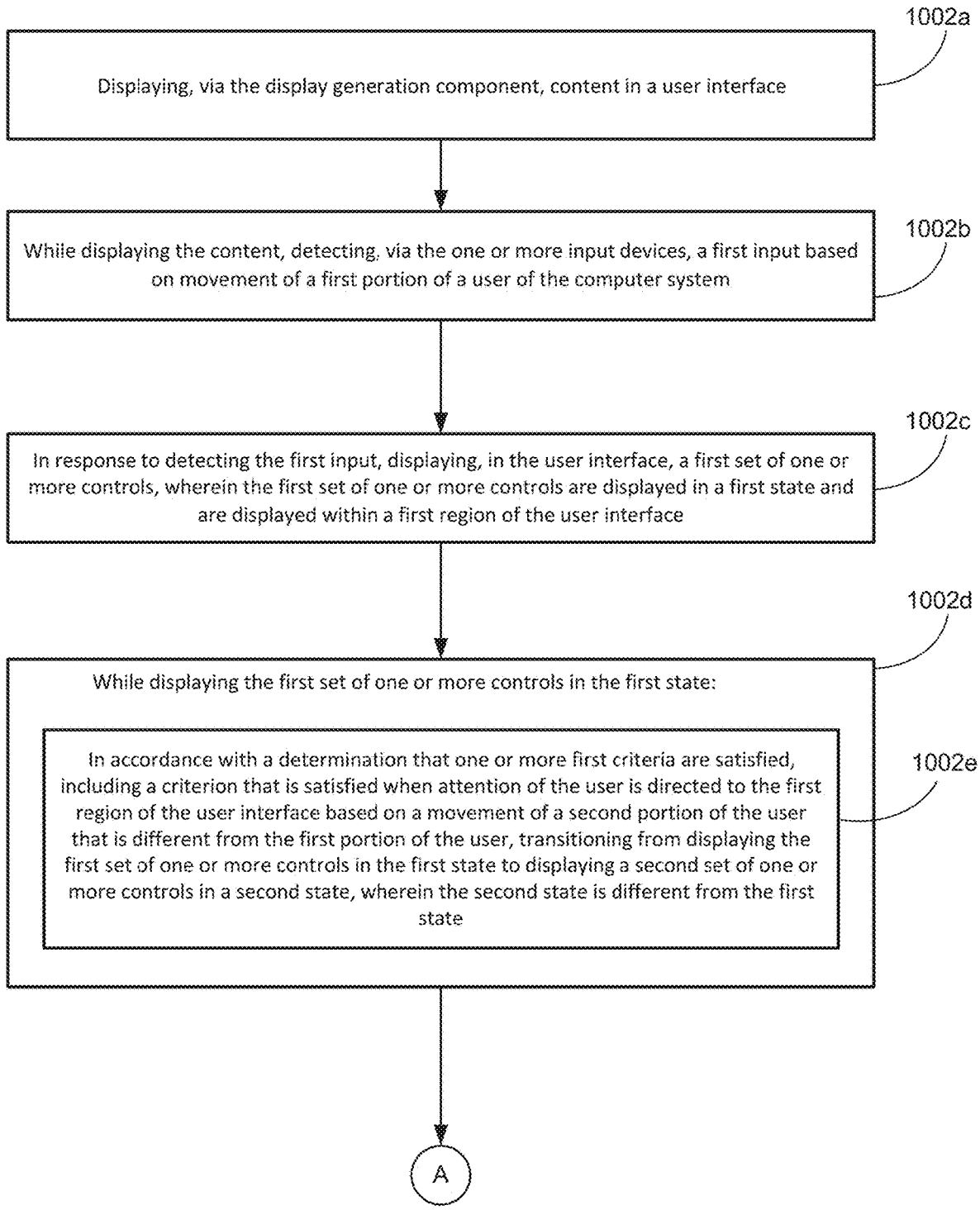
FIGS. 10A-10J depict a flow diagram of methods of displaying sets of controls in response to detecting gaze and/or gesture inputs in accordance with various embodiments.
Figure 10B:
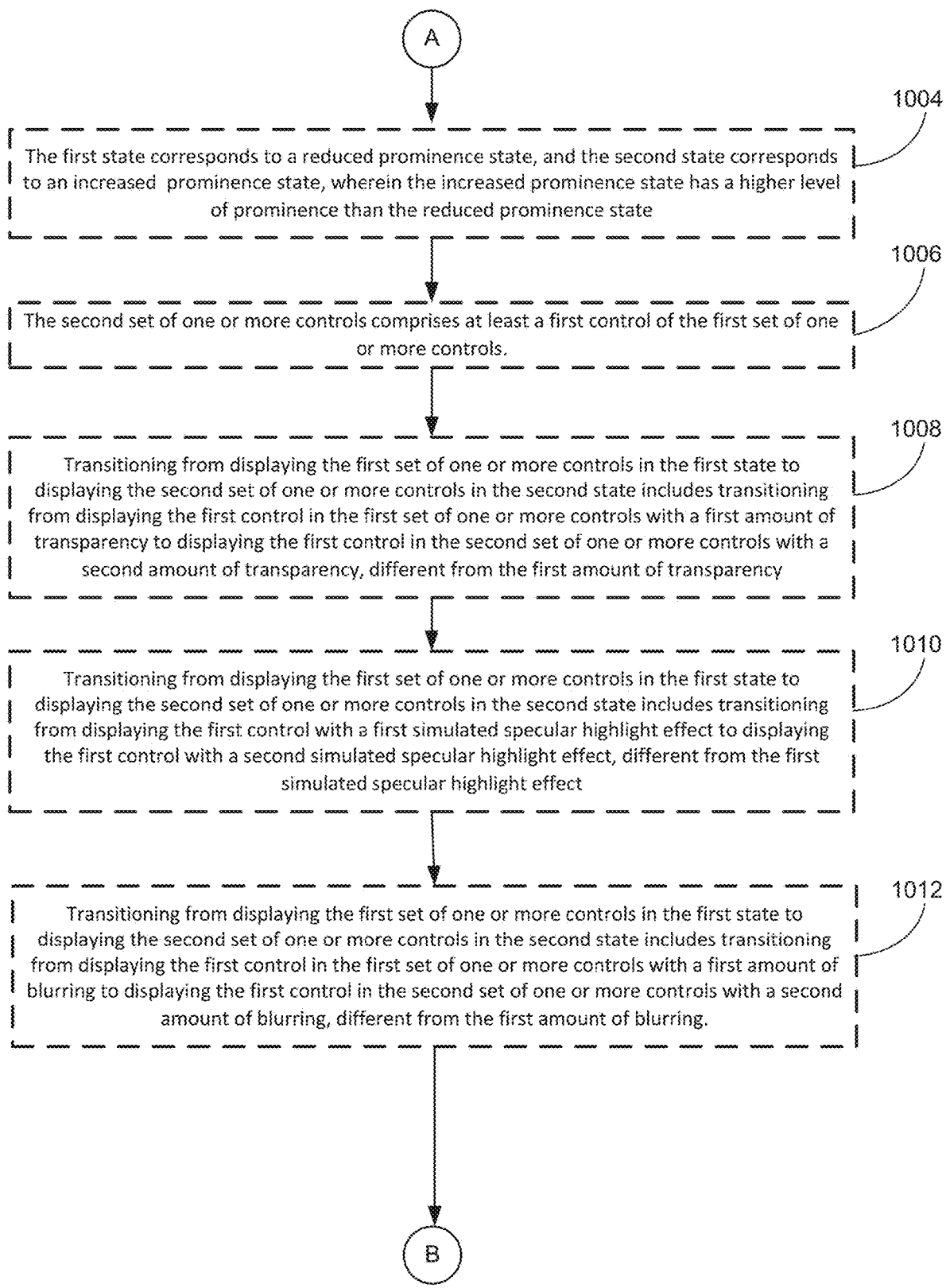
Figure 10C:
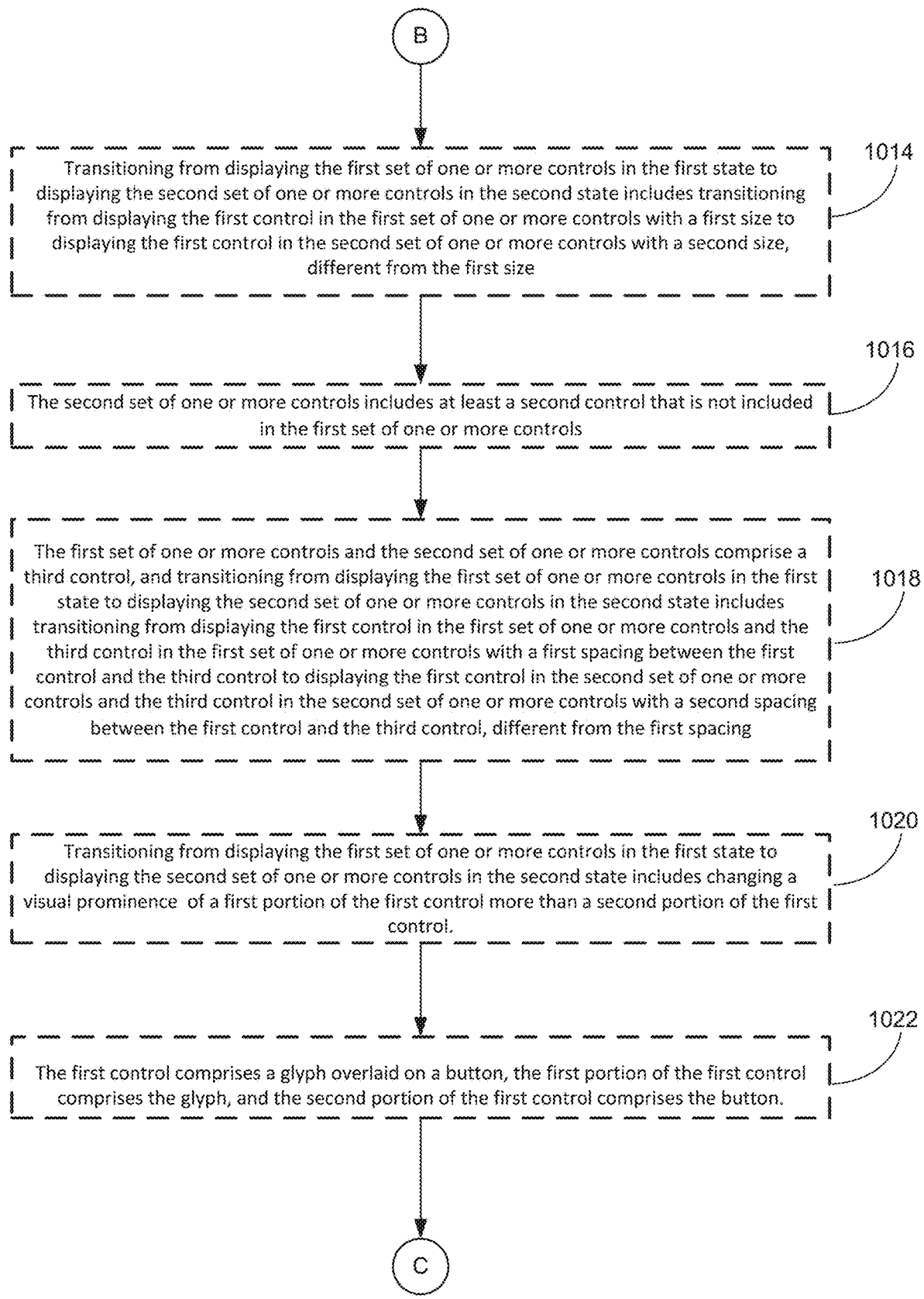
Figure 10D:
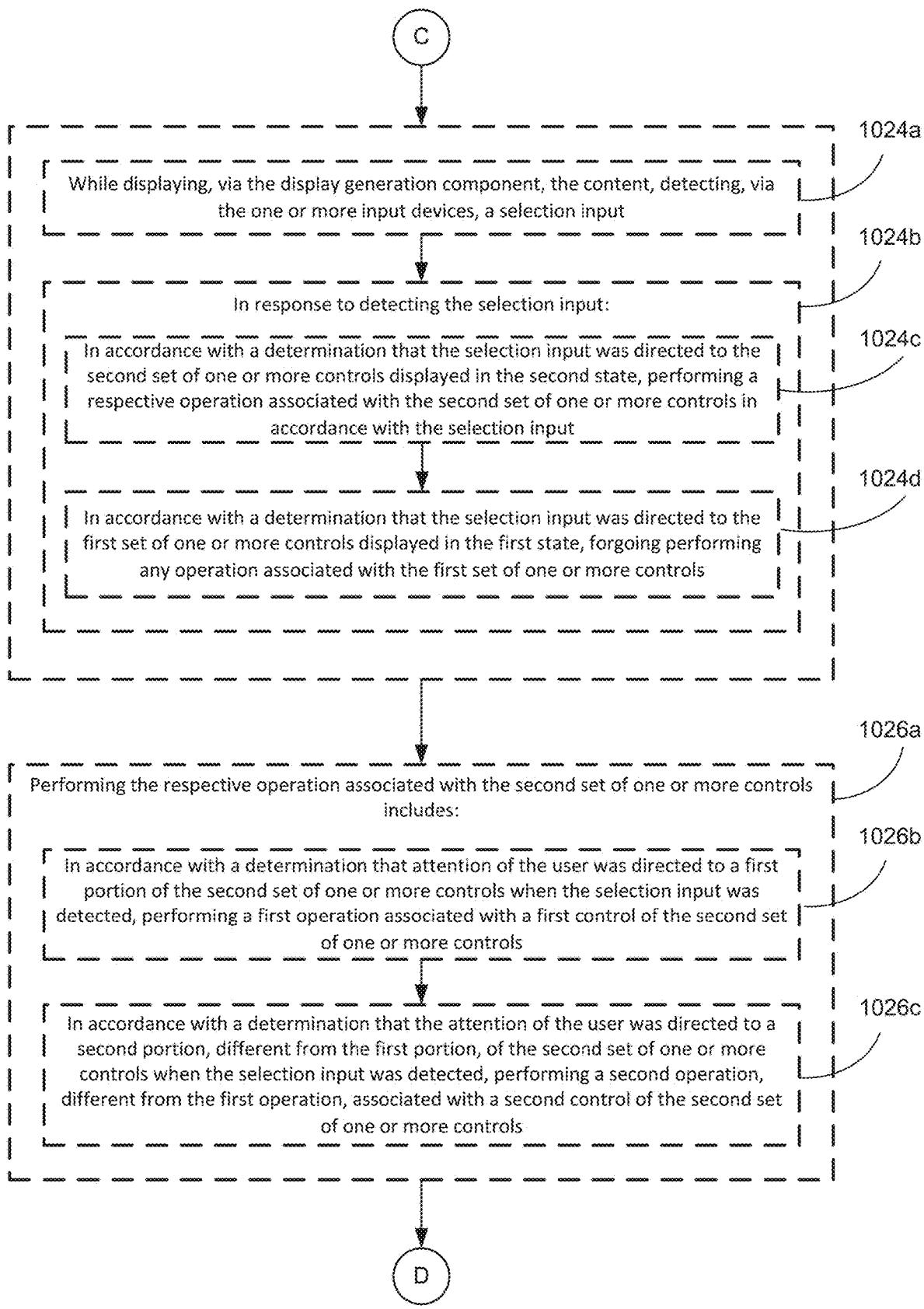
Figure 10E:
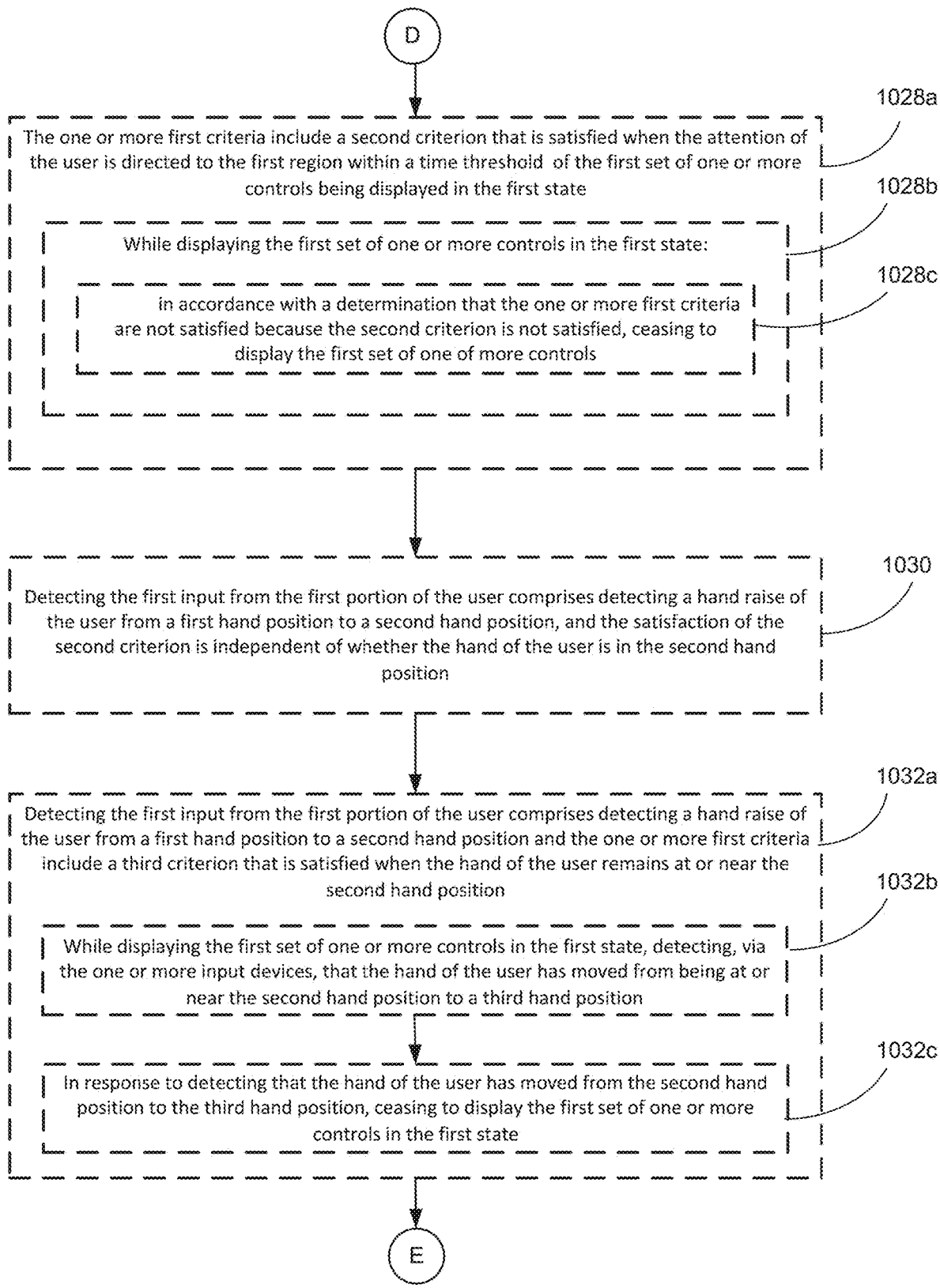
Figure 10F:
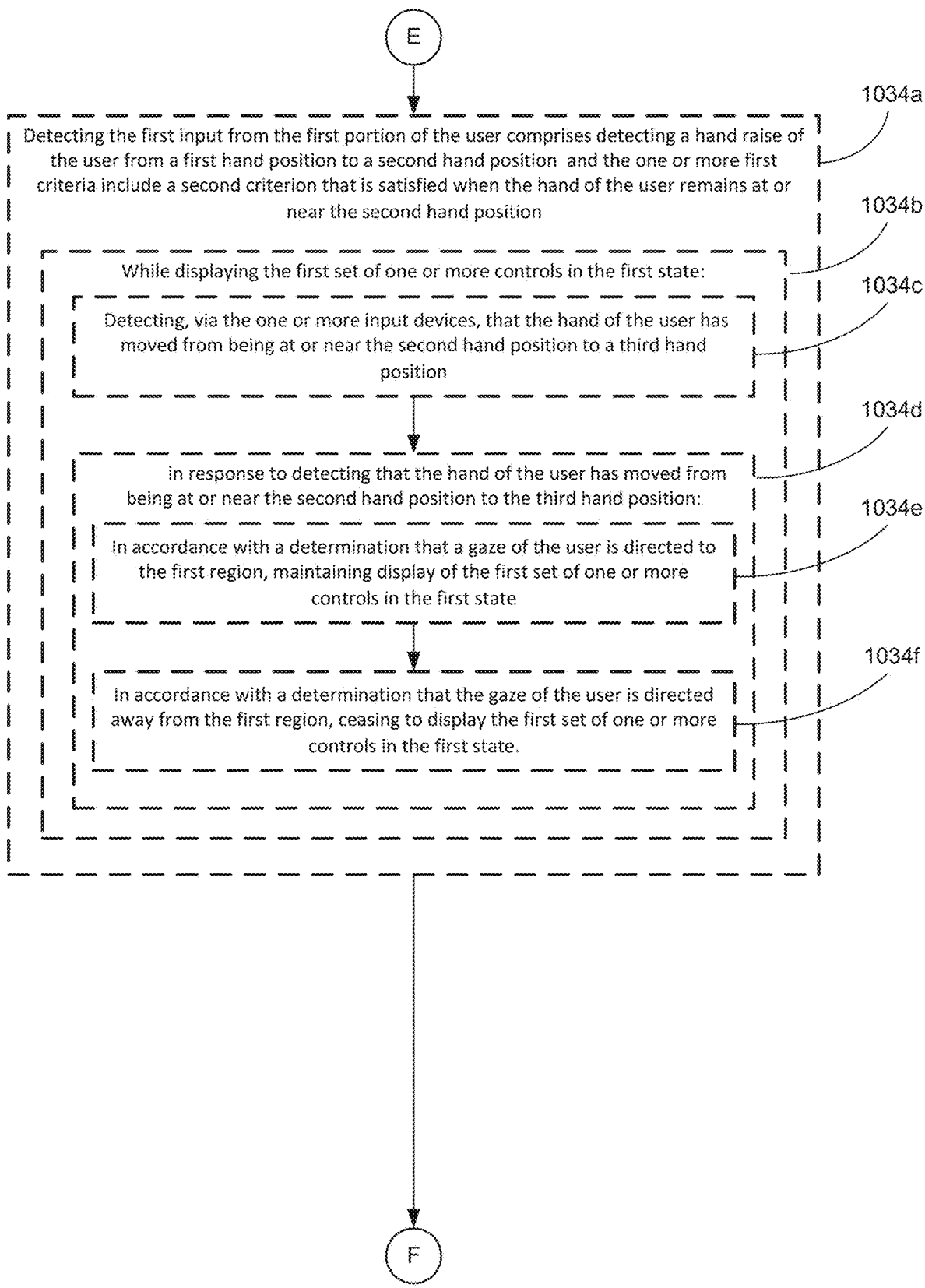
Figure 10G:
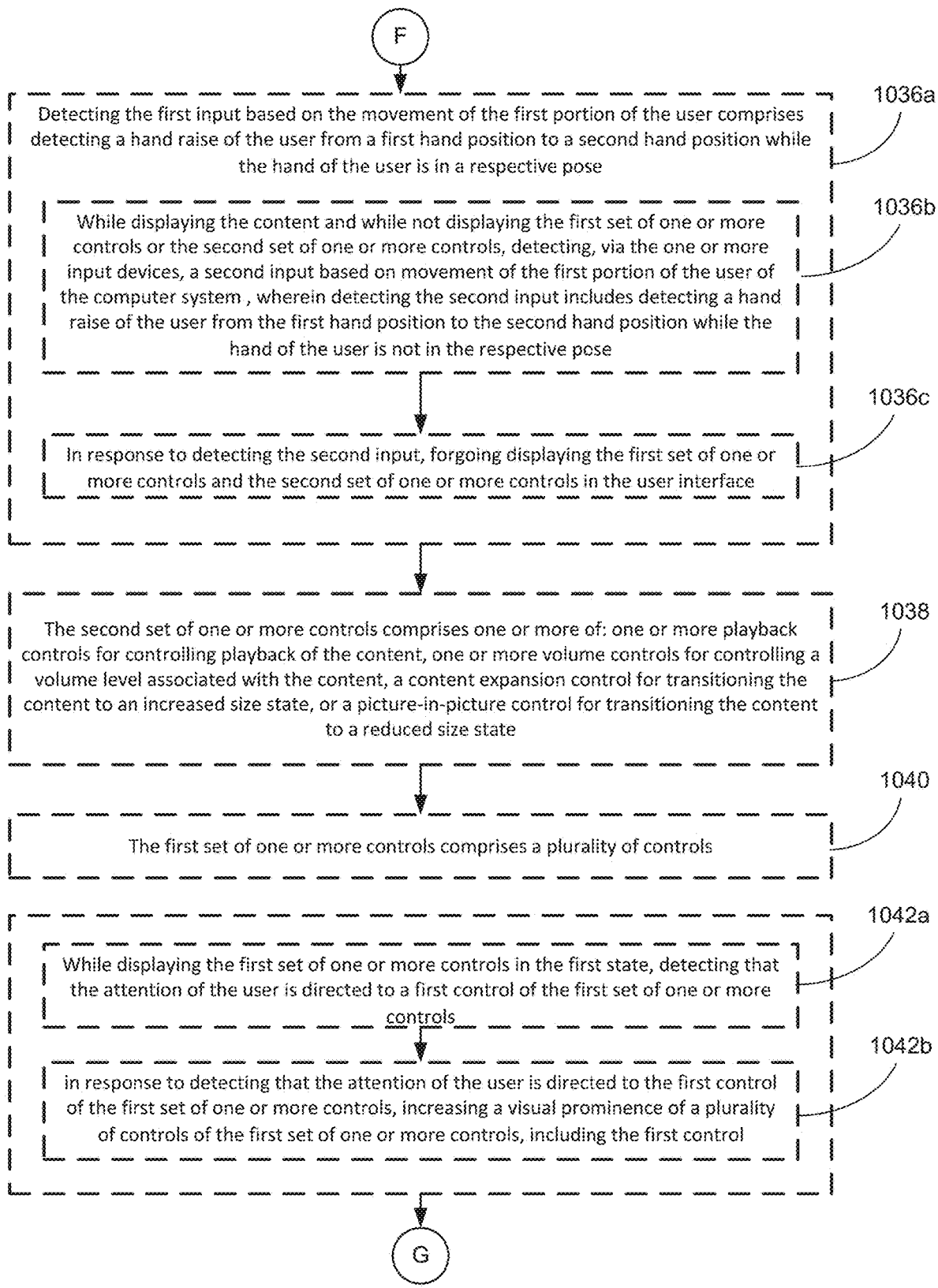
Figure 10H:
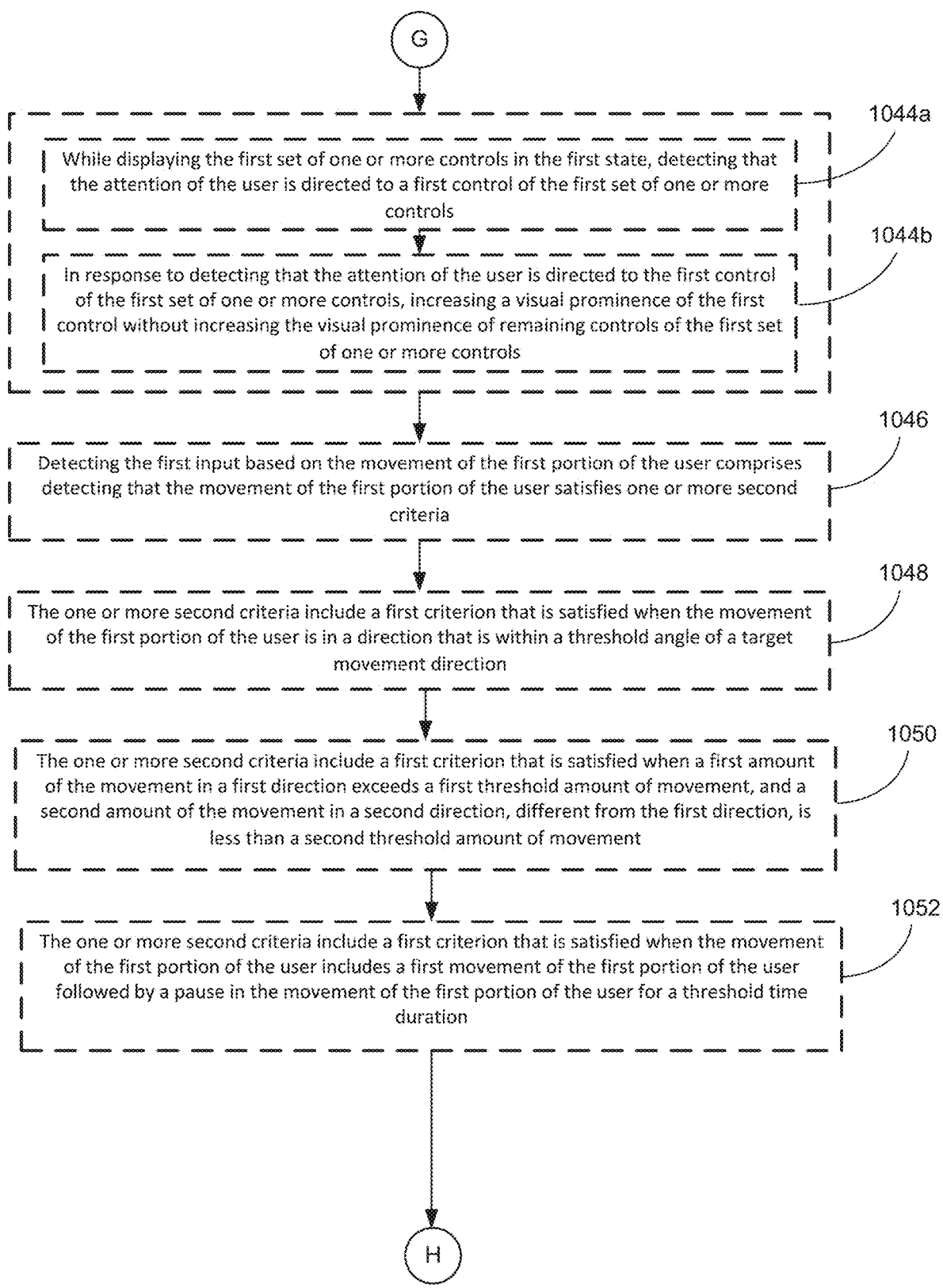
Figure 10I:
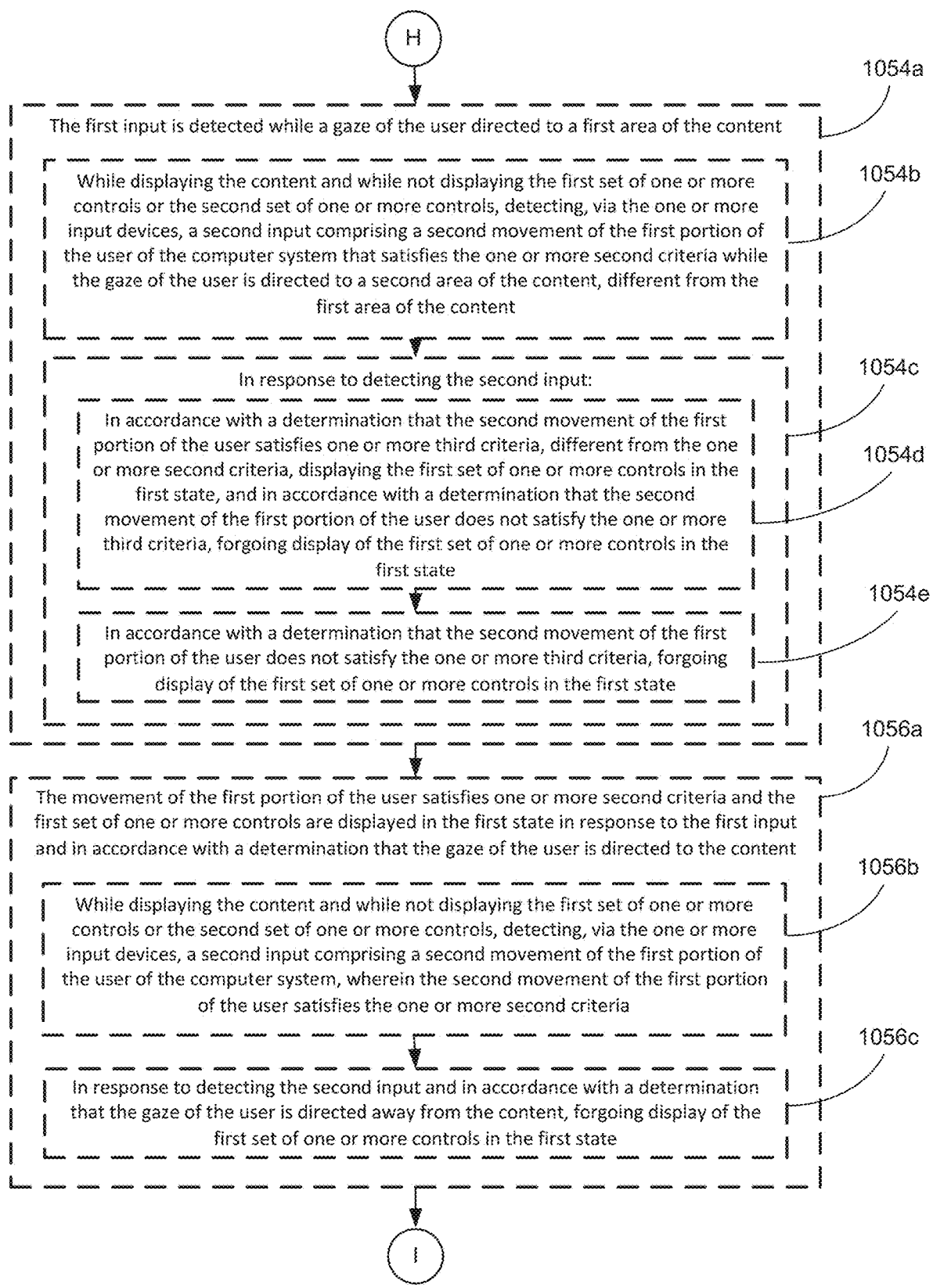
Figure 10J:
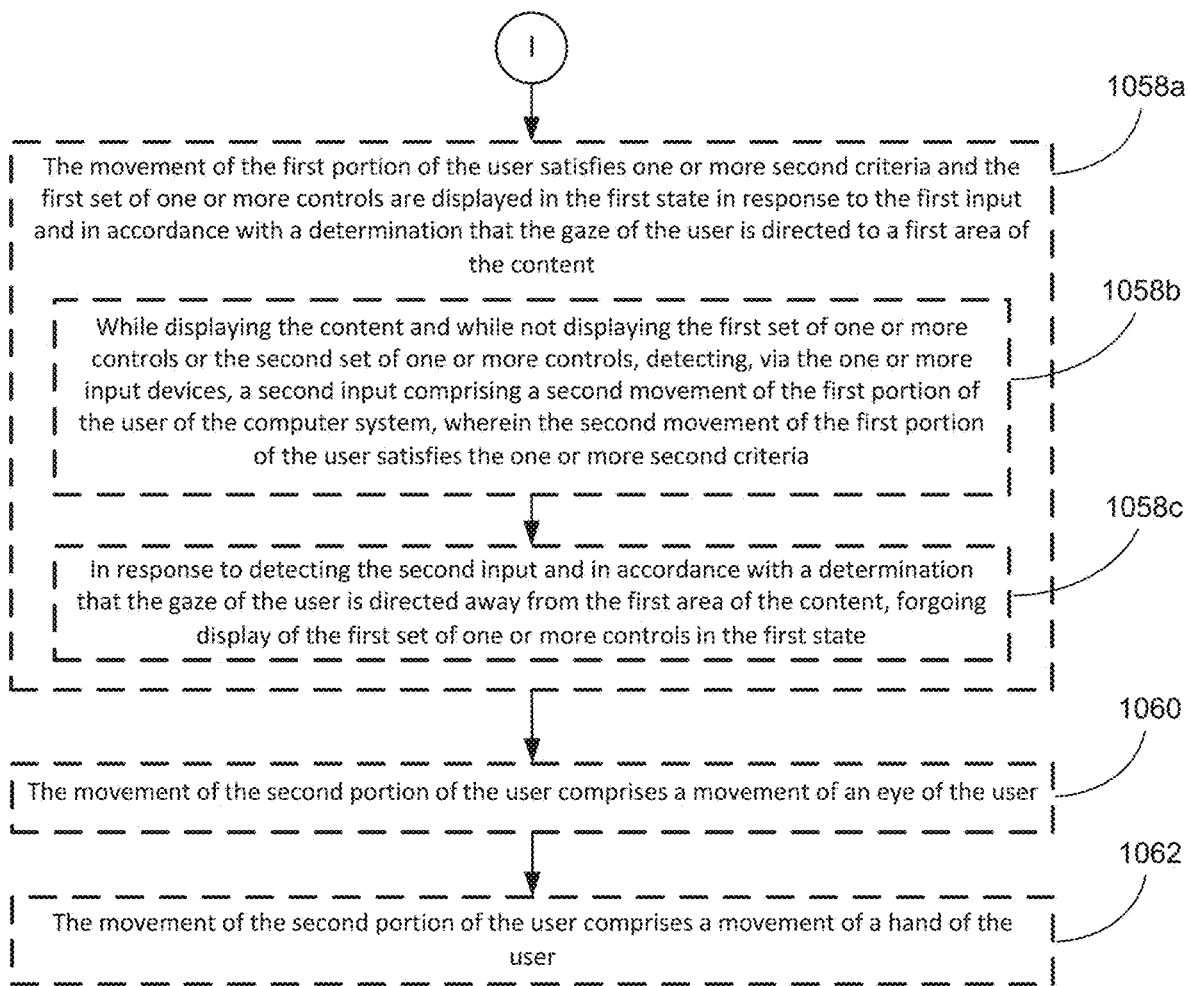

FIGS. 9D-9F depict example responses of computer system 101 when computer system 101 detects that the attention of the user is directed to a respective control of the first set of one or more controls displayed in the reduced-prominence state.

In some embodiments, if the computer system 101 detects that the user is looking at a respective control of the first set of one or more controls 912*a*, 912*b*, and 912*c* while the first set of one of more controls 912*a*, 912*b*, and 912*c* is displayed in the reduced-prominence state, the computer system 101 responds by increasing the visual prominence of the control at which the user is looking.

FIG. 9D depicts an example of displaying a first set of one or more controls 912*a*, 912*b*, and 912*c* in a reduced-prominence state and detecting that the attention of the user is directed to a respective control of the first set of one or more controls 912*a*, 912*b*, and 912*c*, such as to control 912*a* (e.g., indicated by gaze point 913*j*) or to control 912*c* (e.g., indicated by gaze point 913*k*).

As shown in FIG. 9E, in some embodiments, in response to detecting that the attention of the user is directed to control 912*a* (e.g., indicated by gaze point 913*j* of FIG. 9D), the computer system 101 increases the visual prominence of control 912*a* relative to controls 912*b* and 912*c* (e.g., without increasing the visual prominence of controls 912*b* and 912*c*). In some embodiments, increasing the visual prominence of a respective control (e.g., control 912*a*) includes displaying the respective control in the increased-prominence state. In some embodiments, increasing the visual prominence of a respective control includes changing one or more visual characteristics of the control such as described with reference to the increased-prominence state; e.g., increasing the size, decreasing the transparency, decreasing the blurring, increasing the simulated specular highlights, and/or increasing the spacing between the respective control and adjacent controls (e.g. between control 912*a* and adjacent control 912*b*). In some embodiments, in response to detecting a selection input (e.g., as described in methods 800 and/or 1000) associated with a control while the visual prominence of the control is increased (e.g., while the visual prominence of the control is increased as shown for control 912*a* in FIG. 9D), computer system 101 performs an operation associated with the control, such as described with reference to FIGS. 7D-7F and method 800. In some embodiments, computer system 101 continues to display control 912*a* with the increased visual prominence while the attention of the user continues to be directed to control 912*a* as indicated by gaze point 913*j*. In some embodiments, in response to detecting that the attention of the user is no longer directed to control 912*a*, computer system 101 displays control 912*a* without the increased visual prominence, such as by displaying control 912*a* with the same visual prominence as control 912*b* and control 912*c* (e.g., as shown in FIG. 9D).

Similarly, in some embodiments, in response to detecting that the attention of the user is directed to control 912*c*, the computer system 101 increases the visual prominence of control 912*c* relative to controls 912*a* and 912*b*, as shown in FIG. 9F. In some embodiments, in response to detecting that the attention of the user is no longer directed to control 912*c*, computer system 101 displays control 912*c* without the increased visual prominence, such as by displaying control 912*c* with the same visual prominence as control 912*a* and control 912*b* (e.g., as shown in FIG. 9D).

In some embodiments, in response to detecting that the attention of the user is directed to a respective control of the first set of one or more controls 912*a*, 912*b*, and 912*c*, the computer system 101 increases the visual prominence of all of the controls 912*a*, 912*b*, and 912*c* of the first set of one or more controls 912*a*, 912*b*, and 912*c*, such as by displaying the first set of one or more controls 912*a*, 912*b*, and 912*c* in an increased-prominence state.

FIGS. 10A-10J depict a flowchart illustrating an exemplary method 1000 of displaying a set of controls associated with controlling playback of content in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector), and one or more cameras (e.g., one or more cameras that point forward from the user's head or that point downward at a user's hand, such as color sensors, infrared sensors, and other depth-sensing cameras). In some embodiments, the method 1000 is governed by instructions that are stored in a non-transitory computer-readable storage medium and that are executed by one or more processors of a computer system, such as the one or more processing units 202 of computer system 101 (e.g., controller 110 in FIG. 1A). Some operations in method 1000 are, optionally, combined and/or the order of some operations is, optionally, changed.

In some embodiments, method 1000 is performed at a computer system (e.g., 101) in communication with a display generation component (e.g., 120) and one or more input devices (e.g., 314, 946). In some embodiments, the computer system has one or more of the characteristics of the computer system of method 800. In some embodiments, the display generation component has one or more of the characteristics of the display generation component of method 800. In some embodiments, the one or more input devices have one or more of the characteristics of the one or more input devices of method 800. In some embodiments, the computer system displays (1002*a*), via the display generation component, content in a user interface. For example, the computer system optionally displays content in a first region 904 of a three-dimensional environment 902, as shown in FIG. 9A. In some embodiments, the content has one or more of the characteristics of the content described with reference to method 800. In some embodiments, the user interface has one or more of the characteristics of the user interface described with reference to method 800.

In some embodiments, while displaying the content, the computer system detects (1002*b*), via the one or more input devices, a first input based on movement of a first portion of a user (e.g., a hand raise gesture, a pinch gesture, or interaction with a remote control) of the computer system, such as depicted by hand input 903*a* of FIG. 9A. In some embodiments, the first input from the first portion of the user has one or more of the characteristics of the first input from the first portion of the user described with reference to method 800. In some embodiments, in response to detecting the first input, the computer system displays (1002*c*), in the user interface, a first set of one or more controls (e.g., first set of one or more controls 912*a*, 912*b*, and 912*c* as shown in FIGS. 9B and 9B1), where the first set of one or more controls are displayed in a first state and are displayed within a first region of the user interface. For example, the computer system optionally displays the first set of one or more controls 912*a*, 912*b*, 912*c* in a reduced prominence state and within a second region 910 of the three-dimensional environment 902, as shown in FIGS. 9B and 9B1. In some embodiments, the first state has one or more of the characteristics of the reduced prominence state described with reference to method 800. The first region of the user interface is optionally a two-dimensional or three-dimensional area within which the content is presented (e.g., first region 904 of three-dimensional environment 902), a portion of the region in which the content is presented (e.g., a portion of first region 904), a region that overlaps with the region in which the content is presented but is different from the region in which the content is presented (e.g., second region 910), or a separate region that is not coincident with the region in which the content is presented. The first region is optionally visually bounded or visually distinguished from other regions (e.g., via a border, shading or other visual treatment).

In some embodiments, while displaying the first set of one or more controls in the first state (e.g., as shown in FIGS. 9B and 9B1) (1002*d*), and in accordance with a determination that one or more first criteria are satisfied, including a criterion that is satisfied when attention of the user is directed to the first region of the user interface based on a movement of a second portion of the user that is different from the first portion of the user (e.g., movement of an eye or eyes of the user), the computer system transitions (1002*e*) from displaying the first set of one or more controls in the first state to displaying a second set of one or more controls in a second state (e.g., as shown in FIG. 9C), where the second state is different from the first state. For example, while displaying the first set of one or more controls 912*a*, 912*b*, 912*c* as shown in FIGS. 9B and 9B1, the computer system detects (e.g., based on a movement of the eyes of the user) that a gaze of the user has moved from gaze point 913*d* to gaze point 913*e*, indicating that the attention of the user is directed to the second region 910 of the three-dimensional environment 902. In response, the computer system displays a second set of one or more controls 912*a*, 912*b*, 912*c*, 912*d*, 912*e*, 912*f*, 912*g*, 912*h* in an increased prominence state, as shown in FIG. 9C. In some embodiments, the second portion of the user has one or more of the characteristics of the first portion of the user described with reference to method 800. In some embodiments, the second portion of the user is an eye or eyes of the user. In some embodiments, the movement of the second portion of the user includes a movement of the eye or eyes of the user that causes the gaze of the user to be directed to the first region of the user interface. The second set of one or more controls optionally includes and/or is the same set of controls as the first set of one or more controls (e.g., the same number of controls) or is a different set of controls from the first set of one or more controls (e.g., a set that includes a larger number of controls). In some embodiments, the second state has one or more of the characteristics of the increased prominence state described with reference to method 800. The second state optionally includes a second transparency, specular highlights, blurring, size, location, and/or spacing between controls, where at least one of these is different from the first state. Optionally, some are the same. Transitioning optionally occurs visually over a time duration or is binary (e.g., the controls in the first state are replaced by the controls in the second state without a visual transition).

If the user's attention is not directed to the first region of the user interface, the computer system optionally continues to display the first set of one or more controls in the first state (e.g., as shown in FIGS. 9B and 9B1) without displaying the second set of controls in the second state. If, after (e.g., while) displaying the second set of controls in the second state (e.g., as shown in FIG. 9C), the attention of the user is directed away from the first region (e.g., for more than a threshold time duration, such as 0.05, 0.1, 1, 3, 5, 10, 30 or 60 seconds), the computer system optionally ceases to display the second set of one or more controls, and optionally re-displays the first set of one or more controls in the first state (e.g., as shown in FIGS. 9B and 9B1). For example, if, while displaying the second set of one or more controls 912a, 912b, 912c, 912d, 912e, 912f, 912g, 912h as shown in FIG. 9C, the computer system determines that the gaze of the user is directed away from the second region 910 (e.g., as represented by gaze point 913i, and optionally for more than a threshold time duration), the computer system optionally ceases to display the second set of one or more controls 912a, 912b, 912c, 912d, 912e, 912f, 912g, 912h. Displaying an initial set of controls in a visually less intrusive manner reduces clutter in the user interface unless and until input is directed to the set of controls, and provides feedback to the user that they have invoked the controls while providing a visual target to which the user can direct their attention to proceed with using the controls, and while avoiding making the controls a distraction in interaction with the user interface.

In some embodiments, the first state corresponds to a reduced (visual) prominence state, and the second state corresponds to an increased (visual) prominence state, where the increased prominence state has a higher level of prominence than the reduced prominence state (1004). For example, the second set of one or more controls 912a, 912b, 912c, 912d, 912e, 912f, 912g, 912h displayed in the increased prominence state as shown in FIG. 9C has a higher level of prominence than the first set of one or more controls 912a, 912b, 912c displayed in the reduced prominence state as shown in FIGS. 9B and 9B1. In some embodiments, the reduced prominence state and increased prominence state have one or more of the characteristics of the reduced prominence state and increased prominence state (respectively) of method 800. Initially displaying the set of controls in a reduced prominence state provides feedback to the user that the user has performed an input to invoke display of the controls, and also provides a visual target for the user to proceed with activating the controls, without visually distracting from the content if the user performed the input unintentionally.

In some embodiments, the second set of one or more controls (e.g., second set of one or more controls 912a, 912b, 912c, 912d, 912e, 912f, 912g, 912h) includes at least a first control of the first set of one or more controls (e.g., first set of one or more controls 912a, 912b, 912c) (1006). For example, the second set of one or more controls 912a, 912b, 912c, 912d, 912e, 912f, 912g, 912h includes all three controls of the first set of one or more controls 912a, 912b, 912c. In some embodiments, the second set of controls includes some or all of the controls of the first set of one or more controls. In some embodiments, the second set of controls is the same as the first set of one or more controls. Initially displaying at least one of the controls of the second set of controls provides a preview, to the user, of the types of controls that will be available for activation if the second set of controls is displayed. This approach helps the user determine whether to proceed with invoking display of the second set of controls, thereby improving the user experience and reducing undesirable or erroneous interactions with the computer system.

In some embodiments, transitioning from displaying the first set of one or more controls in the first state (e.g., as shown in FIGS. 9B and 9B1) to displaying the second set of one or more controls in the second state (e.g., as shown in FIG. 9C) includes transitioning from displaying the first control in the first set of one or more controls with a first amount of transparency to displaying the first control in the second set of one or more controls with a second amount of transparency, different from the first amount of transparency (1008). In some embodiments, the first amount of transparency is greater than the second amount of transparency such that the display of the first control in the first state is more transparent (less opaque) than the display of the first control in the second state. In some embodiments, the first amount of transparency is 10, 20, 30, 40, 50, 60, 70, 80, or 90%. In some embodiments, the second amount of transparency is 30, 40, 50, 60, 70, 80, 90, or 100%. In some embodiments, transitioning from displaying the first set of one or more controls in the first state to displaying the second set of one or more controls in the second state includes transitioning from displaying some or all of the controls in the first set of one or more controls with the first amount of transparency to displaying some or all of the controls in the second set of one or more controls with the second amount of transparency. Initially displaying controls with increased transparency reduces visual distractions to the user until the user provides another input indicating that the user wishes to proceed with using the controls. Once the user has indicated that they wish to proceed with using the controls, the controls are displayed with reduced transparency to improve visibility and usability, thereby reducing errors in interactions with the computer system.

In some embodiments, transitioning from displaying the first set of one or more controls in the first state (e.g., as shown in FIGS. 9B and 9B1) to displaying the second set of one or more controls in the second state (e.g., as shown in FIG. 9C) includes transitioning from displaying the first control with a first simulated specular highlight effect to displaying the first control with a second simulated specular highlight effect, different from the first simulated specular highlight effect (1010). In some embodiments, displaying a control with a simulated specular highlight effect includes displaying the control with one or more simulated lighting reflections based on various simulated and/or physical lighting sources and/or lighting reflections in the computer-generated environment to improve the realism of the display of the control. In some embodiments, the simulated specular highlight effect changes as a viewpoint of the user moves relative to the first control and/or as one or more real or virtual light sources move in the three-dimensional environment in which the first control is displayed. In some embodiments, the second simulated specular highlight effect is increased (e.g., has increased brightness, increased size, increased intensity, and/or an increased quantity of highlights) relative to the first simulated specular highlight effect. In some embodiments, the first and/or second simulated specular highlight effects are displayed on one or more edges and/or surfaces of the first control. In some embodiments, transitioning from displaying the first set of one or more controls in the first state to displaying the second set of one or more controls in the second state includes transitioning from displaying some or all of the controls in the first set of one or more controls with the first simulated specular highlight effect to displaying some or all of the controls in the second set of one or more controls with the second simulated specular highlight effect. Initially displaying controls with reduced simulated specular highlights reduces visual distractions to the user until the user provides another input indicating that the user wishes to proceed with using the controls. Once the user has indicated that they wish to proceed with using the controls, the controls are displayed with increased simulated specular highlights to provide additional feedback to the user regarding the relative position and/or state of the control relative to the viewpoint of the user, thereby facilitating more accurate interactions with the computer system.

In some embodiments, transitioning from displaying the first set of one or more controls in the first state (e.g., as shown in FIGS. 9B and 9B1) to displaying the second set of one or more controls in the second state (e.g., as shown in FIG. 9C) includes transitioning from displaying the first control in the first set of one or more controls with a first amount of blurring to displaying the first control in the second set of one or more controls with a second amount of blurring, different from the first amount of blurring (1012). In some embodiments, displaying a control with blurring causes the edges of the control to appear to gradually transition into the surrounding area such that the control is less prominent with respect to its surroundings. In some embodiments, the second amount of blurring is less than the first amount of blurring, such that controls displayed in the second state are visually sharper and more distinct from their surroundings than controls displayed in the first state. In some embodiments, transitioning from displaying the first set of one or more controls in the first state to displaying the second set of one or more controls in the second state includes transitioning from displaying some or all of the controls in the first set of one or more controls with the first amount of blurring to displaying some or all of the controls in the second set of one or more controls with the second amount of blurring. Initially displaying controls with increased blurring reduces visual distractions to the user until the user provides another input indicating that the user wishes to proceed with using the controls. Once the user has indicated that they wish to proceed with using the controls, the controls are displayed with reduced blurring to improve visibility and usability, thereby reducing errors in interactions with the computer system.

In some embodiments, transitioning from displaying the first set of one or more controls in the first state (e.g., as shown in FIGS. 9B and 9B1) to displaying the second set of one or more controls in the second state (e.g., as shown in FIG. 9C) includes transitioning from displaying the first control in the first set of one or more controls with a first size to displaying the first control in the second set of one or more controls with a second size, different from the first size (1014). In some embodiments, the size of a control is the area or volume of the control as displayed within the computer-generated environment. In some embodiments, the second size of the first control is larger than the first size of the first control, such that displaying the first control in the second state includes increasing its size relative to displaying the first control in the first state. In some embodiments, the second size is 10, 25, 50, 75, 100, or 125% larger than the first size. In some embodiments, transitioning from displaying the first set of one or more controls in the first state to displaying the second set of one or more controls in the second state includes transitioning from displaying some or all of the controls in the first set of one or more controls with the first size to displaying some or all of the controls in the second set of one or more controls with the second size. Initially displaying controls a smaller size reduces visual distractions to the user until the user provides another input indicating that the user wishes to proceed with using the controls. Once the user has indicated that they wish to proceed with using the controls, the controls are displayed with a larger size to improve visibility and usability, thereby reducing errors in interactions with the computer system.

In some embodiments, the second set of one or more controls (e.g., second set of one or more controls 912*a*, 912*b*, 912*c*, 912*d*, 912*e*, 912*f*, 912*g*, 912*h*) includes at least a second control that is not included in the first set of one or more controls (e.g., first set of one or more controls 912*a*, 912*b*, 912*c*) (1016). For example, as shown in FIG. 9C, the second set of one or more controls 912*a*, 912*b*, 912*c*, 912*d*, 912*e*, 912*f*, 912*g*, 912*h* includes several controls 912*d*, 912*c*, 912*f*, 912*g*, 912*h* that are not included in the first set of one or more controls. In some embodiments, the second set of one or more controls includes one or more additional controls that are not included in the first set of one or more controls. In some embodiments, the one or more additional controls includes one or more content navigation controls for navigating to (e.g., displaying) different content, a picture-in-picture control to display the content overlaid with or overlaid by different content, a content close control to cease display of the content, and/or content expansion or contraction controls to expand or contract an area in which the content is displayed. Initially displaying fewer controls consumes less display area, thereby reducing visual distractions to the user until the user provides another input indicating that the user wishes to proceed with using the controls. Once the user has indicated that they wish to proceed with using the controls, additional controls are displayed to provide the user with an additional options for controlling playback of content, thereby increasing the efficiency of interactions with the computer system.

In some embodiments, the first set of one or more controls (e.g., first set of one or more controls 912*a*, 912*b*, 912*c*) and the second set of one or more controls (e.g., second set of one or more controls 912*a*, 912*b*, 912*c*, 912*d*, 912*c*, 912*f*, 912*g*, 912*h*) include a third control (e.g., control 912*a*), and transitioning from displaying the first set of one or more controls in the first state (e.g., as shown in FIGS. 9B and 9B1) to displaying the second set of one or more controls in the second state (e.g., as shown in FIG. 9C) includes transitioning from displaying the first control (e.g., control 912*a*) in the first set of one or more controls and the third control (e.g., 912*b*) in the first set of one or more controls with a first spacing between the first control and the third control (e.g., spacing 916*a* between controls 912*a* and 912*b* in FIGS. 9B and 9B1) to displaying the first control in the second set of one or more controls and the third control in the second set of one or more controls with a second spacing between the first control and the third control (e.g., spacing 916*b* between controls 912*a* and 912*b* in FIG. 9C), different from the first spacing (1018). In some embodiments, the spacing between controls includes a distance by which the controls are separated from each other. In some embodiments, the spacing between the controls of the second set of controls displayed in the second state is greater than the spacing between the controls of the first set of one or more controls displayed in the first state, such that the controls of the second set of controls displayed in the second state are farther apart than the controls of the first set of one or more controls displayed in the first state. In some embodiments, the spacing (e.g., the distance) between the controls (e.g., between the centers of the controls and/or between the closest edges of the controls) displayed in the second state is 5, 10, 15, 25, 50, 75, or 100% greater than the spacing between the controls of the first set of one or more controls displayed in the first state. Initially displaying the controls with reduced spacing causes the controls to consume less display area, thereby reducing visual distractions to the user until the user provides another input indicating that the user wishes to proceed with using the controls. Once the user has indicated that they wish to proceed with using the controls, the spacing between the controls is increased to improve visibility and usability, thereby reducing errors in interactions with the computer system.

In some embodiments, transitioning from displaying the first set of one or more controls in the first state (e.g., as shown in FIGS. 9B and 9B1) to displaying the second set of one or more controls in the second state (e.g., as shown in FIG. 9C) includes changing a visual prominence (e.g., changing a transparency, a size, a specular highlight effect, a blurring, and/or a perceived depth and/or distance relative to a viewpoint of the user) of a first portion of the first control (e.g., first portion 920 of control 912a) more than a second portion of the first control (e.g., second portion 918 of control 912a) (1020). In some embodiments, the first portion of the first control corresponds to (e.g., indicates) a first operation associated with the first control (e.g., an operation that will be performed when the control is selected), and the second portion of the first control does not correspond to (e.g., does not indicate) the first operation associated with the first control. In some embodiments, respective first portions of additional controls of the first set of one or more controls correspond to (e.g., indicate) different operations than the first operation. In some embodiments, the second portion of the first control is consistent (e.g., the same) across a plurality of controls of the first set of one or more controls and/or the second set of controls. In some embodiments, the first portion of the control is overlaid on the second portion of the control (e.g., first portion 920 is overlaid on second portion 918). In some embodiments, transitioning from displaying the first set of one or more controls in the first state to displaying the second set of one or more controls in the second state includes changing the visual prominence of one or more respective first portions of one or more controls in the second set of one or more controls more than one or more respective second portions of one or more controls in the second set of one or more controls. Increasing the visual prominence of a relevant portion of the control focuses the user's attention on that portion of the control, reducing visual clutter and increasing the efficiency of interactions with the computer system.

In some embodiments, the first control (e.g., control 912a) includes a glyph overlaid on a button, the first portion (e.g., first portion 920) of the first control includes the glyph, and the second portion (e.g., second portion 918) of the first control includes the button (1022). In some embodiments, a glyph is a text element and/or a graphical element, such as the star shown on control 912a. In some embodiments, a glyph corresponds to (e.g., provides an indication of) an operation associated with the control. In some embodiments, the visual characteristics of the button do not indicate an operation associated with the first control. In some embodiments, a plurality of controls of the first set of one or more controls and/or the second set of one or more controls includes the same respective button having the same visual characteristics as the respective button of the first control. In some embodiments, each control of the first set of one or more controls and/or the second set of controls includes a different glyph. For example, the controls in the first set of one or more controls 912a, 912b, 912c all include the same button and different glyphs. Increasing the visual prominence of the portion of the glyph focuses the user's attention on the unique portion of the control, thereby helping the user determine which control to select to perform a desired operation, thereby reducing errors in interactions with the computer system.

In some embodiments, while displaying, via the display generation component, the content (e.g., as shown in FIGS. 9B and 9C), the computer system detects (1024a), via the one or more input devices, a selection input (e.g., optionally including a hand input, such as hand input 903b shown in FIGS. 9B and 9B1 or hand input 903c shown in FIG. 9C, and/or attention of the user). In some embodiments, the selection input has one or more of the characteristics of the selection input of method 800. In some embodiments, in response to detecting the selection input (1024b) and in accordance with a determination that the selection input was directed to the second set of one or more controls displayed in the second state (e.g., the selection input was directed to the second set of one or more controls 912a, 912b, 912c, 912d, 912e, 912f, 912g, 912h shown in FIG. 9C), the computer system performs (1024c) a respective operation associated with the second set of one or more controls in accordance with the selection input. In some embodiments, in response to detecting the selection input (1024b) and in accordance with a determination that the selection input was directed to the first set of one or more controls displayed in the first state (e.g., the selection input was directed to the first set of one or more controls 912a, 912b, 912c shown in FIGS. 9B and 9B1) the computer system forgoes (1024d) performing any operation associated with the first set of one or more controls. In some embodiments, a selection input directed to the first set of one or more controls displayed in the first state is ignored entirely; that is, no operation is performed in response to detecting the selection input. In some embodiments, a selection input directed to the first set of one or more controls displayed in the first state causes an operation to be performed that is not associated with any of the controls of the first set of one or more controls. For example, in some embodiments, a selection input directed to the first set of one or more controls displayed in the first state causes one or more controls of the first set of one or more controls to be displayed in the second state or causes the first set of one or more controls to cease to be displayed. Disabling the selection of the first set of one or more controls in the first state prevents the user from selecting one of the controls without proceeding to displaying the second set of controls, potentially causing the user to assume that the first set of one or more controls are the only controls available. Moreover, because the first set of one or more controls are displayed in a first (lower-prominence) state, allowing selection of controls in this state increases the likelihood of selection errors relative to selection of controls in a second (higher-prominence) state. Thus, preventing activation of controls displayed in the first state improves the user experience by reducing the likelihood of selecting the wrong control.

In some embodiments, performing (1026a) the respective operation associated with the second set of one or more controls (e.g., second set of one or more controls 912a, 912b, 912c, 912d, 912e, 912f, 912g, 912h shown in FIG. 9C) includes, in accordance with a determination that attention of the user (e.g., represented by gaze point 913h) was directed to a first portion of the second set of one or more controls (e.g., to a respective control of the second set of one or more controls, or to an area near a respective control of the second set of one or more controls) when the selection input was detected, performing (1026b) a first operation associated with a first control of the second set of one or more controls. For example, in FIG. 9C, in accordance with a determination that a gaze of the user was directed to (or near) control 912c, as represented by gaze point 913h, the computer system optionally performs an operation associated with control 912c. In some embodiments, performing (1026a) the respective operation associated with the second set of one or more controls includes, in accordance with a determination that the attention of the user was directed to a second portion, different from the first portion, of the second set of one or more controls (e.g., the gaze of the user is directed to (or near) a different control than control 912c) when the selection input was detected, performing (1026c) a second operation, different from the first operation, associated with a second control of the second set of one or more controls. In some embodiments, the first portion of the second set of one or more controls includes some or all of the first control. In some embodiments, the first portion of the second set of one or more controls is an area around the first control that includes the first control, such as an area that is 5, 10, 15, 20, 25, 30, 35, 40, 45, or 50% larger than the area of the first control. In some embodiments, the second portion of the second set of one or more controls includes some or all of the second control. In some embodiments, the second portion of the second set of one or more controls is an area around the second control that includes the second control, such as an area that is 5, 10, 15, 20, 25, 30, 35, 40, 45, or 50% larger than the area of the second control. The described approach enables a user to select a control by looking at or near the control while providing the selection input, without having to navigate a cursor (or other selection element) to the control, thereby providing a more efficient and intuitive user interface.

In some embodiments, the one or more first criteria include a second criterion that is satisfied when the attention of the user (e.g., a gaze of the user, such as represented by gaze point 913e of FIGS. 9B and 9B1) is directed to the first region (e.g., second region 910) within a time threshold (e.g., 0.05, 0.1, 0.25, 0.5, 0.75, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 seconds) of the first set of one or more controls being displayed in the first state (e.g., as shown in FIGS. 9B and 9B1) (1028a). In some embodiments, while displaying the first set of one or more controls in the first state (1028b) and in accordance with a determination that the one or more first criteria are not satisfied because the second criterion is not satisfied (e.g., if the gaze of the user is not directed to second region 910 within the time threshold), the computer system ceases (1028c) to display the first set of one of more controls. In some embodiments, detecting that the gaze of the user is not directed to the first region within the time threshold includes starting a timer when the first set of one or more controls is displayed in the first state and measuring the time duration during which the gaze of the user is continuously directed away from the first region. Using the direction of the user's gaze to determine whether the user wants to interact with the first set of one or more controls and if not, dismissing display of the controls allows the device to predict what the user wants to do and respond appropriately without requiring the user to provide explicit inputs to dismiss the controls, thereby improving the user experience.

In some embodiments, detecting the first input from the first portion of the user includes detecting a hand raise of the user from a first hand position to a second hand position (e.g., such as hand input 903a of FIG. 9A), and the satisfaction of the second criterion is independent of whether the hand of the user is in the second hand position (1030). In some embodiments, the hand raise has one or more of the characteristics of the hand raise of method 800. In some embodiments, the first hand position and second hand position are determined with respect to a reference frame associated with an environment of the user, such as a reference frame defined by a direction of gravity and/or a direction of horizon orthogonal to the direction of gravity. In some embodiments, the second hand position is more than a threshold distance (e.g., 0.01, 0.05, 0.1, 0.2, 0.3, 0.4, or 0.5 meters) above the first hand position. In some embodiments, if the attention of the user is not directed to the first region within the time threshold of the first set of one or more controls being displayed in the first state, the first set of one or more controls ceases to be displayed regardless of whether the user's hand is still raised. That is, in some embodiments, the determination of whether to cease to display the first set of one or more controls in the first state is independent of whether the user's hand remains at or near the second (raised) hand position or is in a different hand position (e.g., if the user drops their hand back down to the first hand position, or moves their hand to another hand position). Using the attention of the user as an indicator of whether to dismiss display of the controls (without requiring the user to provide an additional input, such as a hand drop, to dismiss the controls) provides a more efficient user interface.

In some embodiments, detecting the first input from the first portion of the user includes detecting a hand raise of the user (e.g., hand input 903a of FIG. 9A) from a first hand position to a second hand position (e.g., as described with reference to step 1030) and the one or more first criteria include a third criterion that is satisfied when the hand of the user remains at or near the second hand position (1032a) (e.g., when the user maintains their hand in the raised position). In some embodiments, the hand of the user remains at or near the second hand position when it remains in the second hand position, when it remains at a same height as the second hand position (but potentially moves laterally), and/or when it remains within 0.01, 0.05, 0.08, 0.1, 0.2, 0.3, 0.5, 0.6, 0.7, 0.8, 0.9, or 1.0 meters of the second hand position. In some embodiments, while displaying the first set of one or more controls in the first state (e.g., as shown in FIGS. 9B and 9B1), the computer system detects (1032b), via the one or more input devices, that the hand of the user has moved from being at or near the second hand position to a third hand position. In some embodiments, the third hand position is determined with respect to a reference frame associated with an environment of the user. In some embodiments, the third hand position is determined with respect to a coordinate system associated with a physical environment of the user. In some embodiments, the third hand position is lower than the second hand position; that is, the user has dropped their hand after raising it. In some embodiments, the third hand position is lower than the second hand position by at least a threshold distance, such as 0.1, 0.2, 0.3, 0.4, 0.5, 0.6, 0.7, 0.8, 0.9, 1.0, 1.1, 1.2, 1.3, 1.4, or 1.5 meters. In some embodiments, the third hand position is the same as the first hand position. In some embodiments, the third hand position is different from the first hand position. In some embodiments, moving the hand from being at or near the second position to the third position includes moving the hand into a physical zone and/or volume that indicates the hand is not raised, and/or moving the hand outside of a physical zone and/or volume that indicates that the hand is raised. In some embodiments, in response to detecting that the hand of the user has moved from the second hand position to the third hand position, the computer system ceases (1032*c*) to display the first set of one or more controls in the first state (e.g., the computer system ceases to display the first set of one or more controls 912*a*, 912*b*, 912*c* as shown in FIGS. 9B and 9B1). Using detection of a hand gesture of the user (e.g., a hand drop) as an indicator of whether to dismiss display of the controls, without requiring an additional input, provides a more efficient user interface, avoiding the need for additional types of inputs, and is intuitive to the user because it is the reverse of the input (a hand raise) used to invoke display of the first set of one or more controls.

In some embodiments, detecting the first input from the first portion of the user includes detecting a hand raise of the user (e.g., hand input 903*a* of FIG. 9A) from a first hand position to a second hand position (e.g., as described with reference to step 1030) and the one or more first criteria include a second criterion that is satisfied when the hand of the user remains at or near the second hand position (e.g., as described with reference to step 1032*a*) (1034*a*). In some embodiments, while displaying the first set of one or more controls in the first state (e.g., as shown in FIGS. 9B and 9B1) (1034*b*), the computer system detects, via the one or more input devices, that the hand of the user has moved from being at or near the second hand position to a third hand position (e.g., as described with reference to step 1032*b*) (1034*c*). In some embodiments, in response to detecting that the hand of the user has moved from being at or near the second hand position to the third hand position (1034*d*) and in accordance with a determination that a gaze of the user is directed to the first region (e.g., that gaze of the user is directed to second region 910 of FIGS. 9B and 9B1, as represented by gaze point 913*c*)), the computer system maintains (1034*e*) display of the first set of one or more controls in the first state (e.g., as shown in FIGS. 9B and 9B1). In some embodiments, in response to detecting that the hand of the user has moved from being at or near the second hand position to the third hand position (1034*d*) and in accordance with a determination that the gaze of the user is directed away from the first region (e.g., the gaze of the user is directed away from second region 910, as represented by gaze point 913*g*), the computer system ceases (1034*f*) to display the first set of one or more controls in the first state (e.g., the computer system ceases to display the first set of one or more controls 912*a*, 912*b*, 912*c* as shown in FIGS. 9B and 9B1). In some embodiments, the hand position of the user is used in conjunction with the user's gaze to determine whether to continue to display the first set of one or more controls in the first state. For example, if the user raises their hand to invoke display of the controls and then drops their hand but continues to look at the controls, it is likely that the user is still interested in interacting with the controls. Thus, the computer system continues to display the controls. In contrast, if the user raises their hand to invoke display of the controls and then drops their hand and is not looking at the controls, it is likely that the user is not interested in interacting with the controls. Thus, the computer system ceases to display the controls. Using detection of a hand gesture of the user (e.g., a hand drop) in combination with detection of a gaze of the user to determine whether to dismiss display of the controls provides better predictive ability than using either of these inputs alone, thereby improving the efficiency of interactions with the computer system.

In some embodiments, detecting the first input based on the movement of the first portion of the user includes detecting a hand raise of the user (e.g., hand input 903*a* shown in FIG. 9A) from a first hand position to a second hand position (e.g., as described with reference to step 1030) while the hand of the user is in a respective pose (1036*a*). In some embodiments, the respective pose is a hand pose in which at least some of the user's fingers are open (e.g., not closed against or in contact with each other or with the palm of the user). In some embodiments, the respective hand pose is a hand pose from which the user can subsequently perform an air pinch gesture by contacting one or more fingers of the user's hand with a thumb of the same hand (e.g., the hand is in a pre-air pinch hand pose from which the user can subsequently perform an air pinch gesture by contacting one or more fingers of the user's hand with a thumb of the same hand). In some embodiments, the respective pose is a hand pose that is uncorrelated (or poorly correlated) with performing other activities (e.g., activities other than interacting with the controls). For example, the respective pose is different than a pose that is correlated with or includes holding an object, making a fist, and/or touching another hand (e.g., a hand of another person or the user's other hand). In some embodiments, while displaying the content (e.g., as shown in FIG. 9A) and while not displaying the first set of one or more controls or the second set of one or more controls, the computer system detects (1036*b*), via the one or more input devices, a second input based on movement of the first portion of the user of the computer system, where detecting the second input includes detecting a hand raise of the user from the first hand position to the second hand position while the hand of the user is not in the respective pose. In some embodiments, in response to detecting the second input, the computer system forgoes (1036*c*) displaying the first set of one or more controls and the second set of one or more controls in the user interface (e.g., the computer system forgoes displaying the first set of one or more controls 912*a*, 912*b*, 912*c* as shown in FIG. 9B). In some embodiments, the second input has one or more of the characteristics of the first input. Forgoing display of the controls if the hand of the user is posed in a manner that suggests that the user did not intend to invoke display of the controls reduces false positives, thereby improving the efficiency of interactions with the computer system.

In some embodiments, the second set of one or more controls (e.g., second set of one or more controls 912*a*, 912*b*, 912*c*, 912*d*, 912*e*, 912*f*, 912*g*, 912*h* of FIG. 9C) includes one or more of: one or more playback controls for controlling playback of the content, one or more volume controls for controlling a volume level associated with the content, a content expansion control for transitioning the content to an increased size state, or a picture-in-picture control for transitioning the content to a reduced size state (1038). In some embodiments, the second set of one or more controls includes one or more navigation controls for navigating to different content, a content close control to exit display of the content, and/or a resize control for changing a size of an area in which the content is displayed. In some embodiments, in response to detecting a selection input (e.g., as described herein) directed to a particular control of the second set of one or more controls, the computer system performs a corresponding operation. Displaying a variety of controls provides the user with additional control over the display of content, thereby improving the efficiency of interactions with the computer system.

In some embodiments, the first set of one or more controls includes multiple controls (e.g., the first set of one or more controls 912a, 912b, 912c of FIGS. 9B and 9B1 includes multiple controls) (1040). In some embodiments, the first set of one or more controls includes one more playback controls for controlling playback of the content, a volume control for controlling a volume level associated with the content, a content expansion control for transitioning the content to an increased size state, a content contraction control for transitioning the content to a decreased size state, a picture-in-picture control for transitioning the content to a reduced size state, one or more navigation controls for navigating to different content, a content close control to exit display of the content, and/or a content contraction control for transitioning the content to a decreased size state. Displaying multiple controls provides a better indication to the user of what types of controls will be available for selection if the user proceeds to cause display the second set of controls and reduces the inputs needed to display multiple controls relative to displaying a single control.

In some embodiments, while displaying the first set of one or more controls in the first state (e.g., as shown in FIG. 9D), the computer system detects (1042a) that the attention of the user is directed to a first control (e.g., a gaze of the user is directed to control 912a, as indicated by gaze point 913j, or to control 912c, as indicated by gaze point 913k). For example, the attention of the user is directed to a first control and is not directed to a second control of the first set of one or more controls. In some embodiments, in response to detecting that the attention of the user is directed to the first control of the first set of one or more controls, the computer system increases (1042b) a visual prominence (e.g., by decreasing a transparency, increasing a size, increasing a specular highlight effect, decreasing a blurring, and/or changing a perceived depth and/or distance relative to a viewpoint of the user) of a plurality of controls of the first set of one or more controls, including the first control (and optionally the second control). For example, in response to detecting that the gaze of the user is directed to control 912a in FIG. 9D, the computer system optionally increases the visual prominence of some or all of controls 912a, 912b, and 912c. In some embodiments, increasing the visual prominence of the plurality of controls includes displaying the plurality of controls in an increased prominence state, such as described in detail with reference to method 800 and depicted in FIG. 9C. In some embodiments, the visual prominence of all of the controls of the first set of one or more controls is increased. In some embodiments, the visual prominence of a subset of the first set of one or more controls is increased, including the first control. In some embodiments, increasing the visual prominence of the plurality of controls includes displaying the plurality of controls in the second state or displaying the plurality of controls with one or more of the characteristics of the second state. In some embodiments, after the visual prominence of the plurality of controls is increased, a respective control of the plurality of controls can be selected (e.g., via a selection input such as described with reference to method 800) to cause an operation associated with the respective control to be performed. Increasing the visual prominence of all of the controls when the user looks at one of the controls provides improved visibility of all of the controls, thus reducing the likelihood that the user will inadvertently select the wrong control and improving the accuracy and efficiency of interactions with the computer system.

In some embodiments, while displaying the first set of one or more controls in the first state (e.g., as shown in FIGS. 9B and 9B1), the computer system detects (1044a) that the attention of the user is directed to a first control of the first set of one or more controls (e.g., and not directed to a second control of the first set of one or more controls), such as described with reference to step 1042a). For example, the computer system detects that the gaze of the user is directed to control 912a, as indicated by gaze point 913j. In some embodiments, in response to detecting that the attention of the user is directed to the first control of the first set of one or more controls, the computer system increases (1044b) a visual prominence (e.g., as described with reference to step 1042b) of the first control without increasing the visual prominence of remaining controls (optionally including the second control) of the first set of one or more controls (e.g., by displaying control 912a with increased visual prominence without displaying controls 912b, 912c with increased visual prominence, as shown in FIG. 9E). In some embodiments, increasing the visual prominence of the first control includes displaying the first control in the second state or displaying the first control with one or more of the characteristics of the second state. In some embodiments, after the visual prominence of the first control is increased, the first control can be selected to cause an operation associated with the first control to be performed, such as described with reference to claim 22. Increasing the visual prominence of the control at which the user is looking provides improved visibility of that control while also indicating, to the user, that the user can now select that control to perform an operation, without increasing visual clutter associated with increasing the prominence of other controls.

In some embodiments, detecting the first input based on the movement of the first portion of the user (e.g., hand input 903a of FIG. 9A) includes detecting that the movement of the first portion of the user satisfies one or more second criteria (1046). In some embodiments, the one or more second criteria include a criterion that is satisfied when the movement of the first portion of the user indicates that the user intended to provide the first input, such as when the movement is primarily in a first direction (such as an upwards direction relative to a floor plane in the physical environment of the user) and/or has a velocity profile and/or acceleration profile that meets one or more criteria, such as when an initial velocity of the first portion of the user exceeds a velocity threshold (e.g., 0.001, 0.005, 0.01, 0.02, or 0.03 meters/second) and a subsequent deceleration (e.g., to zero velocity) occurs within a time threshold (e.g., 0.01, 0.05, 0.1, 0.5, 1, 1.5, 2, 2.5, 3, 3.5, 4, 4.5, or 5 seconds). In some embodiments, the one or more second criteria include a criterion that is satisfied when an amount of the movement of the first portion of the user is more than a threshold amount (e.g., more than a threshold distance), such as 0.01, 0.05, 0.1, 0.2, 0.3, 0.4, 0.5 meters or 1 meter. In some embodiments, if the movement of the first portion of the user does not satisfy the one or more criteria, the computer system forgoes displaying the first set of one or more controls in the first state in response to detecting the first input. Using various movement criteria to determine whether it is likely that the user intended to provide an input to invoke display of the controls improves the accuracy of the detection and reduces false positives, thereby improving the accuracy and efficiency of interactions with the computer system.

In some embodiments, the one or more second criteria include a first criterion that is satisfied when the movement of the first portion of the user (e.g., a movement associated with hand input 903a of FIG. 9A) is in a direction that is within a threshold angle of a target movement direction (1048). In some embodiments, the target movement direction is straight upwards (vertical) relative to a starting position of the first portion of the user based on a reference frame associated with an environment of the user, such as along a direction that is orthogonal to a plane of a floor in the physical environment and/or along the direction of gravity. In some embodiments, the threshold angle is 0.5, 5, 10, 20, 30, 40, 50, 60, or 70 degrees. For example, the movement of the first portion of the user optionally satisfies the first criterion when it is a movement that is primarily in an upwards direction. Using the direction of the movement to determine whether it is likely that the user intended to provide an input to invoke display of the controls improves the accuracy of the detection and reduces false positives, thereby improving the accuracy and efficiency of interactions with the computer system.

In some embodiments, the one or more second criteria include a first criterion that is satisfied when a first amount of the movement (e.g., a first amount of the movement associated with hand input 903a of FIG. 9A) in a first direction exceeds a first threshold amount of movement, and a second amount of the movement (e.g., a second amount of the movement associated with hand input 903a of FIG. 9A) in a second direction, different from the first direction, is less than a second threshold amount of movement (1050). In some embodiments, the second direction of the movement is orthogonal to the first direction of the movement. In some embodiments, the first direction of the movement is vertical (e.g., upwards) relative to a starting position of the first portion of the user based on a reference frame associated with an environment of the user, such as along a direction that is orthogonal to a plane of a floor. In some embodiments, the second direction of the movement is horizontal (e.g., to the side, and/or away from the user's trunk) relative to a starting position of the first portion of the user based on a reference frame associated with an environment of the user, such as along a direction that is parallel to a plane of a floor. In some embodiments, the first threshold amount of movement is greater than the second threshold amount of movement. In some embodiments, the first threshold amount of movement is 0.01, 0.05, 0.1, 0.2, 0.3, 0.4, or 0.5 meters. In some embodiments, the second threshold amount of movement is 0.01, 0.05, 0.1, 0.2, 0.3, 0.4, or 0.5 meters. Determining whether the direction of movement is primarily vertical (indicating that the user probably intended to invoke display of the controls) or horizontal (indicating that the user probably did not intend to invoke display of the controls and was instead using their hand for another purpose) improves the accuracy of the input detection and reduces false positives, thereby improving the efficiency and accuracy of interactions with the computer system.

In some embodiments, the one or more second criteria include a first criterion that is satisfied when the movement of the first portion of the user (e.g., hand input 903a of FIG. 9A) includes a first movement of the first portion of the user followed by a pause in the movement of the first portion of the user for a threshold time duration (1052). In some embodiments, the first movement of the first portion of the user is a hand raise of the user and/or a head tilt of the user. In some embodiments, a pause in the movement of the first portion of the user includes a time duration during which the first portion of the user is not moving at all (e.g., is still), is moving very slowly (e.g., less than a velocity threshold such as 0.001, 0.005, 0.01, 0.02, or 0.03 meters/second), and/or moves a very short distance (e.g., less than a distance threshold, such as 0.001, 0.005, 0.01, 0.02, or 0.03 meters). In some embodiments, the threshold time duration is 0.1, 0.5, 1, 1.5, 2, 2.5, 3, 3.5, 4, 4.5, 5, 7, or 10 seconds. Using the detection of a pause in the movement of the user as an additional indication that the user intended to invoke display of the controls improves the accuracy of the input detection and reduces false positives, thereby improving the accuracy and efficiency of interactions with the computer system.

In some embodiments, the first input (e.g., hand input 903a of FIG. 9A) is detected while a gaze of the user directed to a first area of the content (e.g., while the gaze of the user is directed to the upper portion 932 of the content, as represented by gaze point 913b of FIG. 9A) (1054a). In some embodiments, the first area of the content is an upper portion of the content, such as the upper 20, 30, 40, 50, or 60% of the content. In some embodiments, while displaying the content and while not displaying the first set of one or more controls or the second set of one or more controls (e.g., as shown in FIG. 9A), the computer system detects (1054b), via the one or more input devices, a second input including a second movement of the first portion of the user of the computer system that satisfies the one or more second criteria (e.g., as described with reference to steps 1048-1052) while the gaze of the user is directed to a second area of the content, different from the first area of the content (e.g., while the gaze of the user is directed to the lower portion 930 of the content, as represented by gaze point 913a of FIG. 9A). In some embodiments, the second input is the same as or similar to the first input (e.g., has one or more of the characteristics of the first input). In some embodiments, the second movement of the first portion of the user is a hand raise of the user or a head tilt of the user. In some embodiments, the second area of the content is a lower portion of the content, such as the lower 20, 30, 40, 50, or 60% of the content. In some embodiments, the second area of the content includes some or all of the first region (e.g., second region 910 of FIGS. 9B and 9B1). In some embodiments, in response to detecting the second input (1054c) and in accordance with a determination that the second movement of the first portion of the user satisfies one or more third criteria, different from the one or more second criteria, the computer system displays (1054d) the first set of one or more controls in the first state (e.g., as shown in FIGS. 9B and 9B1). In some embodiments, the one or more third criteria include similar criteria as the one or more second criteria but with less stringent thresholds and/or wider acceptable ranges. For example, in some embodiments, the one or more second criteria and the one or more third criteria each include a criterion that is satisfied when a first amount of the movement in a first direction exceeds a respective first threshold amount of movement, and a second amount of the movement in a second direction, different from the first direction, is less than a respective second threshold amount of movement. For the one or more second criteria, the respective first threshold amount of movement is optionally a first amount of meters and the respective second threshold amount of movement is a second amount of meters. In contrast, for the one or more third criteria, the respective first threshold amount of movement is optionally less than (e.g., 1, 5, 10, 15, 20, 25, or 30% less than) the first amount of meters and the respective second threshold amount of movement is greater than (e.g., 1, 5, 10, 15, 20, 25, or 30% greater than) the first amount of meters. Similarly, in some embodiments, the values of threshold angles, threshold velocities, threshold distances, and/or threshold times used to determine whether a movement of the first portion of the user satisfies the one or more third criteria vary analogously (e.g., are similarly relaxed) relative to the corresponding thresholds used to determine whether a movement of the first portion of the user satisfies the one or more second criteria. In some embodiments, in response to detecting the second input (1054*c*) and in accordance with a determination that the second movement of the first portion of the user does not satisfy the one or more third criteria, the computer system forgoes (1054*c*) display of the first set of one or more controls in the first state (e.g., the computer system forgoes displaying the first set of one or more controls 912*a*, 912*b*, 912*c* in the reduced prominence state as shown in FIGS. 9B and 9B1). In some embodiments, forgoing display of the first set of one or more controls in the first state includes forgoing display of the first set of one or more controls entirely. For example, the computer system optionally continues to display the content as shown in FIG. 9A without displaying the first set of one or more controls. In this approach, the gaze of the user is used as a second signal (e.g., in addition to a gesture of the user) to help determine if the user intended to invoke display of the controls. If the user is gazing at an area of the content that indicates that the user intended to invoke display of the controls (e.g., the user is gazing at an area of the content in which the controls would be displayed), the constraints on the user input (e.g., the thresholds used to determine whether the user input corresponds to a request to display the controls) are relaxed, thereby making it easier for the user to provide the input. If the user is not gazing at an area of the content that indicates that the user intended to invoke display of the controls, the constraints on the user input are more stringent, thereby reducing the likelihood of false positives and improving the accuracy and efficiency of interactions with the computer system.

In some embodiments, the movement of the first portion of the user satisfies one or more second criteria (e.g., as described with reference to steps 1048-1052) and the first set of one or more controls are displayed in the first state (e.g., as shown in FIGS. 9B and 9B1) in response to the first input and in accordance with a determination that the gaze of the user is directed to the content (e.g., as represented by gaze point 913*a* and 913*b* of FIG. 9A) (1056*a*). In some embodiments, while displaying the content (e.g., as shown in FIG. 9A) and while not displaying the first set of one or more controls or the second set of one or more controls (e.g., while not displaying controls in the first state or the second state), the computer system detects (1056*b*), via the one or more input devices, a second input comprising a second movement of the first portion of the user of the computer system, where the second movement of the first portion of the user satisfies the one or more second criteria (e.g., as described with reference to steps 1048-1052). In some embodiments, in response to detecting the second input and in accordance with a determination that the gaze of the user is directed away from the content (e.g., directed to a different area of the user interface that does not include the content, such as represented by gaze point 913*c* of FIG. 9A), the computer system forgoes (1056*c*) display of the first set of one or more controls in the first state (e.g., as described with reference to step 1054*c*). In this approach, the gaze of the user is used as a second signal (e.g., in addition to a gesture of the user) to help determine if the user intended to invoke display of the controls. If the user is looking at the content when the user provides the first input (indicating that the user probably intended to invoke display of the controls), the controls are displayed, whereas if the user is not looking at the content when the first input is provided (indicating that the user probably did not intend to invoke display of the controls), the controls are not displayed, thereby reducing false positives and improving the accuracy and efficiency of interactions with the computer system.

In some embodiments, the movement of the first portion of the user satisfies one or more second criteria (e.g., as described with reference to steps 1048-1052) and the first set of one or more controls are displayed in the first state (e.g., as shown in FIGS. 9B and 9B1) in response to the first input and in accordance with a determination that the gaze of the user is directed to a first area of the content (e.g., lower portion 930 of FIG. 9A) (1058*a*). In some embodiments, the first area of the content is a lower portion of the content, such as the lower 20, 30, 40, 50, or 60% of the content. In some embodiments, the second area of the content includes some or all of the first region of the user interface. In some embodiments, while displaying the content and while not displaying the first set of one or more controls or the second set of one or more controls (e.g., as shown in FIG. 9A), the computer system detects (1058*b*), via the one or more input devices, a second input comprising a second movement of the first portion of the user of the computer system, where the second movement of the first portion of the user satisfies the one or more second criteria (e.g., as described with reference to steps 1048-1052) (1058*b*). In some embodiments, in response to detecting the second input and in accordance with a determination that the gaze of the user is directed away from the first area of the content (e.g., as represented by gaze point 913*b* and gaze point 913*c* of FIG. 9A), the computer system forgoes (1058*c*) display of the first set of one or more controls in the first state (e.g., as described with reference to step 1054*e*). In some embodiments, the gaze of the user is directed away from the first area of the content when the gaze of the user is directed away from all of the content or when the gaze of the user is directed to a different area of the content (e.g., an upper portion of the content). In this approach, the gaze of the user is used as a second signal (e.g., in addition to a gesture of the user) to help determine if the user intended to invoke display of the controls. If the user is gazing at an area of the content that indicates that the user intended to invoke display of the controls (e.g., the user is gazing at an area of the content in which the controls would be displayed, such as a lower area of the content), the controls are displayed. If the user is not gazing at an area of the content that indicates that the user intended to invoke display of the controls, the controls are not displayed. This combination improves the accuracy and efficiency of interactions with the computer system In some embodiments, the movement of the second portion of the user includes a movement of an eye of the user (e.g., a movement of an eye of the user that causes a gaze of the user to move from gaze point 913*d* to gaze point 913*e* of FIG. 9A) (1060). In some embodiments, the movement of the eye of the user corresponds to a user moving a direction of their gaze from a first location in the user interface to a second location in the first region of the user interface, such as from a first location in the first region or from a first location outside of the first region. Monitoring the movement the user's gaze (e.g., to determine whether the user has looked at the region where the controls are displayed in the first state) as an additional input to determining whether to display the controls in the second state helps reduce false positives and improves the accuracy and efficiency of interactions with the computer system.

In some embodiments, the movement of the second portion of the user includes a movement of a hand of the user (e.g., hand input 903*a*) (1062). In some embodiments, the movement of the second portion of the user includes one or more of the characteristics of the input based on the movement of the first portion of the user described with respect to step 1002*a*. In some embodiments, if the first portion of the user is a first hand (e.g., the input from the first portion of the user is an input from a first hand of the user), the movement of the second portion of the user is a movement of a second (different) hand of the user. Using a movement of a second hand of the user as an additional input to determining whether to display the controls in the second state helps reduce false positives and improves the accuracy and efficiency of interactions with the computer system.

In some embodiments, aspects/operations of methods 800 and 1000 may be interchanged, substituted, and/or added between these methods. For example, the content of methods 800 and 1000, the user interfaces of methods 800 and 1000, the first and second sets of controls of methods 800 and 1000, the inputs for invoking and dismissing display of the first and second sets of controls of methods 800 and 1000, and the first and second states of methods 800 and 1000 are optionally interchanged, substituted, and/or added between these methods For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

The invention claimed is:

1. A method, comprising:
at a computer system in communication with a display generation component and one or more input devices:
displaying, via the display generation component, content in a first region of a user interface;
while displaying the content and while a first set of one or more controls associated with the content are not displayed in a first state, detecting, via the one or more input devices, a first input from a first portion of a user of the computer system; and
in response to detecting the first input:
in accordance with a determination that a gaze of the user is directed to a second region of the user interface when the first input is detected, displaying, in the user interface, the first set of one or more controls in the first state, and
in accordance with a determination that the gaze of the user is not directed to the second region of the user interface when the first input is detected, forgoing displaying the first set of one or more controls in the first state.

2. The method of claim 1, wherein the first input is detected while the first set of one or more controls are not displayed.

3. The method of claim 1, wherein the first input is detected while the first set of one or more controls are displayed in a second state, different from the first state, the first state of the first set of one or more controls corresponds to an increased prominence state, and the second state of the first set of one or more controls corresponds to a reduced prominence state, and the reduced prominence state has a lower degree of prominence than the increased prominence state.

4. The method of claim 1, wherein the first input is detected while a second set of controls associated with the content are displayed, the second set of one or more controls different from the first set of one or more controls.

5. The method of claim 4, wherein the first input is detected while the second set of one or more controls are displayed in a second state, different from the first state, the first state corresponding to an increased prominence state, and the second state corresponding to a reduced prominence state.

6. The method of claim 1, wherein detecting the first input from the first portion of the user comprises detecting an air pinch gesture followed by an air pinch release gesture.

7. The method of claim 6, wherein detecting the air pinch gesture and the air pinch release gesture includes determining a time duration between the detection of the air pinch gesture and the detection of the air pinch release gesture, and the first set of one or more controls are displayed in the first state in accordance with a determination that the time duration is within a threshold time duration, the method further comprising:
while displaying the content and while the first set of one or more controls associated with the content is not displayed in the first state, detecting, via the one or more input devices, a second input from the first portion of the user of the computer system, wherein the second input includes a second air pinch gesture from a hand of the user; and
in response to detecting the second input, in accordance with a determination that a second air pinch release gesture is not detected within the threshold time duration of the second air pinch gesture, forgoing displaying the first set of one or more controls in the first state.

8. The method of claim 1, wherein detecting the first input includes detecting a hand raise.

9. The method of claim 1, wherein the second region is the same as the first region.

10. The method of claim 1, wherein the second region is a subset of the first region.

11. The method of claim 1, wherein, while the content is playing, the content changes over time and the first set of one or more controls comprises one or more controls for controlling playback of the content.

12. The method of claim 1, wherein the first set of one or more controls comprises a first control for ceasing display of the content, the method further comprising:
detecting a selection input associated with the first control; and
in response to detecting the selection input associated with the first control, ceasing to display the content.

13. The method of claim 1, wherein the first set of one or more controls comprises a first control for displaying second content, different from the content, in the user interface, the method further comprising:
detecting a selection input associated with the first control; and
in response to detecting the selection input associated with the first control, displaying the second content.

14. The method of claim 1, further comprising:
while displaying the first set of one or more controls in the first state, detecting, via the one or more input devices, a second input from the first portion of the user, wherein the second input is a repeat of the first input from the first portion of the user; and
in response to detecting the second input, ceasing to display the first set of one or more controls in the first state.

15. The method of claim 1, further comprising:
while displaying the first set of one or more controls in the first state, detecting, via the one or more input devices, a second input from the first portion of the user of the computer system, wherein the second input is a repeat of the first input from the first portion of the user; and
in response to detecting the second input:
in accordance with a determination that the gaze of the user is directed to the second region, ceasing to display the first set of one or more controls in the first state, and
in accordance with a determination that the gaze of the user is not directed to the second region, maintaining display of the first set of one or more controls in the first state.

16. The method of claim 1, further comprising:
while displaying the first set of one or more controls in the first state, detecting, via the one or more input devices, a second input while the gaze of the user is directed to the first set of one or more controls; and
in response to detecting the second input, performing an operation associated with a respective control of the first set of one or more controls.

17. The method of claim 16, wherein performing the operation associated with the respective control of the first set of one or more controls includes:
in accordance with a determination that the gaze of the user is directed to a first control of the first set of one or more controls when the second input is detected, performing a first operation associated with the first control; and
in accordance with a determination that the gaze of the user is directed to a second control of the first set of one or more controls, different from the first control, when the second input is detected, performing a second operation associated with the second control, wherein the second operation is different from the first operation.

18. The method of claim 1, further comprising:
while displaying the first set of one or more controls in the first state, detecting that the gaze of the user is directed away from the first set of one or more controls for a first time threshold; and
in response to detecting that the gaze of the user is directed away from the first set of one or more controls for the first time threshold, ceasing to display the first set of one or more controls in the first state.

19. The method of claim 1, further comprising:
while displaying the first set of one or more controls in the first state, detecting that the gaze of the user is directed away from the first set of one or more controls for a first time threshold; and
in response to detecting that the gaze of the user is directed away from the first set of one or more controls for the first time threshold:
in accordance with a determination that the gaze of the user was previously directed to the first set of one or more controls while the first set of one or more controls was displayed in the first state, ceasing to display the first set of one or more controls in the first state, and
in accordance with a determination that the gaze of the user was not previously directed to the first set of one or more controls while the first set of one or more controls was displayed in the first state, maintaining display of the first set of one or more controls in the first state.

20. The method of claim 1, further comprising:
while displaying the first set of one or more controls in the first state, detecting, via the one or more input devices, that the gaze of the user is directed away from the first set of one or more controls for a first time duration; and
in response to detecting that the gaze of the user is directed away from the first set of one or more controls for the first time duration:
in accordance with a determination that the gaze of the user was previously directed to the first set of one or more controls while the first set of one or more controls was displayed in the first state and the first time duration exceeds a first time threshold, ceasing to display the first set of one or more controls in the first state, and
in accordance with a determination that the gaze of the user was not previously directed to the first set of one or more controls while the first set of one or more controls was displayed in the first state:
maintaining display of the first set of one or more controls for the first time threshold,
after maintaining display of the first set of one or more controls for the first time threshold, determining that the first time duration exceeds a second time threshold that is longer than the first time threshold, and
in response to the determination, ceasing to display the first set of one or more controls in the first state.

21. A non-transitory computer-readable storage medium storing one or more programs configured to be executed by one or more processors of a computer system that is in communication with a display generation component and one or more input devices, the one or more programs including instructions for:
displaying, via the display generation component, content in a first region of a user interface;
while displaying the content and while a first set of one or more controls associated with the content are not displayed in a first state, detecting, via the one or more input devices, a first input from a first portion of a user of the computer system; and
in response to detecting the first input:
in accordance with a determination that a gaze of the user is directed to a second region of the user interface when the first input is detected, displaying, in the user interface, the first set of one or more controls in the first state, and
in accordance with a determination that the gaze of the user is not directed to the second region of the user interface when the first input is detected, forgoing displaying the first set of one or more controls in the first state.

22. The non-transitory computer-readable storage medium of claim 21, wherein the first input is detected while the first set of one or more controls are not displayed.

23. The non-transitory computer-readable storage medium of claim 21, wherein the first input is detected while the first set of one or more controls are displayed in a second state, different from the first state, the first state of the first set of one or more controls corresponds to an increased prominence state, and the second state of the first set of one or more controls corresponds to a reduced prominence state, and the reduced prominence state has a lower degree of prominence than the increased prominence state.

24. The non-transitory computer-readable storage medium of claim 21, wherein the first input is detected while a second set of controls associated with the content are displayed, the second set of one or more controls different from the first set of one or more controls.

25. The non-transitory computer-readable storage medium of claim 24, wherein the first input is detected while the second set of one or more controls are displayed in a second state, different from the first state, the first state corresponding to an increased prominence state, and the second state corresponding to a reduced prominence state.

26. The non-transitory computer-readable storage medium of claim 21, wherein detecting the first input from the first portion of the user comprises detecting an air pinch gesture followed by an air pinch release gesture.

27. The non-transitory computer-readable storage medium of claim 26, wherein detecting the air pinch gesture and the air pinch release gesture includes determining a time duration between the detection of the air pinch gesture and the detection of the air pinch release gesture, and the first set of one or more controls are displayed in the first state in accordance with a determination that the time duration is within a threshold time duration, the one or more programs further including instructions for:
while displaying the content and while the first set of one or more controls associated with the content is not displayed in the first state, detecting, via the one or more input devices, a second input from the first portion of the user of the computer system, wherein the second input includes a second air pinch gesture from a hand of the user; and
in response to detecting the second input, in accordance with a determination that a second air pinch release gesture is not detected within the threshold time duration of the second air pinch gesture, forgoing displaying the first set of one or more controls in the first state.

28. The non-transitory computer-readable storage medium of claim 21, wherein detecting the first input includes detecting a hand raise.

29. The non-transitory computer-readable storage medium of claim 21, wherein the second region is the same as the first region.

30. The non-transitory computer-readable storage medium of claim 21, wherein the second region is a subset of the first region.

31. The non-transitory computer-readable storage medium of claim 21, wherein, while the content is playing, the content changes over time and the first set of one or more controls comprises one or more controls for controlling playback of the content.

32. The non-transitory computer-readable storage medium of claim 21, wherein the first set of one or more controls comprises a first control for ceasing display of the content, the one or more programs further including instructions for:
  detecting a selection input associated with the first control; and
  in response to detecting the selection input associated with the first control, ceasing to display the content.

33. The non-transitory computer-readable storage medium of claim 21, wherein the first set of one or more controls comprises a first control for displaying second content, different from the content, in the user interface, the one or more programs further including instructions for:
  detecting a selection input associated with the first control; and
  in response to detecting the selection input associated with the first control, displaying the second content.

34. The non-transitory computer-readable storage medium of claim 21, the one or more programs further including instructions for:
  while displaying the first set of one or more controls in the first state, detecting, via the one or more input devices, a second input from the first portion of the user, wherein the second input is a repeat of the first input from the first portion of the user; and
  in response to detecting the second input, ceasing to display the first set of one or more controls in the first state.

35. The non-transitory computer-readable storage medium of claim 21, the one or more programs further including instructions for:
  while displaying the first set of one or more controls in the first state, detecting, via the one or more input devices, a second input from the first portion of the user of the computer system, wherein the second input is a repeat of the first input from the first portion of the user; and
  in response to detecting the second input:
    in accordance with a determination that the gaze of the user is directed to the second region, ceasing to display the first set of one or more controls in the first state, and
    in accordance with a determination that the gaze of the user is not directed to the second region, maintaining display of the first set of one or more controls in the first state.

36. The non-transitory computer-readable storage medium of claim 21, the one or more programs further including instructions for:
  while displaying the first set of one or more controls in the first state, detecting, via the one or more input devices, a second input while the gaze of the user is directed to the first set of one or more controls; and
  in response to detecting the second input, performing an operation associated with a respective control of the first set of one or more controls.

37. The non-transitory computer-readable storage medium of claim 36, wherein performing the operation associated with the respective control of the first set of one or more controls includes:
  in accordance with a determination that the gaze of the user is directed to a first control of the first set of one or more controls when the second input is detected, performing a first operation associated with the first control; and
  in accordance with a determination that the gaze of the user is directed to a second control of the first set of one or more controls, different from the first control, when the second input is detected, performing a second operation associated with the second control, wherein the second operation is different from the first operation.

38. The non-transitory computer-readable storage medium of claim 21, the one or more programs further including instructions for:
  while displaying the first set of one or more controls in the first state, detecting that the gaze of the user is directed away from the first set of one or more controls for a first time threshold; and
  in response to detecting that the gaze of the user is directed away from the first set of one or more controls for the first time threshold, ceasing to display the first set of one or more controls in the first state.

39. The non-transitory computer-readable storage medium of claim 21, the one or more programs further including instructions for:
  while displaying the first set of one or more controls in the first state, detecting that the gaze of the user is directed away from the first set of one or more controls for a first time threshold; and
  in response to detecting that the gaze of the user is directed away from the first set of one or more controls for the first time threshold:
    in accordance with a determination that the gaze of the user was previously directed to the first set of one or more controls while the first set of one or more controls was displayed in the first state, ceasing to display the first set of one or more controls in the first state, and
    in accordance with a determination that the gaze of the user was not previously directed to the first set of one or more controls while the first set of one or more controls was displayed in the first state, maintaining display of the first set of one or more controls in the first state.

40. The non-transitory computer-readable storage medium of claim 21, the one or more programs further including instructions for:
  while displaying the first set of one or more controls in the first state, detecting, via the one or more input devices, that the gaze of the user is directed away from the first set of one or more controls for a first time duration; and
  in response to detecting that the gaze of the user is directed away from the first set of one or more controls for the first time duration:
    in accordance with a determination that the gaze of the user was previously directed to the first set of one or more controls while the first set of one or more controls was displayed in the first state and the first time duration exceeds a first time threshold, ceasing to display the first set of one or more controls in the first state, and in accordance with a determination that the gaze of the user was not previously directed to the first set of one or more controls while the first set of one or more controls was displayed in the first state:

maintaining display of the first set of one or more controls for the first time threshold, after maintaining display of the first set of one or more controls for the first time threshold, determining that the first time duration exceeds a second time threshold that is longer than the first time threshold, and in response to the determination, ceasing to display the first set of one or more controls in the first state.

41. A computer system that is in communication with a display generation component and one or more input devices, the computer system comprising:

one or more processors; and memory storing one or more programs configured to be executed by the one or more processors, the one or more programs including instructions for:

displaying, via the display generation component, content in a first region of a user interface;

while displaying the content and while a first set of one or more controls associated with the content are not displayed in a first state, detecting, via the one or more input devices, a first input from a first portion of a user of the computer system; and in response to detecting the first input:

in accordance with a determination that a gaze of the user is directed to a second region of the user interface when the first input is detected, displaying, in the user interface, the first set of one or more controls in the first state, and in accordance with a determination that the gaze of the user is not directed to the second region of the user interface when the first input is detected, forgoing displaying the first set of one or more controls in the first state.

42. The computer system of claim 41, wherein the first input is detected while the first set of one or more controls are not displayed.

43. The computer system of claim 41, wherein the first input is detected while the first set of one or more controls are displayed in a second state, different from the first state, the first state of the first set of one or more controls corresponds to an increased prominence state, and the second state of the first set of one or more controls corresponds to a reduced prominence state, and the reduced prominence state has a lower degree of prominence than the increased prominence state.

44. The computer system of claim 41, wherein the first input is detected while a second set of controls associated with the content are displayed, the second set of one or more controls different from the first set of one or more controls.

45. The computer system of claim 44, wherein the first input is detected while the second set of one or more controls are displayed in a second state, different from the first state, the first state corresponding to an increased prominence state, and the second state corresponding to a reduced prominence state.

46. The computer system of claim 41, wherein detecting the first input from the first portion of the user comprises detecting an air pinch gesture followed by an air pinch release gesture.

47. The computer system of claim 46, wherein detecting the air pinch gesture and the air pinch release gesture includes determining a time duration between the detection of the air pinch gesture and the detection of the air pinch release gesture, and the first set of one or more controls are displayed in the first state in accordance with a determination that the time duration is within a threshold time duration, the one or more programs further including instructions for:

while displaying the content and while the first set of one or more controls associated with the content is not displayed in the first state, detecting, via the one or more input devices, a second input from the first portion of the user of the computer system, wherein the second input includes a second air pinch gesture from a hand of the user; and in response to detecting the second input, in accordance with a determination that a second air pinch release gesture is not detected within the threshold time duration of the second air pinch gesture, forgoing displaying the first set of one or more controls in the first state.

48. The computer system of claim 41, wherein detecting the first input includes detecting a hand raise.

49. The computer system of claim 41, wherein the second region is the same as the first region.

50. The computer system of claim 41, wherein the second region is a subset of the first region.

51. The computer system of claim 41, wherein, while the content is playing, the content changes over time and the first set of one or more controls comprises one or more controls for controlling playback of the content.

52. The computer system of claim 41, wherein the first set of one or more controls comprises a first control for ceasing display of the content, the one or more programs further including instructions for:

detecting a selection input associated with the first control; and in response to detecting the selection input associated with the first control, ceasing to display the content.

53. The computer system of claim 41, wherein the first set of one or more controls comprises a first control for displaying second content, different from the content, in the user interface, the one or more programs further including instructions for:

detecting a selection input associated with the first control; and in response to detecting the selection input associated with the first control, displaying the second content.

54. The computer system of claim 41, the one or more programs further including instructions for:

while displaying the first set of one or more controls in the first state, detecting, via the one or more input devices, a second input from the first portion of the user, wherein the second input is a repeat of the first input from the first portion of the user; and in response to detecting the second input, ceasing to display the first set of one or more controls in the first state.

55. The computer system of claim 41, the one or more programs further including instructions for:
- while displaying the first set of one or more controls in the first state, detecting, via the one or more input devices, a second input from the first portion of the user of the computer system, wherein the second input is a repeat of the first input from the first portion of the user; and
- in response to detecting the second input:
  - in accordance with a determination that the gaze of the user is directed to the second region, ceasing to display the first set of one or more controls in the first state, and
  - in accordance with a determination that the gaze of the user is not directed to the second region, maintaining display of the first set of one or more controls in the first state.

56. The computer system of claim 41, the one or more programs further including instructions for:
- while displaying the first set of one or more controls in the first state, detecting, via the one or more input devices, a second input while the gaze of the user is directed to the first set of one or more controls; and
- in response to detecting the second input, performing an operation associated with a respective control of the first set of one or more controls.

57. The computer system of claim 56, wherein performing the operation associated with the respective control of the first set of one or more controls includes:
- in accordance with a determination that the gaze of the user is directed to a first control of the first set of one or more controls when the second input is detected, performing a first operation associated with the first control; and
- in accordance with a determination that the gaze of the user is directed to a second control of the first set of one or more controls, different from the first control, when the second input is detected, performing a second operation associated with the second control, wherein the second operation is different from the first operation.

58. The computer system of claim 41, the one or more programs further including instructions for:
- while displaying the first set of one or more controls in the first state, detecting that the gaze of the user is directed away from the first set of one or more controls for a first time threshold; and
- in response to detecting that the gaze of the user is directed away from the first set of one or more controls for the first time threshold, ceasing to display the first set of one or more controls in the first state.

59. The computer system of claim 41, the one or more programs further including instructions for:
- while displaying the first set of one or more controls in the first state, detecting that the gaze of the user is directed away from the first set of one or more controls for a first time threshold; and
- in response to detecting that the gaze of the user is directed away from the first set of one or more controls for the first time threshold:
  - in accordance with a determination that the gaze of the user was previously directed to the first set of one or more controls while the first set of one or more controls was displayed in the first state, ceasing to display the first set of one or more controls in the first state, and
  - in accordance with a determination that the gaze of the user was not previously directed to the first set of one or more controls while the first set of one or more controls was displayed in the first state, maintaining display of the first set of one or more controls in the first state.

60. The computer system of claim 41, the one or more programs further including instructions for:
- while displaying the first set of one or more controls in the first state, detecting, via the one or more input devices, that the gaze of the user is directed away from the first set of one or more controls for a first time duration; and
- in response to detecting that the gaze of the user is directed away from the first set of one or more controls for the first time duration:
  - in accordance with a determination that the gaze of the user was previously directed to the first set of one or more controls while the first set of one or more controls was displayed in the first state and the first time duration exceeds a first time threshold, ceasing to display the first set of one or more controls in the first state, and
  - in accordance with a determination that the gaze of the user was not previously directed to the first set of one or more controls while the first set of one or more controls was displayed in the first state:
    - maintaining display of the first set of one or more controls for the first time threshold,
    - after maintaining display of the first set of one or more controls for the first time threshold, determining that the first time duration exceeds a second time threshold that is longer than the first time threshold, and
    - in response to the determination, ceasing to display the first set of one or more controls in the first state.

* * * * *